US009363500B2

(12) United States Patent
Takahashi et al.

(10) Patent No.: US 9,363,500 B2
(45) Date of Patent: Jun. 7, 2016

(54) IMAGE PROCESSING DEVICE, IMAGE PROCESSING METHOD, AND PROGRAM

(75) Inventors: Yoshitomo Takahashi, Kanagawa (JP); Shinobu Hattori, Tokyo (JP)

(73) Assignee: SONY CORPORATION, Tokyo (JP)

(*) Notice: Subject to any disclaimer, the term of this patent is extended or adjusted under 35 U.S.C. 154(b) by 301 days.

(21) Appl. No.: 14/002,765

(22) PCT Filed: Mar. 9, 2012

(86) PCT No.: PCT/JP2012/056082
§ 371 (c)(1),
(2), (4) Date: Sep. 3, 2013

(87) PCT Pub. No.: WO2012/128068
PCT Pub. Date: Sep. 27, 2012

(65) Prior Publication Data
US 2013/0335527 A1    Dec. 19, 2013

(30) Foreign Application Priority Data

Mar. 18, 2011 (JP) ................. 2011-061792

(51) Int. Cl.
*G06K 9/36* (2006.01)
*G06K 9/46* (2006.01)
(Continued)

(52) U.S. Cl.
CPC ......... *H04N 13/0048* (2013.01); *H04N 19/159* (2014.11); *H04N 19/176* (2014.11); *H04N 19/52* (2014.11); *H04N 19/597* (2014.11); *H04N 19/70* (2014.11)

(58) Field of Classification Search
None
See application file for complete search history.

(56) References Cited

U.S. PATENT DOCUMENTS 7,671,894 B2 * 3/2010 Yea .................. H04N 7/181
                                                348/218.1
9,113,196 B2 * 8/2015 Sung ................ H04N 21/235
(Continued)

FOREIGN PATENT DOCUMENTS

JP   2010-222819 A   9/2010
JP   2010-233135 A   10/2010
(Continued)

OTHER PUBLICATIONS

International Search Report issued Jun. 12, 2012 in PCT/JP2012/056082.
(Continued)

*Primary Examiner* — Christopher S Kelley
*Assistant Examiner* — Rebecca Volentine
(74) *Attorney, Agent, or Firm* — Oblon, McClelland, Maier & Neustadt, L.L.P.

(57) ABSTRACT

The present technique relates to an image processing device, an image processing method and a program which can calculate a vector which is precisely predicted as a predicted motion vector of a disparity vector. A predicted motion vector generation unit 243 generates a predicted motion vector of a disparity vector which represents a disparity of a target block of an operation target of a viewpoint #2 color image C#2 different from a point of view #1 with respect to a color image C#1 of the point of view #1, from a disparity information image D#2 of the point of view #2 which has disparity information related to a disparity of each pixel of the color image C#2 of the point of view #2 as a pixel value according to a depth information use prediction standard. The present invention is applicable to, for example, generate a predicted motion vector of a disparity vector used to generate a predicted image upon encoding or decoding of a plurality of viewpoint images.

10 Claims, 47 Drawing Sheets

(51) Int. Cl.

| | | |
|---|---|---|
| H04N 15/00 | (2006.01) | |
| H04N 13/00 | (2006.01) | |
| H04B 1/66 | (2006.01) | |
| H04N 7/12 | (2006.01) | |
| H04N 11/02 | (2006.01) | |
| H04N 11/04 | (2006.01) | |
| H04N 19/597 | (2014.01) | |
| H04N 19/52 | (2014.01) | |
| H04N 19/159 | (2014.01) | |
| H04N 19/176 | (2014.01) | |
| H04N 19/70 | (2014.01) | |

(56) References Cited

U.S. PATENT DOCUMENTS

| | | | | |
|---|---|---|---|---|
| 2007/0064800 A1* | 3/2007 | Ha | ............. | H04N 13/0048 375/240.12 |
| 2007/0104276 A1* | 5/2007 | Ha | ............. | H04N 19/597 375/240.16 |
| 2008/0170618 A1* | 7/2008 | Choi | ............. | H04N 19/597 375/240.16 |
| 2008/0285654 A1* | 11/2008 | Cai | ............. | H04N 19/597 375/240.16 |
| 2009/0010323 A1* | 1/2009 | Su | ............. | H04N 19/00769 375/240.01 |
| 2009/0022222 A1* | 1/2009 | He | ............. | H04N 19/597 375/240.12 |
| 2010/0166074 A1* | 7/2010 | Ho | ............. | H04N 13/0059 375/240.16 |
| 2011/0012994 A1* | 1/2011 | Park | ............. | H04N 21/234327 348/43 |
| 2011/0044550 A1* | 2/2011 | Tian | ............. | H04N 19/597 382/238 |
| 2011/0069760 A1* | 3/2011 | Lee | ............. | G06T 7/408 375/240.16 |
| 2011/0211638 A1* | 9/2011 | Sohn | ............. | H04N 19/56 375/240.16 |
| 2012/0200669 A1* | 8/2012 | Lai | ............. | G06T 5/002 348/43 |

FOREIGN PATENT DOCUMENTS

| | | |
|---|---|---|
| JP | 2012-80242 A | 4/2012 |
| WO | WO 2009/131688 A2 | 10/2009 |
| WO | WO 2010/064396 A1 | 6/2010 |

OTHER PUBLICATIONS

Tadashi Uchiumi et al., "International Organisation for Standardisation, Organisation Internationale de Normalisation, ISO/IEC JTC1/SC29/WG11, Coding of Moving Pictures and Audio", ISO/IEC JTC1/SC29/WG11, MPEG2010/M18367, Oct. 2010, 3 pages.

Shinya. Shimizu et al., "Efficient Multi-view Video Coding using Multi-view Depth Map", The Journal of the Institute of Image Information and Television Engineers, vol. 63, No. 4, Apr. 1, 2009, pp. 524 to 532 and English Translation 15 pages.

Office Action issued Dec. 15, 2015 in Japanese Patent Application No. 2013-505884 (with English Translation).

* cited by examiner

FIG. 17

| NUMBER OF BLOCKS OF MATCHING REFERENCE INDICES | NUMBER OF BLOCKS HAVING SAD EXCEEDING THRESHOLD | VECTOR PREDICTION OPERATION |
|---|---|---|
| 0 | — | CALCULATE PMV BY MEANS OF DISPARITY INFORMATION USE PREDICTOR |
| 1 | 0 | SET DISPARITY VECTOR OF BLOCK OF MATCHING REFERENCE INDEX AS PMV (MVC) |
| 1 | 1 | CALCULATE PMV BY MEANS OF DISPARITY INFORMATION USE PREDICTOR |
| 2 | 0 | CALCULATE PMV BY MEANS OF MEDIAN PREDICTOR (MVC) |
| 2 | 1 | CALCULATE PMV BY MEANS OF DISPARITY INFORMATION USE PREDICTOR |
| 2 | 2 | CALCULATE PMV BY MEANS OF DISPARITY INFORMATION USE PREDICTOR |
| 3 | 0 | CALCULATE PMV BY MEANS OF MEDIAN PREDICTOR (MVC) |
| 3 | 1 | CALCULATE PMV BY MEANS OF MEDIAN PREDICTOR (MVC) |
| 3 | 2 | CALCULATE PMV BY MEANS OF DISPARITY INFORMATION USE PREDICTOR |
| 3 | 3 | CALCULATE PMV BY MEANS OF DISPARITY INFORMATION USE PREDICTOR |

FIG. 35

| | C | Descriptor |
|---|---|---|
| mb_pred( mb_type ) { | | |
|   if( MbPartPredMode( mb_type, 0 ) == Intra_4x4 \|\| | | |
|     MbPartPredMode( mb_type, 0 ) == Intra_8x8 \|\| | | |
|     MbPartPredMode( mb_type, 0 ) == Intra_16x16 ) { | | |
|     if( MbPartPredMode( mb_type, 0 ) == Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     if( MbPartPredMode( mb_type, 0 ) == Intra_8x8 ) | | |
|       for( luma8x8BlkIdx=0; luma8x8BlkIdx<4; luma8x8BlkIdx++ ) { | | |
|         prev_intra8x8_pred_mode_flag[ luma8x8BlkIdx ] | 2 | u(1) \| ae(v) |
|         if( !prev_intra8x8_pred_mode_flag[ luma8x8BlkIdx ] ) | | |
|           rem_intra8x8_pred_mode[ luma8x8BlkIdx ] | 2 | u(3) \| ae(v) |
|       } | | |
|     if( ChromaArrayType == 1 \|\| ChromaArrayType == 2 ) | | |
|       intra_chroma_pred_mode | 2 | ue(v) \| ae(v) |
|   } else if( MbPartPredMode( mb_type, 0 ) != Direct ) { | | |
| ←   for( mbPartIdx = 0; mbPartIdx < NumMbPart( mb_type ); mbPartIdx++) | | |
|     if( ( num_ref_idx_l0_active_minus1 > 0 \|\| | | |
|       mb_field_decoding_flag != field_pic_flag ) && | | |
|       MbPartPredMode( mb_type, mbPartIdx ) != Pred_L1 ) | | |
|       ref_idx_l0[ mbPartIdx ] | 2 | te(v) \| ae(v) |
|   for( mbPartIdx = 0; mbPartIdx < NumMbPart( mb_type ); mbPartIdx++) | | |
|     if( ( num_ref_idx_l1_active_minus1 > 0 \|\| | | |
|       mb_field_decoding_flag != field_pic_flag ) && | | |
|       MbPartPredMode( mb_type, mbPartIdx ) != Pred_L0 ) | | |
|       ref_idx_l1[ mbPartIdx ] | 2 | te(v) \| ae(v) |
|   for( mbPartIdx = 0; mbPartIdx < NumMbPart( mb_type ); mbPartIdx++) | | |
|     if( MbPartPredMode ( mb_type, mbPartIdx ) != Pred_L1 ) | | |
|       for( compIdx = 0; compIdx < 2; compIdx++ ) | | |
|         mvd_l0[ mbPartIdx ][ 0 ][ compIdx ] | 2 | se(v) \| ae(v) |
|   for( mbPartIdx = 0; mbPartIdx < NumMbPart( mb_type ); mbPartIdx++) | | |
|     if( MbPartPredMode( mb_type, mbPartIdx ) != Pred_L0 ) | | |
|       for( compIdx = 0; compIdx < 2; compIdx++ ) | | |
|         mvd_l1[ mbPartIdx ][ 0 ][ compIdx ] | 2 | se(v) \| ae(v) |
| } | | |

INFORMATION OF PREDICTOR FLAG

```
if(slice_type == P || slice_type == B) {
    mv_pred_mode_l0
}
if(slice_type == B) {
    mv_pred_mode_l1
}
```

FIG. 36

PART OF mb_pred(mb_type)

| |
|---|
| for(mbPartIdx = 0; mbPartIdx < NumMbPart(mb_type); mbPartIdx++) |
| if((num_ref_idx_l0_active_minus1 > 0 \|\| mb_field_decoding_flag != field_pic_flag) && MbPartPredMode(mb_type, mbPartIdx) != Pred_L1) |
| ref_idx_l0[ mbPartIdx ] |
| for(mbPartIdx = 0; mbPartIdx < NumMbPart(mb_type); mbPartIdx++) |
| if((num_ref_idx_l0_active_minus1 > 0 \|\| mb_field_decoding_flag != field_pic_flag) && MbPartPredMode(mb_type, mbPartIdx) != Pred_L0) |
| ref_idx_l1[ mbPartIdx ] |
| for(mbPartIdx = 0; mbPartIdx < NumMbPart(mb_type); mbPartIdx++) |
| if( MbPartPredMode( mb_type, mbPartIdx) != Pred_L1) |
| for( compIdx = 0; compIdx < 2; compIdx++) |
| mvd_l0[ mbPartIdx ][ 0 ][ compIdx ] |
| for(mbPartIdx = 0; mbPartIdx < NumMbPart(mb_type); mbPartIdx++) |
| if( MbPartPredMode( mb_type, mbPartIdx) != Pred_L0) |
| for( compIdx = 0; compIdx < 2; compIdx++) |
| mvb_l1[ mbPartIdx ][ 0 ][ compIdx ] |

↑

| |
|---|
| for(mbPartIdx = 0; mbPartIdx < NumMbPart(mb_type); mbPartIdx++) |
| if((num_ref_idx_l0_active_minus1 > 0 \|\| mb_field_decoding_flag != field_pic_flag) && MbPartPredMode(mb_type, mbPartIdx) != Pred_L1) |
| ref_idx_l0[ mbPartIdx ] |
| for(mbPartIdx = 0; mbPartIdx < NumMbPart(mb_type); mbPartIdx++) |
| if((num_ref_idx_l0_active_minus1 > 0 \|\| mb_field_decoding_flag != field_pic_flag) && MbPartPredMode(mb_type, mbPartIdx) != Pred_L0) |
| ref_idx_l1[ mbPartIdx ] |
| for(mbPartIdx = 0; mbPartIdx < NumMbPart(mb_type); mbPartIdx++) |
| if( MbPartPredMode( mb_type, mbPartIdx) != Pred_L1) |
| mv_pred_mode_l0[ mbPartIdx ] |
| for(mbPartIdx = 0; mbPartIdx < NumMbPart(mb_type); mbPartIdx++) |
| if( MbPartPredMode( mb_type, mbPartIdx) != Pred_L0) |
| mv_pred_mode_l1[ mbPartIdx ] |
| for(mbPartIdx = 0; mbPartIdx < NumMbPart(mb_type); mbPartIdx++) |
| if( MbPartPredMode( mb_type, mbPartIdx) != Pred_L1) |
| for( compIdx = 0; compIdx < 2; compIdx++) |
| mvd_l0[ mbPartIdx ][ 0 ][ compIdx ] |
| for(mbPartIdx = 0; mbPartIdx < NumMbPart(mb_type); mbPartIdx++) |
| if( MbPartPredMode( mb_type, mbPartIdx) != Pred_L0) |
| for( compIdx = 0; compIdx < 2; compIdx++) |
| mvb_l1[ mbPartIdx ][ 0 ][ compIdx ] |

INFORMATION OF PREDICTOR FLAG

FIG. 37    PART OF sub_mb_pred(mb_type)

IMAGE PROCESSING DEVICE, IMAGE PROCESSING METHOD, AND PROGRAM

TECHNICAL FIELD

The present technique relates to an image processing device, an image processing method and a program, and, more particularly, an image processing device, an image processing method and a program which can calculate a precisely predicted motion vector as a predicted motion vector of a disparity vector which represents a disparity of a given viewpoint image with respect to another viewpoint image.

BACKGROUND ART

An encoding standard of encoding a plurality of viewpoint images such 3D (Dimension) images includes, for example, a MVC (Multiview Video Coding) standard obtained by extending an AVC (Advanced Video Coding) (H.264/AVC) standard.

According to the MVC standard, an encoding target image is a color image which has as a pixel value a value corresponding to light from a subject, and each of a plurality of viewpoint color images is encoded also referring to other viewpoint color images in addition to the this viewpoint color image where necessary.

That is, according to the MVC standard, one viewpoint color image among a plurality of viewpoint color images is a base view image, and the other viewpoint color images are dependent view images.

Further, the base view color image is encoded referring only to this base view image, and the dependent view color image is encoded also referring to other view images in addition to this dependent view image where necessary.

That is, the dependent view color image is subjected to disparity prediction of generating a predicted image referring to other view color images where necessary, and is encoded using this predicted image.

Hereinafter, a given viewpoint #1 color image is a base view image, and another viewpoint #2 color image is a dependent view image.

According to the MVC standard, when the viewpoint #2 color image is subjected to disparity prediction referring to the viewpoint #1 color image and is encoded (subjected to predictive encoding) using a predicted image obtained by this disparity prediction, a disparity vector which represents a disparity of an encoding target of the viewpoint #2 color image, that is, for example, a target block as a macro block with respect to the viewpoint #1 color image is detected.

Further, according to the MVC standard, a predicted motion vector obtained by predicting a disparity vector of a target block is calculated, and a residual vector which is a difference between the disparity vector and the predicted motion vector is encoded.

According to the MVC standard, as the bit rate of the residual vector tends to be higher when the residual vector is greater, and therefore when the degree of the residual vector is less, that is, when prediction precision of a predicted motion vector is better (the predicted motion vector is more similar to a disparity vector), it is possible to improve encoding efficiency.

By the way, in recent years, as an encoding standard which adopts a disparity information image (depth image) which includes disparity information related to a disparity per pixel of each viewpoint color image as a pixel value in addition to each viewpoint color image as a plurality of viewpoint images, and encodes each viewpoint color image and each viewpoint disparity information image, for example, a standard such as MPEG3DV standard is defined.

According to the MPEG3DV standard, each viewpoint color image and each viewpoint disparity information image are principally encoded in the same way as the MVC standard.

According to the MVC standard, although a predicted motion vector (of a disparity vector) of a target block is calculated from disparity vectors of blocks in a surrounding of a target block of a color image, when the target block is at a boundary portion of a foreground object, a foreground block, a background block and a block of a portion in which occlusion occurs exist as surrounding blocks of this target block, and therefore the predicted motion vector of the target block calculated from these blocks cause deterioration of prediction precision in some cases.

Hence, a method of selecting one of disparity vectors of surrounding blocks of the target block in a color image as a predicted motion vector of the target block based on a disparity information image is proposed (see, for example, Non-Patent Document 1).

CITATION LIST

Non-Patent Document

Non-Patent Document 1: Tadashi Uchiumi, Makoto Ohtsu, Junsei Sato, Yoshiya Yamamoto, Atsutoshi Shimeno, "A Method of Disparity Vector Prediction using Depth Map", NTERNATIONAL ORGANISATION FOR STANDARDISATION, ORGANISATION INTERNATIONALE DE NORMALISATION, ISO/IEC JTC1/SC29/WG11, CODING OF MOVING PICTURES AND AUDIO, ISO/IEC JTC1/SC29/WG11, MPEG2010/M18367, October 2010, Guangzhou, CN

SUMMARY OF THE INVENTION

Problems to be Solved by the Invention

As described above, selecting one of disparity vectors of blocks in a surrounding of a target block in a color image as a predicted motion vector of the target block based on a disparity information image makes it difficult to obtain a predicted motion vector of good prediction performance in some cases.

In light of this situation, the present technique can calculate a vector which is precisely predicted as a predicted motion vector of a disparity vector.

Solutions to Problems

An image processing device or a program according to one aspect of the present technique is an image processing device or a program which causes a computer to function as the image processing device which has a predicted motion vector generation unit which generates a predicted motion vector of a disparity vector which represents a disparity of a target block of an operation target of a color image of a second viewpoint different from a first viewpoint with respect to a color image of the first viewpoint, from a depth image of the second viewpoint which includes depth information related to a disparity of each pixel of the color image of the second viewpoint as a pixel value according to a depth information use prediction standard.

An image processing method according to one aspect of the present technique is an image processing method includes the step of generating a predicted motion vector of a disparity vector which represents a disparity of a target block of an operation target of a color image of a second viewpoint different from a first viewpoint with respect to a color image of the first viewpoint, from a depth image of the second viewpoint which includes depth information related to a disparity of each pixel of the color image of the second viewpoint as a pixel value according to a depth information use prediction standard.

According to the above one aspect, a predicted motion vector of a disparity vector which represents a disparity of a target block of an operation target of a color image of a second viewpoint different from a first viewpoint with respect to a color image of the first viewpoint, is generated from a depth image of the second viewpoint which includes depth information related to a disparity of each pixel of the color image of the second viewpoint as a pixel value according to a depth information use prediction standard.

In addition, an image processing device may be an independent device or an internal block which forms one device.

A program can be provided by being transmitted through a transmission medium or being recorded in a recording medium.

Effects of the Invention

The present technique can calculate a vector which is precisely predicted as a predicted motion vector of a disparity vector.

BRIEF DESCRIPTION OF DRAWINGS

FIG. 17 is a view for explaining a vector prediction operation.

FIG. 35 is a view illustrating examples of predictor flags included in header information.

FIG. 36 is a view illustrating examples of predictor flags included in header information.

FIG. 37 is a view illustrating examples of predictor flags included in header information.

MODE FOR CARRYING OUT THE INVENTION

Explanation of Depth Image (Disparity Information Image) in this Description

Figure 44:
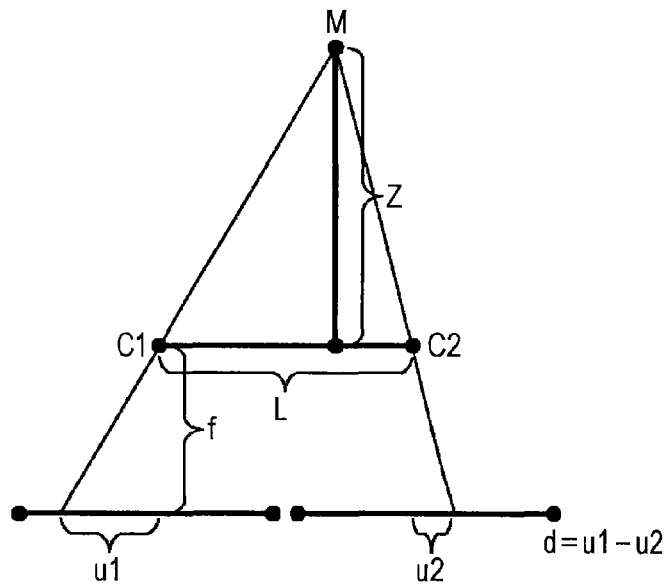
FIG. 44 is a view for explaining the disparity and the depth.

FIG. 44 is a view for explaining the disparity and the depth.

As illustrated in FIG. 44, when a color image of a subject M is captured by a camera c1 arranged at a position C1 and a camera c2 arranged at a position C2, a depth Z of the subject M which is a distance in a depth direction from the camera c1 (camera c2) is defined according to following equation (a).

$$Z=(L/d)\times f \quad (a)$$

In addition, L is a distance (hereinafter, referred to as an "inter-camera distance") between the position C1 and the position C2 in the horizontal direction. Further, d is a value obtained by subtracting a distance u2 between the position of the subject M on the color image captured by the camera c2 and a center of the color image in the horizontal direction from a distance u1 between the position of the subject M on the color image captured by the camera c1 and the center of the color image in the horizontal direction, that is, a disparity. Furthermore, f is a focal distance of the camera c1 and, in equation (a), the focal distances of the camera c1 and the camera c2 are the same.

As indicated in equation (a), the disparity d and the depth Z can be uniquely transformed. Hence, in this description, an image which represents the disparity d and an image which represents the depth Z of two viewpoint color images captured by the camera c1 and the camera c2 are collectively referred to as depth images (disparity information images).

In addition, the depth image (disparity information image) only needs to be an image which represents the disparity d or the depth Z and, as a pixel value of the depth image (disparity information image), a value obtained by normalizing the disparity d or a value obtained by normalizing a reciprocal 1/Z of the depth Z can be taken instead of the disparity d or the depth Z itself.

A value I obtained by normalizing the disparity d at 8 bits (0 to 255) can be calculated according to following equation (b). In addition, the number of normalization bits of the disparity d is not limited to 8 bits, and can be other number of bits such as 10 bits or 12 bits.

[Mathematical Formula 4]

$$I = \frac{255 \times (d - D_{min})}{D_{max} - D_{min}} \quad (b)$$

In addition, in equation (b), $D_{max}$ is a maximum value of the disparity d, and $D_{min}$ is a minimum value of the disparity d.

The maximum value $D_{max}$ and the minimum value $D_{min}$ may be set in one screen unit or may be set in a plurality of screen units.

Further, a value y obtained by normalizing the reciprocal 1/Z of the depth Z at 8 bits (0 to 255) can be calculated according to following equation (c). In addition, the number of normalization bits of the reciprocal 1/Z of the depth Z is not limited to 8 bits, and can be other number of bits such as 10 bits or 12 bits.

[Mathematical Formula 5]

$$y = 255 \times \frac{\frac{1}{Z} - \frac{1}{Z_{far}}}{\frac{1}{Z_{near}} - \frac{1}{Z_{far}}} \quad (c)$$

In addition, in equation (c), $Z_{far}$ is a maximum value of the depth Z, and $Z_{near}$ is a minimum value of the depth Z. The maximum value $Z_{far}$ and the minimum value $Z_{near}$ may be set in one screen unit or may be set in a plurality of screen units.

Thus, in this description, taking into account that the disparity d and the depth Z can be uniquely transformed, an image which has as a pixel value the value I obtained by normalizing the disparity d and an image which has as a pixel value the value y obtained by normalizing the reciprocal 1/Z of the depth Z are collectively referred to as a "depth image (disparity information image)". Hereinafter, although a color format of the depth image (disparity information image) is YUV420 or YUV400, the color format may be other color formats.

In addition, when information of the value I or the value y is focused upon instead of a pixel value of the depth image (disparity information image), the value I or the value y is depth information (disparity information). Further, a map on which the value I or the value y is mapped is referred to as a "depth map".

Hereinafter, although an embodiment of the present technique will be described with reference to the drawings, a SAD minimum prediction standard (SAD minimum predictor) which is an example of a method of calculating a predicted motion vector of a disparity vector upon encoding and decoding targeting at a plurality of viewpoint color images and a disparity information image (depth image) will be described as preparation of a previous step.

[SAD Minimum Prediction Standard]

Figure 1:
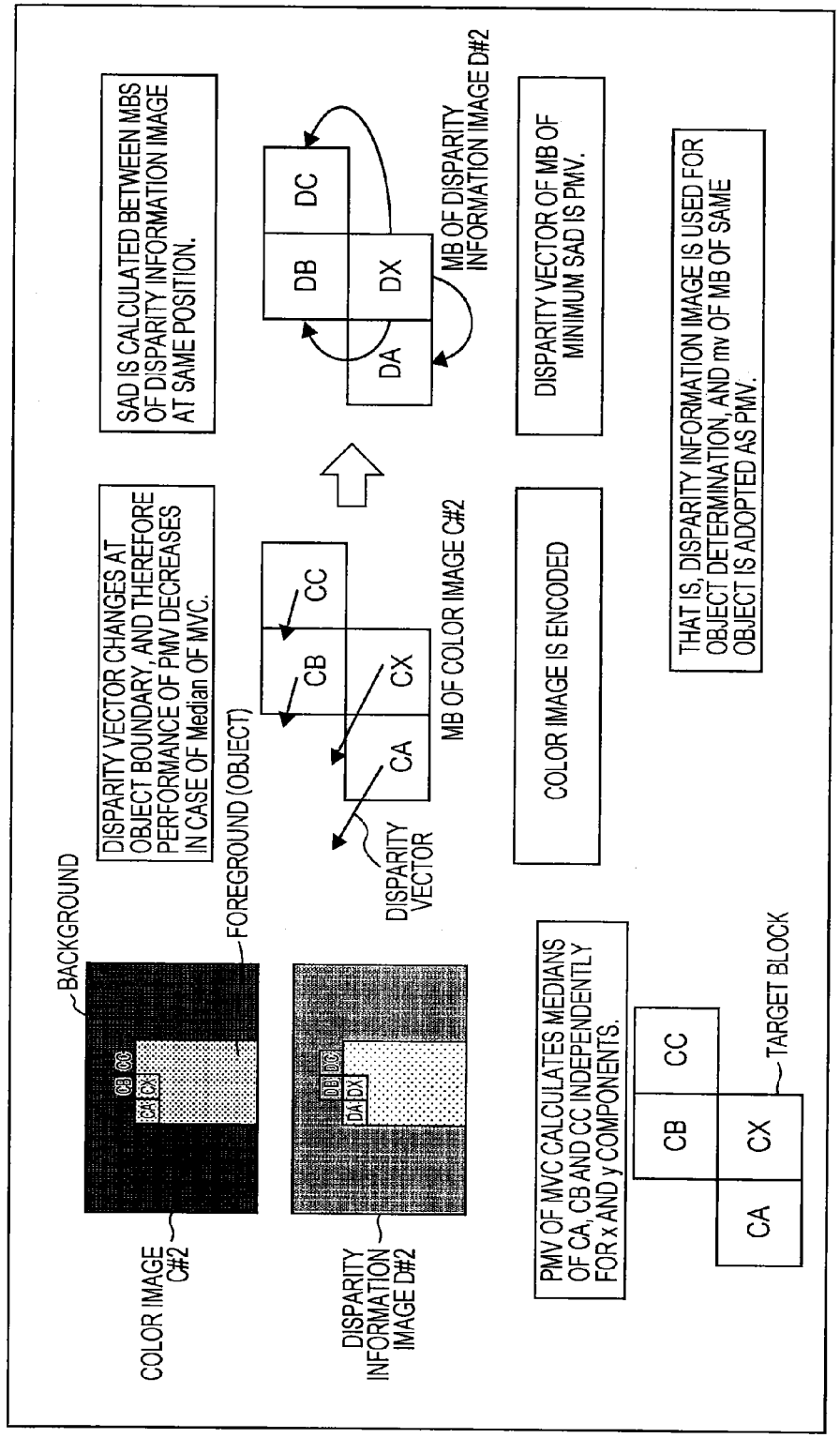
FIG. 1 is a view for explaining a SAD minimum prediction standard.

FIG. 1 is a view for explaining a SAD minimum prediction standard proposed as a method of calculating a predicted motion vector of a disparity vector by Non-Patent Document 1.

Now, there are a viewpoint #1 color image C#1 and a viewpoint #2 color image C#2 different from the viewpoint #1 which are two viewpoint color images, and a viewpoint #1 disparity information image D#1 and a viewpoint #2 disparity information image D#2 which are two viewpoint disparity information images as a plurality of viewpoint images.

In addition, a disparity information image D#i (where i=1, 2) is an image which includes disparity information (depth information) related to a disparity per pixel of a color image C#i as a pixel value.

Further, hereinafter, a predicted motion vector of a disparity vector used by disparity prediction of generating a predicted image of the viewpoint #2 color image C#2 using (a picture of) the viewpoint #1 color image C#1 as a reference picture among the viewpoint #1 color image C#1 and the viewpoint #2 color image C#2.

Now, a block (macro block) CX which includes a t-th picture which is a t-th (time t) picture from a head of the viewpoint #2 color image C#2 is a target block of an encoding (or decoding) target.

Meanwhile, a picture which includes a target block of the color image C#2, that is, the encoding target picture is also referred to as a "target picture".

According to the MVC standard, a predicted motion vector of (a disparity vector) of the target block CX of the color image C#2 is calculated from the disparity vector of a block encoded (decoded (in order of Raster scan order) among blocks (hereinafter, also referred to as "surrounding color blocks") in a surrounding of this target block CX.

That is, according to the MVC standard, by a vector prediction standard (hereinafter, also referred to as a "median prediction standard" or a "median predictor") of calculating as a predicted motion vector of the target block CX a median (center value) of disparity vectors of a surrounding color block CA neighboring on the left of the target block CX, a surrounding color block CB neighboring on an upper side and a surrounding color block CC neighboring on a diagonal upper right side, a predicted motion vector is calculated.

In addition, according to the median prediction standard, the median is calculated as the predicted motion vector of the target block CX independently for an x component and a y component.

Now, as illustrated in FIG. 1, a background and a rectangular foreground as an object which exists in front of the background are shown in the color image C#2, and the target block CX is a block at a boundary portion of the foreground.

That is, for example, the target block CX is a block neighboring on a right of an upper left block in the rectangular foreground.

In this case, the surrounding color block CA neighboring on the left of the target block CX is an upper left block in the rectangular foreground. Further, the surrounding color block CB neighboring on the upper side of the target block CX and the surrounding color block CC neighboring on the diagonal upper right side are background blocks.

In the color image C#2, disparities are comparatively and significantly different between the foreground and the background, and the target block CX of the foreground block and the surrounding color blocks CB and CC of the background blocks have significantly different disparity vectors.

Further, the target block CX and the surrounding color block CA of the foreground blocks have virtually the same disparity vectors.

Hence, in this case, by adopting the surrounding color block CA of the foreground block, it is possible to calculate a predicted motion vector which is precisely predicted as the predicted motion vector of the target block CX of the foreground block.

However, according to the median prediction standard (median predictor), the median of the disparity vectors of the surrounding color blocks CA, CB and CC is calculated as the predicted motion vector of the target block CX, and therefore the disparity vectors of the surrounding color blocks CB and CC which are background blocks the number of which is greater among the surrounding color blocks CA to CC are adopted as predicted motion vectors of the target block CX of the foreground block.

In this case, prediction precision of the predicted motion vector of the target block CX deteriorates.

Hence, according to the SAD minimum prediction standard (SAD minimum predictor), a SAD (Sum of Absolute Differences) of a same position block DX which is a block at the same position as that of the target block CX and the blocks DA, DB and DC neighboring on the left, the upper side and the diagonal upper right among blocks (also referred to as "surrounding disparity blocks" below) in the surrounding of this same position block DX is calculated.

Further, according to the SAD minimum prediction standard, a surrounding disparity block (also referred to as a "SAD minimum disparity block") which has a minimum SAD with the same position block DX among the surrounding disparity blocks (surrounding depth blocks) DA, DB and DC of the disparity information image D#2 is detected, and a disparity vector of the surrounding color block which is at the same position as the SAD minimum disparity block among the surrounding color blocks CA to CC of the color image C#2 is adopted as the predicted motion vector of the target block CX.

In the disparity information image D#2, the SAD of the same position block DX and the surrounding disparity blocks becomes small when, for example, the same position block DX and the surrounding disparity blocks are blocks of the same object, that is, blocks of a subject of no (a little) disparity.

In the disparity information image D#2 in FIG. 1, the same position block DX and the surrounding disparity block DA are foreground blocks, and the surrounding disparity blocks DB and DC are background blocks. Hence, the surrounding disparity block DA which is the same foreground block as the same position block DX among the surrounding disparity blocks. DA to DC is the SAD minimum disparity block which has a minimum SAD with the same position block DX.

As a result, according to the SAD minimum prediction standard, the disparity vector of the surrounding color block DA which is at the same position as that of the SAD minimum disparity block DA among the surrounding color blocks CA to CC of the color image C#2 is adopted as the predicted motion vector of the target block CX, so that it is possible to calculate a predicted motion vector which is precisely predicted.

As described above, according to the SAD minimum prediction standard, the surrounding color block CA which shows the same object as that of the target block CX among the surrounding color blocks CA to CC of the color image C#2 is detected (determined) using the disparity information image D#2, and the disparity vector of this surrounding color block CA is adopted as the predicted motion vector of the target block CX.

However, the SAD minimum prediction standard provides the same prediction precision (performance) as that of the median prediction standard, and provides poor prediction precision than that of the median prediction standard in some cases.

Figure 2:
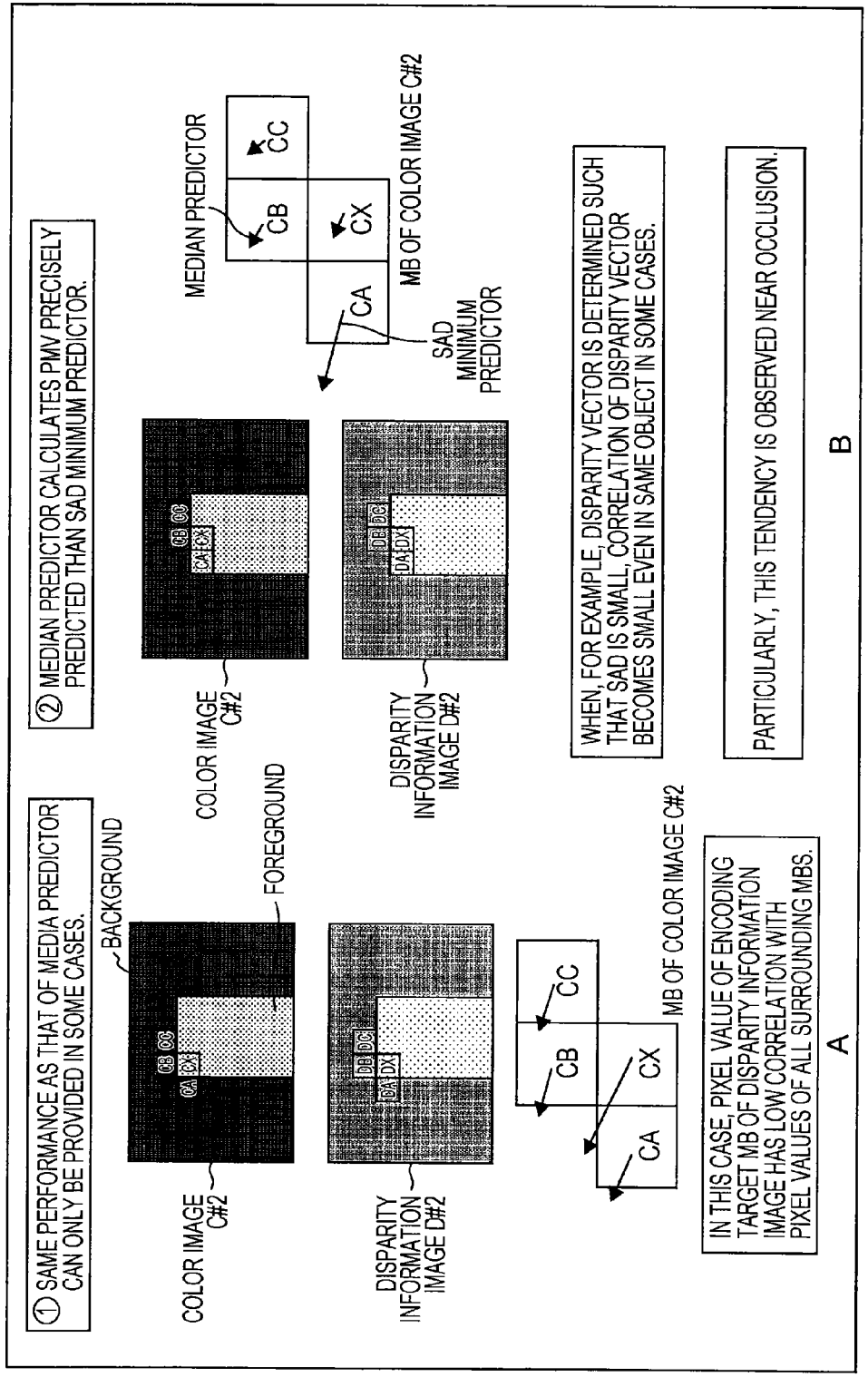
FIG. 2 is a view for explaining a SAD minimum prediction standard.

FIG. 2 is a view for explaining that the SAD minimum prediction standard (SAD minimum predictor) provides the same prediction precision as that of the median prediction standard and provides poor prediction precision than that of the median prediction standard (median predictor).

That is, FIG. 2A is a view for explaining that the SAD minimum prediction standard provides the same prediction precision as that of the median prediction standard.

Similar to FIG. 1, in FIG. 2A, a background and a rectangular foreground which is an object existing in front of this background are shown in the color image C#2.

Further, FIG. 2A illustrates that the target block CX is an upper left block of the rectangular foreground.

Hence, the surrounding color block CA neighboring on the left of the target block CX, the surrounding color block CB neighboring on the upper side and the surrounding color block CC neighboring on the diagonal upper right side are all background blocks.

As described above, when the target block CX is the foreground block and the surrounding color blocks CA to CC are background blocks, the disparity vector of the target block CX is significantly different from the disparity vectors of the surrounding color blocks CA to CC (low correlation)

Hence, even in case of the median prediction standard of calculating the median of the disparity vectors of the surrounding color blocks CA to CC as the predicted motion vector of the target block CX or the SAD minimum prediction standard of calculating the disparity vector of the surrounding color block at the same position as that of the SAD minimum disparity block of the disparity information image D#2, prediction precision of the predicted motion vector deteriorates.

FIG. 2B is a view for explaining that the SAD minimum prediction standard provides poor prediction precision as that of the median prediction standard.

Similar to FIG. 1, in FIG. 2B, a background and a rectangular foreground which is an object existing in front of this background are shown in the color image C#2.

Further, similar to FIG. 1, FIG. 2B illustrates that the target block CX is a block neighboring on the right of the upper left block of the rectangular foreground.

Hence, the surrounding color block CA neighboring on the left of the target block CX is the upper left block of the rectangular foreground, and the surrounding color block CB neighboring on the upper side and the surrounding color block CC neighboring on the diagonal upper right of the target block CX are background blocks.

As described above, when the target block CX and the surrounding color block CA are foreground blocks and the surrounding color blocks CB and CC are background blocks, as described with reference to FIG. 1, the surrounding disparity block DA of the surrounding disparity blocks DA to DC of the disparity information image D#2 is a SAD minimum disparity block and, according to the SAD minimum prediction standard, the disparity vector of the surrounding color block CA at the same position as that of the SAD minimum disparity block DA is adopted as the predicted motion vector of the target block CX.

However, as illustrated in FIG. 2B, when the surrounding color block CA neighboring on the left of the target block CX is the upper left block in the rectangular foreground (a block neighboring to a foreground boundary or a block including the boundary), predicted motion vectors of the target block CX and the surrounding color block CA which are the foreground blocks have significantly different vectors (uncorrelated (low correlated) vectors) due to an influence of occlusion.

That is, a block (macro block) of the color image C#2 is subjected to ME (Motion Estimation) (motion detection) using as a reference picture (a picture of) a viewpoint #1 color image C#1 different from, for example, the color image C#2 viewpoint #2, and a displaced vector which is a vector which represents displacement of a position with respect to a block (also referred to as a "corresponding block" below) which is an area which minimizes the SAD with the color image C#2 block in (the picture of) the color image C#1 which is a reference picture is detected as a disparity vector.

Hence, when an entire portion (texture) shown in the color image C#2 block is also shown in the color image C#1, a displaced vector which represents a position displacement from the same portion of the color image C#1 as the portion shown in the color image C#2 block is detected as a disparity vector.

However, at the foreground boundary portion in particular, occlusion, that is, a portion which is shown in the viewpoint #2 color image #2 but is not shown in the viewpoint #1 color image #1 (or a portion which is shown in the color image #1 but is not shown in the color image #2) is produced due to the influence of the disparity.

Hence, part of the (foreground) portion shown in the color image C#2 block is not shown in the color image C#1, in this case, the color image C#1 block which shows a portion different from the portion shown in the color image C#2 block becomes a corresponding block, and a vector which is significantly different from the disparity is detected as a disparity vector in some cases.

In FIG. 2B, in the surrounding color block CA at the foreground boundary, a disparity vector which is significantly different from the foreground disparity is detected due to the influence of occlusion.

As described above, although the disparity vector of the surrounding color block CA is adopted as the predicted motion vector of the target block CX according to the SAD minimum prediction standard, when the disparity vector of the surrounding color block CA is significantly different from the foreground disparity due to the influence of occlusion, the predicted motion vector calculated according to the median prediction standard provides better prediction precision in some cases.

In addition, what is described with reference to FIG. 2 may occur when the target block CX is a block at an upper left boundary portion of the foreground and, in addition when, for example, the target block is a block at an upper right boundary portion of the foreground.

Hence, the present technique adopts a disparity information use prediction standard of generating a predicted motion vector of a target block from a disparity information image as a vector prediction standard of generating a predicted motion vector.

According to the disparity information use prediction standard (depth information use prediction standard), a predicted motion vector of a target block is generated from a disparity information image (depth image), so that it is possible to calculate a predicted motion vector which is precisely predicted on average.

Consequently, it is possible to adopt only the disparity information use prediction standard to generate a predicted motion vector.

Meanwhile, a method of adaptively switching between a plurality of vector prediction standards including the disparity information use prediction standard by adopting, for example, another vector prediction standard (the median prediction standard of) the MVC standard in addition to the disparity information use prediction standard, that is, a method of adopting as a predicted motion vector used for an operation of a target block a predicted motion vector estimated to be precisely predicted from predicted motion vectors generated according to the disparity information use prediction standard and the other vector prediction standards will be hereinafter described.

[Outline of Present Technique]

Figure 3:
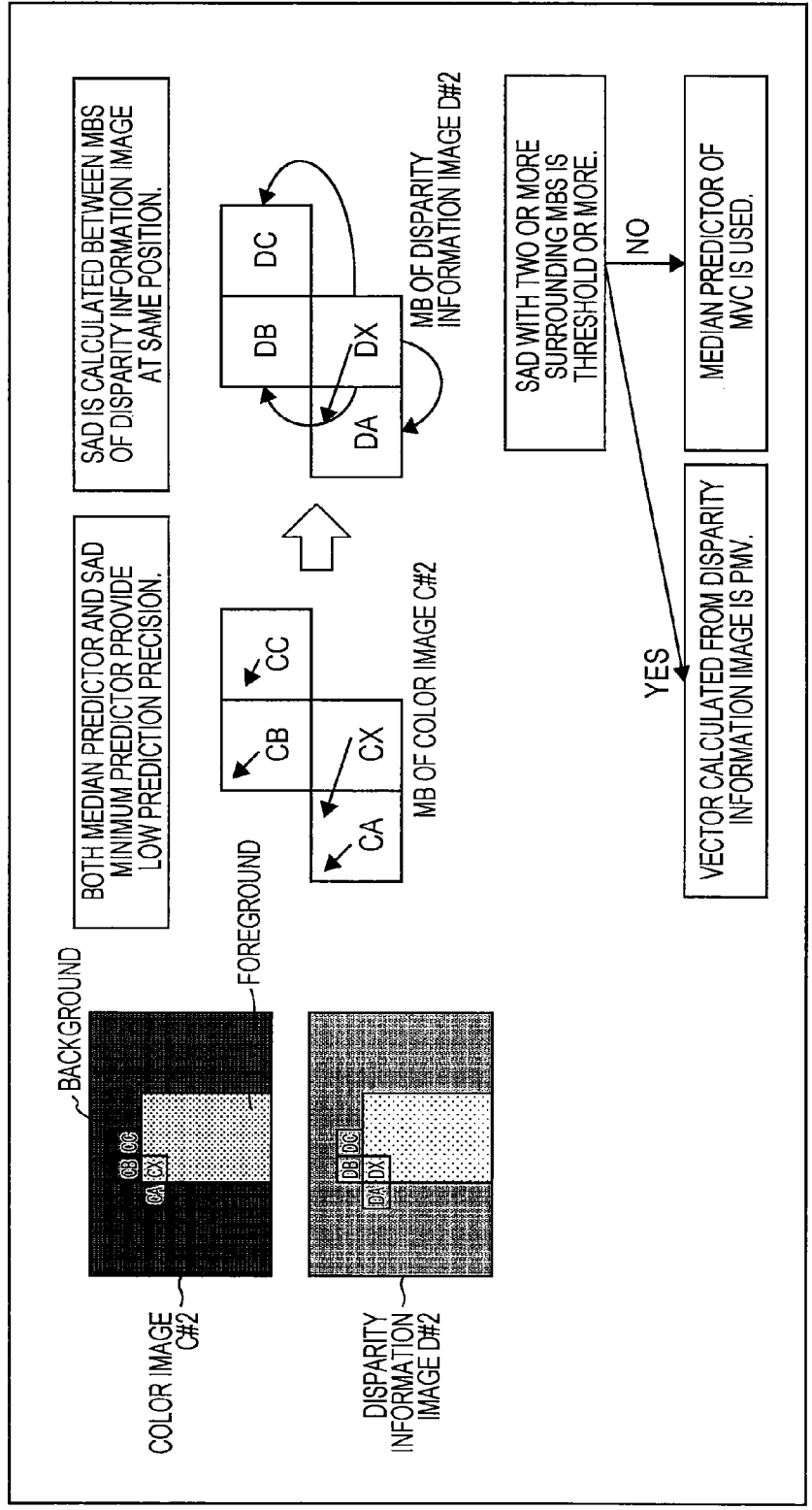
FIG. 3 is a view for explaining an outline of the present technique.

FIG. 3 is a view for explaining an outline of the present technique.

Similar to FIG. 2A, in FIG. 3, a background and a rectangular foreground which is an object existing in front of this background are shown in the color image C#2, and the color image C#2 target block CX is the upper left block of the rectangular foreground.

Hence, the surrounding color block CA neighboring on the left of the target block CX, the surrounding color block CB neighboring on the upper side and the surrounding color block CC neighboring on the diagonal upper right side are all background blocks.

As described above, when the target block CX is the foreground block and the surrounding color blocks CA to CC are background blocks, even the median prediction standard (median predictor) or the SAD minimum prediction standard (SAD minimum predictor) provides poor prediction precision of the predicted motion vector as described with reference to FIG. 2A.

Hence, according to the present technique, a SAD corresponding to differences between the same position block DX which is a block at the same position as that of the target block in the disparity information image D#2 and the surrounding disparity blocks DA, DB and DC neighboring on the left, the upper side and the diagonal upper right among blocks in a surrounding of this same position block DX is calculated.

Further, according to the present technique, a predicted motion vector which is estimated to be precisely predicted among a predicted motion vector generated according to the disparity information use prediction standard (disparity information use predictor) based on the SADs between the surrounding disparity blocks DA to DC of the disparity information image D#2 and the same position block DX, and a predicted motion vector generated according to another vector prediction standard such as the median prediction standard (median predictor) is generated as a predicted motion vector used for the operation of the target block CX.

That is, according to the present technique, the number of surrounding disparity blocks which have SADs with the same position block DX equal to or more than a predetermined threshold or more (or greater than a predetermined threshold) among the three surrounding disparity blocks of the surrounding disparity blocks DA to DC of the disparity information image D#2.

Meanwhile, based on the SAD of the surrounding disparity block and the same position block DX, it is possible to determine whether or not the same object is shown in the color image C#2 surrounding color block at the same position as that of this surrounding disparity block and the target block CX (the color image C#2 block at the same position as that of the same position block DX).

That is, an object different from that of the target block CX is estimated to be shown in the color image C#2 surrounding color block at the same position as that of the surrounding disparity block which has the SAD with the same position block DX equal to or more than a predetermined threshold or more among surrounding disparity blocks.

According to the present technique, when the number of surrounding disparity blocks which have SADs with the same position block DX equal to or more than a predetermined threshold is not two or more which is half or more, it is estimated that there is no problem in prediction precision of a predicted motion vector generated according to the median prediction standard, and a predicted motion vector of the target block CX is generated according to the median prediction standard.

Meanwhile, when the number of surrounding disparity blocks which have SADs with the same position block DX equal to or more than a predetermined threshold is two or more which is half or more, the predicted motion vector generated according to the disparity information use prediction standard is estimated to be more precisely predicted than the predicted motion vector generated according to the median prediction standard, and the predicted motion vector of the target block CX is generated according to the disparity information use prediction standard.

Meanwhile, according to the disparity information use prediction standard, the predicted motion vector of the color image C#2 target block is generated from the disparity information image D#2.

That is, according to the disparity information use prediction standard, a predicted motion vector is generated by performing predetermined calculation using disparity information which is a pixel value of a block (same position block) DX at the same position as that of the target block in the disparity information image D#2.

[Embodiment of Multi-View Image Encoder to which Present Technique is Applied]

Figure 4:
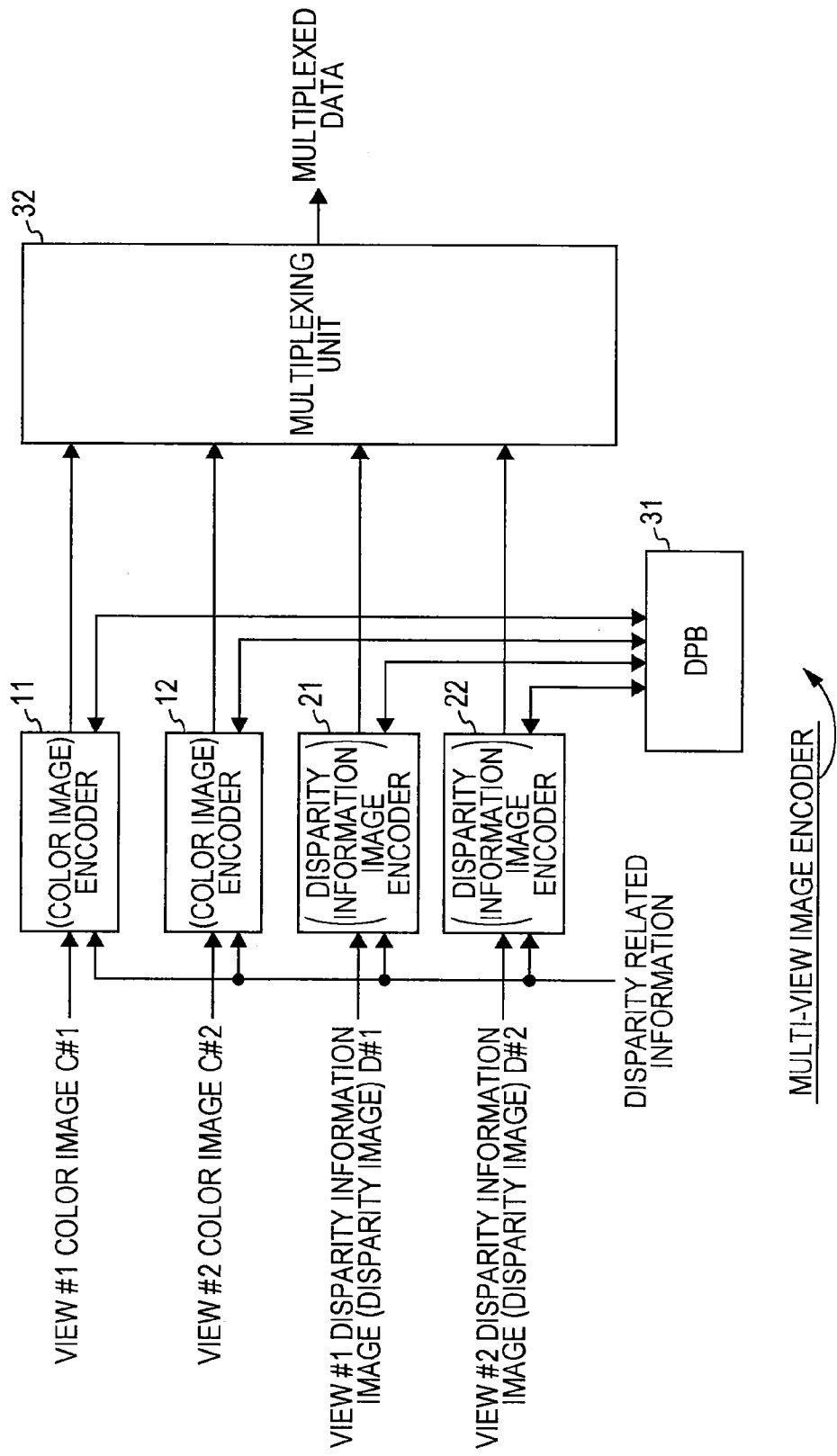
FIG. 4 is a block diagram illustrating an example structure of an embodiment of a multi-view image encoder to which the present technique is applied.

FIG. 4 is a block diagram illustrating an example structure of an embodiment of a multi-view image encoder to which the present technique is applied.

A multi-view image encoder in FIG. 4 is an encoder which encodes a plurality of viewpoint images using, for example, the MVC standard, and the same operations as those in the MVC standard will not be adequately described below.

In addition, the multi-view image encoder is not limited to the encoder which uses the MVC standard.

Hereinafter, the viewpoint #1 color image C#1 and the viewpoint #2 color image C#2 which are two view color images, and the viewpoint #1 disparity information image D#1 and the viewpoint #2 disparity information image D#2 which are two viewpoint disparity information images are adopted as a plurality of viewpoint images.

Further, the viewpoint #1 color image C#1 and the disparity information image D#1 are used as base view images, and the rest of the viewpoint #2 color image C#2 and the disparity information image D#2 are used as dependent view images.

In addition, three or more viewpoint color images and a disparity information image can be adopted as a plurality of viewpoint images, and one arbitrary viewpoint color image and the disparity information image among the three or more viewpoint images and the disparity information image can be used as base view images and the rest of the viewpoint color image and the disparity information image can be used as dependent view images.

In FIG. 4, the multi-view image encoder has encoders 11, 12, 21 and 22, a DPB 31 and a multiplexing unit 32.

The encoder 11 receives a supply of the viewpoint #1 color image C#1 and disparity related information (depth related information).

Meanwhile, the disparity related information (depth related information) is meta data of disparity information (depth information), and will be described in detail below.

The encoder 11 encodes the viewpoint #1 color image C#1 using disparity related information where necessary, and supplies resulting encoded data of the viewpoint #1 color image C#1 to the multiplexing unit 32.

The encoder 12 receives a supply of the viewpoint #2 color image C#2 and disparity related information.

The encoder 12 encodes the viewpoint #2 color image C#2 using disparity related information where necessary, and supplies resulting encoded data of the viewpoint #2 color image C#2 to the multiplexing unit 32.

The encoder 21 receives a supply of the viewpoint #1 disparity information image D#1 and disparity related information.

The encoder 21 encodes the viewpoint #1 disparity information image D#1 using disparity related information where necessary, and supplies resulting encoded data of the viewpoint #1 disparity information image D#1 to the multiplexing unit 32.

The encoder 22 receives a supply of the viewpoint #2 disparity information image D#2 and disparity related information.

The encoder 22 encodes the viewpoint #2 disparity information image D#2 using disparity related information where necessary, and supplies resulting encoded data of the viewpoint #2 disparity information image D#2 to the multiplexing unit 32.

The DPB 31 temporarily stores locally decoded images (decoded images) obtained by encoding encoding target images in the encoders 11, 12, 21 and 22 and locally decoding the images, as (candidates of) reference pictures which are referred to upon generation of a predicted image.

That is, the encoders 11, 12, 21 and 22 perform predictive encoding on the encoding target images. Hence, the encoders 11, 12, 21 and 22 encode the encoding target images and then locally decode the images to obtain decoded images to generate a predicted image used for predictive encoding.

The DPB 31 is a so-called common buffer which temporarily stores the decoded images obtained by encoders 11, 12, 21 and 22, and the encoders 11, 12, 21 and 22 select a reference picture which is referred to to encode the encoding target image, from the decoded images stored in the DPB 31. Further, the encoders 11, 12, 21 and 22 generate predicted images using reference pictures, and encode (perform predictive encoding) on the images using the predicted images.

The DPB 31 are shared by the encoders 11, 12, 21 and 22, so that the encoders 11, 12, 21 and 22 can also refer to the decoded images obtained by the other encoders in addition to the decoded image obtained by the encoders of interest.

The multiplexing unit 32 multiplexes the encoded data from the encoders 11, 12, 21 and 22, and outputs resulting multiplexed data.

The multiplexed data outputted from the multiplexing unit 32 is recorded in a recording medium which is not illustrated, or is transmitted through a transmission medium which is not illustrated.

[Multi-View Image Generation Device]

Figure 5:
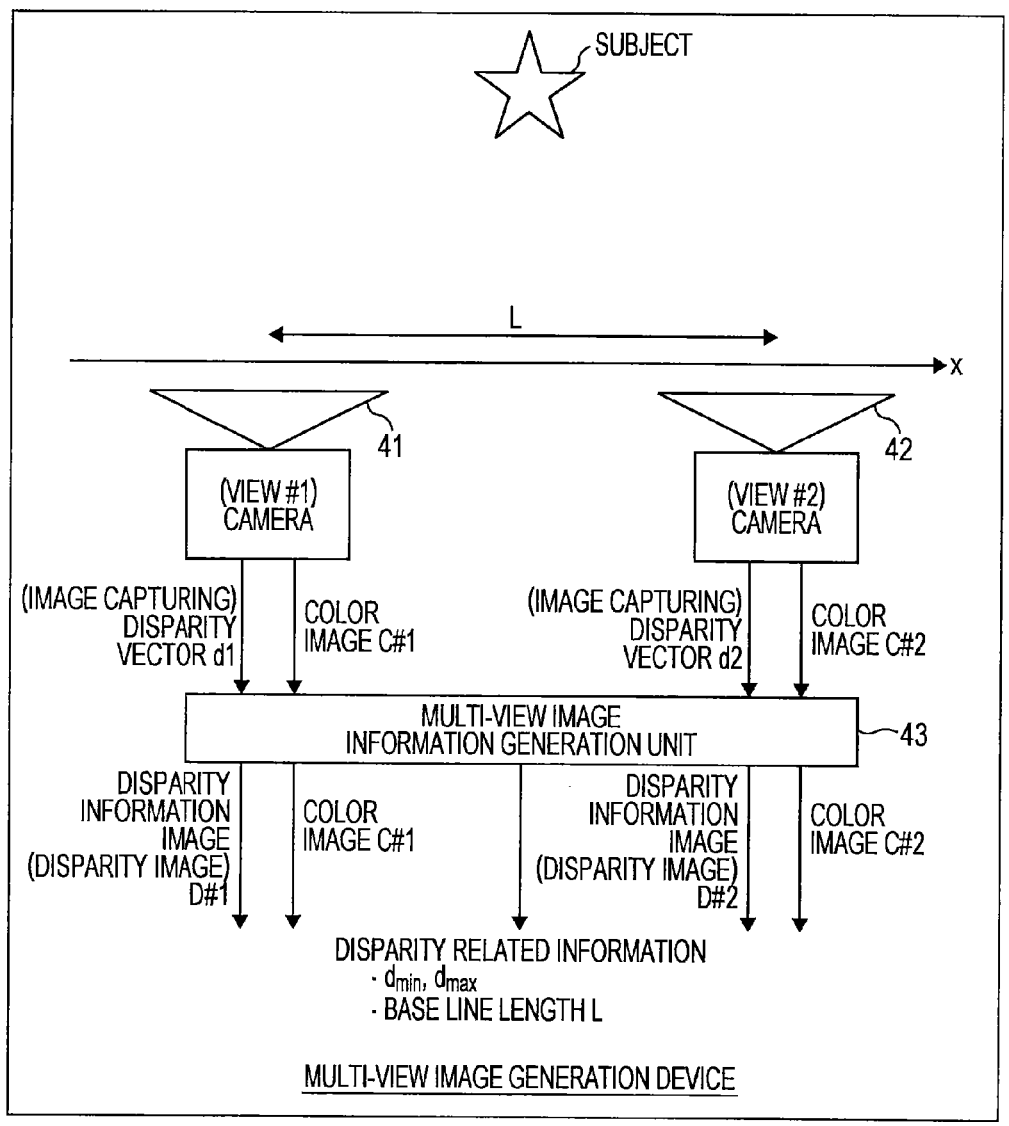
FIG. 5 is a block diagram illustrating an example structure of a multi-view image generation device which generates a plurality of viewpoint images as encoding targets in the multi-view image encoder.

FIG. 5 is a block diagram illustrating an example structure of a multi-view image generation device which generates a plurality of viewpoint images as encoding targets in the multi-view image encoder in FIG. 4.

In the multi-view image generation device, two cameras 41 and 42 are installed at positions at which different viewpoint color images can be captured to capture a plurality of viewpoint images, that is, for example, two viewpoint images.

Hereinafter, in the present embodiment, for ease of description, the cameras 41 and 42 are arranged at different positions on a line on a given horizontal plane with an optical axis directed in a direction vertical to this line.

The camera 41 captures an image of a subject at a position at which the camera 41 is arranged, and outputs the color image C#1 which is a moving image.

Further, the camera 41 outputs a disparity vector d1 of each pixel of the color image C#1 which represents a disparity with respect to a reference viewpoint based on a position of the camera 42 which is another one arbitrary camera as the reference viewpoint.

The camera 42 captures an image of a subject at a position at which the camera 42 is arranged, and outputs the color image C#2 which is a moving image.

Further, the camera 42 outputs a disparity vector d2 of each pixel of the color image C#2 which represents a disparity with respect to a reference viewpoint based on a position of the camera 41 which is another one arbitrary camera as the reference viewpoint.

Meanwhile, when a two-dimensional plane in which a lateral (horizontal) direction of a color image is an x axis and a longitudinal (vertical) direction is a y axis is referred to a color image plane, the cameras 41 and 42 are arranged on a line on the plane (horizontal plane) orthogonal to the color image plane. Consequently, the disparity vectors d1 and d2 are vectors a y component of which is 0 and an x component of which is a value corresponding to, for example, a positional relationship between the cameras 41 and 42 in the horizontal direction.

In addition, the disparity vectors (disparity) d1 and d2 outputted from the cameras 41 and 42 are also referred to as "image capturing disparity vectors d1 and d2" to distinguish from a disparity vector which represents a disparity calculated by ME using the color images C#1 and C#2.

The color image C#1 and the image capturing disparity vector d1 outputted from the camera 41, and the color image C#2 and the image capturing disparity vector d2 outputted from the camera 42 are supplied to the multi-view image information generation unit 43.

The multi-view image information generation unit 43 outputs the color image C#1 from the cameras 41 and 42 as is.

Further, the multi-view image information generation unit 43 calculates disparity information related to a disparity of each pixel of the color image #1 from the image capturing disparity vector d1 from the camera 41, and generates and outputs the disparity information image D#1 which has this disparity information as a pixel value.

Furthermore, the multi-view image information generation unit 43 calculates disparity information related to a disparity of each pixel of the color image #2 from the image capturing disparity vector d2 from the camera 42, and generates and outputs the disparity information image D#2 which has this disparity information as a pixel value.

As described above, disparity information (depth information) includes, for example, a disparity value (value I) which is a value corresponding to an image capturing disparity vector or the value y obtained by normalizing the depth Z which represents a distance (depth) to the subject Now, the pixel value of the disparity information image takes, for example, an integer value of 0 to 255 represented by 8 bits. Further, (the x component of) the image capturing disparity vector is represented by d, and a maximum value and a minimum value of (the x component of) the image capturing disparity vector (in, for example, a picture or a moving image as one content) are represented as dmax and dmin.

In this case, a disparity value v (value I) is calculated according to, for example, equation (1) as described above using (the x component of) the image capturing vector d and the maximum value dmax ($D_{max}$) and the minimum value dmin ($D_{min}$) of the image capturing disparity vector d.

$$v=255\times(d-d\text{min})/(d\text{max}-d\text{min}) \tag{1}$$

In addition, the disparity value v in equation (1) can be transformed into (the x component of) the image capturing disparity vector d according to equation (2).

$$d=v\times(d\text{max}-d\text{min})/255+d\text{min} \tag{2}$$

Further, the depth Z represents a distance to the subject from the line on which the cameras 41 and 42 are arranged.

As the camera 41 (similar to the camera 42), when a base line length which is a distance (a distance to the reference viewpoint) between the camera 41 and the camera 42 arranged on the line is represented as L and the focal distance of the camera 41 is represented as f, the depth Z can be calculated according to equation (3) using (the x component of) the image capturing disparity vector d (d1).

$$Z=(L/d)\times f \quad (3)$$

The disparity value v and the depth Z which are disparity information can be mutually transformed according to equations (1) to (3), and are equivalent information.

Hereinafter, a disparity information image (depth image) which includes the disparity value v as a pixel value is also referred to a "disparity image", and an image which includes the value y obtained by normalizing the depth Z as a pixel value is also referred to as a "depth image".

In addition, hereinafter, although, for example, a disparity image among a disparity image and a depth image is used as a disparity information image, a depth image can also be used as a disparity information image.

The multi-view image information generation unit 43 outputs disparity related information in addition to the above color images #1 and #2 and disparity images D#1 and #2.

That is, the multi-view image information generation unit 43 receives from an outside a supply of the base line length L which is a distance between the cameras 41 and 42 (a distance between the cameras 41 and 42, and the reference viewpoint), and the focal distance f.

The multi-view image information generation unit 43 detects the maximum value dmax and the minimum value dmin of (the x component of) the image capturing disparity vector d for the image capturing disparity vector d1 from the camera 41 and the image capturing disparity vector d2 from the camera 41.

Further, the multi-view image information generation unit 43 outputs the maximum value dmax and the minimum value dmin of the image capturing disparity vector d, the base line length L and the focal distance f as disparity related information.

The color images C#1 and C#2 outputted from the multi-view image information generation unit 43, the disparity images D#1 and D#2 and the disparity related information are supplied to the multi-view image encoder in FIG. 4.

In addition, although the cameras 41 and 42 are arranged on the line on the same plane as and orthogonal to the color image plane and the image capturing disparity vector d (d1 and d2) is a vector the y component of which is 0 for ease of description, the cameras 41 and 42 can be arranged on the plane different from and orthogonal to the color image plane. In this case, the image capturing disparity vector d is a vector the x component and the y component of which take values other than 0.

[Outline of MVC Standard]

Figure 6:
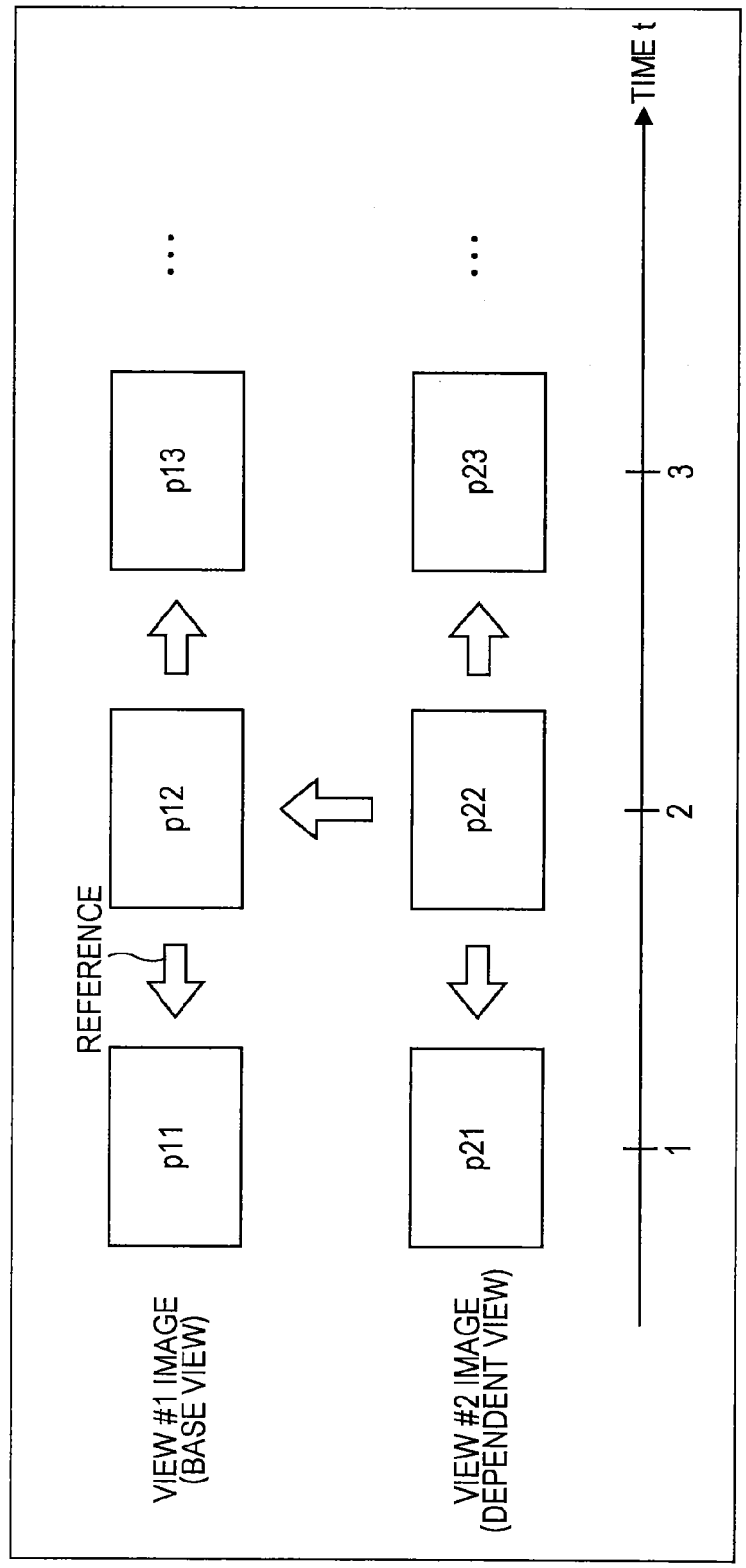
FIG. 6 is a view for explaining a picture which is referred to to generate a predicted image upon predictive encoding according to an MVC standard.

FIG. 6 is a view for explaining a picture which is referred to to generate a predicted image upon predictive encoding according to the MVC standard.

Now, pictures of the viewpoint #1 images which are base view images are represented by p11, p12, p13 and . . . in a (display) time order, and pictures of the viewpoint #2 images which are dependent view images are represented by p21, p22, p23 and . . . in the time order.

For example, the picture p12 which is the base view picture is subjected to predictive encoding referring to, for example, the pictures p11 and p13 which are the base view pictures where necessary.

That is, the base view picture p12 can be predicted (a predicted image can be generated) referring to only the pictures p11 and p13 which are pictures at other times of this base view.

Further, for example, the picture p22 which is a dependent view picture is subjected to predictive encoding referring to, for example, the pictures p21 and p23 which are the dependent view pictures and, in addition, the base view picture p12 which is another view.

That is, the dependent view picture p22 can be predicted referring to the pictures p21 and p23 which are pictures at other times of this dependent view and, in addition, the base view picture p12 which is another view picture.

Meanwhile, prediction performed referring to the same view picture (of another time) as an encoding target picture is also referred to as "time prediction", and prediction performed referring to a different view picture from the encoding target picture is also referred to as "disparity prediction".

As described above, according to the MVC standard, it is possible to perform only time prediction on base view pictures and perform time prediction and disparity prediction on dependent view pictures.

In addition, according to the MVC standard, a view picture which is different from the encoding target picture and which is referred to upon disparity prediction needs to be a picture at the same time as the encoding target picture.

The encoders 11, 12, 21 and 22 which form the multi-view image encoder in FIG. 4 principally perform prediction (generate predicted images) according to the MVC standard.

Figure 7:
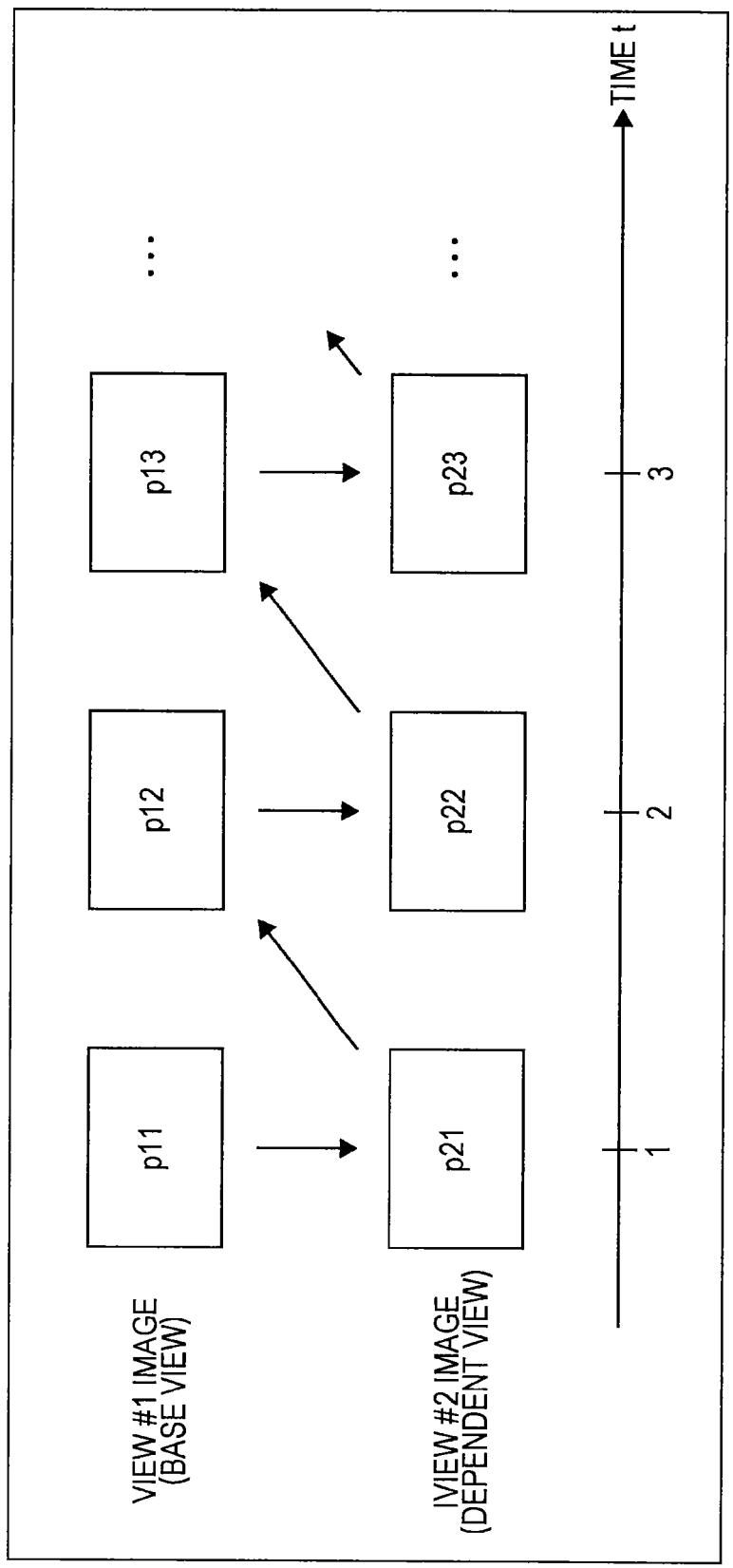
FIG. 7 is a view for explaining an encoding (and decoding) order of pictures according to the MVC standard.

FIG. 7 is a view for explaining an encoding (and decoding) order of a picture according to the MVC standard.

Now, similar to FIG. 6, pictures of the viewpoint #1 images which are base view images are represented by p11, p12, p13 and . . . in a (display) time order, and pictures of the viewpoint #2 images which are dependent views are represented by p21, p22, p23 and . . . in the time order.

Now, for ease of description, when each view picture is encoded in the time order, the picture p11 at a first time t=1 of the base view is encoded, and then the picture p21 at the same time t=1 of the dependent view is encoded.

When encoding of (all) pictures at the same time t=1 of the dependent view is finished, the picture p12 at the next time t=2 of the base view is encoded and then the picture p22 at the same time t=2 of the dependent view is encoded.

Hereinafter, the base view pictures and the dependent view pictures are encoded in the same order.

The encoders 11, 12, 21 and 22 which form the multi-view image encoder in FIG. 4 encode pictures in order according to the MVC standard.

[Example Structure of Encoder 11]

Figure 8:
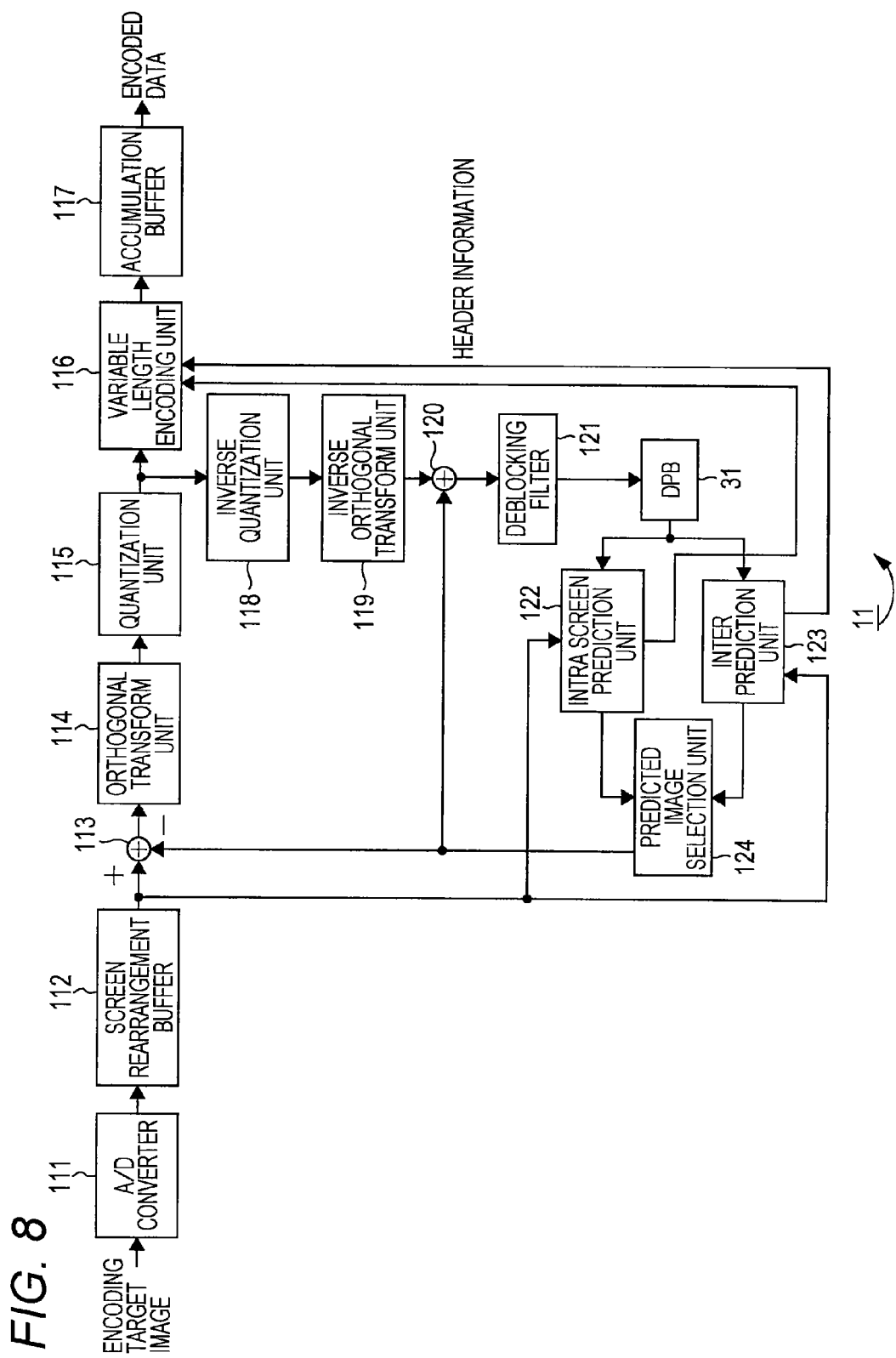
FIG. 8 is a block diagram illustrating an example structure of an encoder 11.

FIG. 8 is a block diagram illustrating an example structure of the encoder 11 in FIG. 4.

In addition, the encoders 21 and 22 in FIG. 4 employ the same configuration as that of the encoder 11, and, for example, encode images according to the MVC standard.

In FIG. 8, the encoder 11 has an A/D (Analog/Digital) converter 111, a screen rearrangement buffer 112, an arithmetic operation unit 113, an orthogonal transform unit 114, a quantization unit 115, a variable length encoding unit 116, an accumulation buffer 117, an inverse quantization unit 118, an inverse orthogonal transform unit 119, an arithmetic operation unit 120, a deblocking filter 121, an intra screen prediction unit 122, an inter prediction unit 123 and a predicted image selection unit 124.

The A/D converter 111 sequentially receives a supply of the view #1 color image C#1 picture which is an encoding target image (moving image) in display order.

When a picture supplied thereto is an analog signal, the A/D converter 111 performs an A/D conversion on this analog signal, and supplies this analog signal to the screen rearrangement buffer 112.

The screen rearrangement buffer 112 temporarily stores the picture from the A/D converter 111, reads the picture according to a GOP (Group of Pictures) structure determined in advance, and rearranges an arrangement of pictures in encoding order (decoding order) instead of display order.

The pictures read from the screen rearrangement buffer 112 are supplied to the arithmetic operation unit 113, the intra screen prediction unit 122 and the inter prediction unit 123.

The arithmetic operation unit 113 receives a supply of the pictures from the screen rearrangement buffer 112 and receives a supply of a predicted image generated by the intra screen prediction unit 122 or the inter prediction unit 123 from the predicted image selection unit 124.

The arithmetic operation unit 113 sets the picture read from the screen rearrangement buffer 112 as the target picture of the encoding target, and sequentially sets a macro block which forms the target picture as the target block of the encoding target.

Further, the arithmetic operation unit 113 calculates a subtraction value obtained by subtracting a pixel value of the predicted image supplied from the predicted image selection unit 124 from a pixel value of the target block where necessary, and supplies the subtraction value to the orthogonal transform unit 114.

The orthogonal transform unit 114 performs an orthogonal transform such as discrete cosine transform or Karhunen Loéve transform on (the picture value) of the target block (or a residual from which the predicted image is subtracted) from the arithmetic operation unit 113, and supplies the resulting transform coefficient to the quantization unit 115.

The quantization unit 115 quantizes the transform coefficient supplied from the orthogonal transform unit 114, and supplies the resulting quantization value to the variable length encoding unit 116.

The variable length encoding unit 116 performs lossless encoding such as variable length encoding (such as CAVLC (Context-Adaptive Variable Length Coding)) or arithmetic encoding (such as CABAC (Context-Adaptive Binary Arithmetic Coding)) on the quantization value from the quantization unit 115, and supplies the resulting encoded data to the accumulation buffer 117.

In addition, the variable length encoding unit 116 receives a supply of the quantization value from the quantization unit 115 and, in addition, receives a supply of header information included in a header of the encoded data from the intra screen prediction unit 122 or the inter prediction unit 123.

The variable length encoding unit 116 encodes the header information from the intra screen prediction unit 122 or the inter prediction unit 123, and includes the encoded data in the header.

The accumulation buffer 117 temporarily stores the encoded data from the variable length encoding unit 116, and outputs the encoded data at a predetermined data rate.

The encoded data outputted from the accumulation buffer 117 is supplied to the multiplexing unit 32 (FIG. 4).

The quantization value obtained by the quantization unit 115 is supplied to the variable length encoding unit 116 and is also supplied to the inverse quantization unit 118, and is locally decoded by the inverse quantization unit 118, the inverse orthogonal transform unit 119 and the arithmetic operation unit 120.

That is, the inverse quantization unit 118 inversely quantizes the quantization value from the quantization unit 115 to a transform coefficient, and supplies the transform coefficient to the inverse orthogonal transform unit 119.

The inverse orthogonal transform unit 119 inversely transforms the transform coefficient from the inverse quantization unit 118, and supplies the transform coefficient to the arithmetic operation unit 120.

The arithmetic operation unit 120 adds the pixel value of the predicted image supplied from the predicted image selection unit 124 to the data supplied from the inverse orthogonal transform unit 119 where necessary, obtains a decoded image obtained by decoding (locally decoding) the target block and supplies the decoded image to the deblocking filter 121.

The deblocking filter 121 filters the decoded image from the arithmetic operation unit 120, removes (reduces) block distortions produced in the decoded image and supplies the decoded image to the DPB 31 (FIG. 4).

Meanwhile, the DPB 31 stores the decoded image from the deblocking filter 121, that is, the color image C#1 picture encoded and locally decoded by the encoder 11, as a reference picture (candidate) which is referred to to generate a predicted image used for predictive encoding performed later in time (encoding performed by performing subtraction of a predicted image in the arithmetic operation unit 113).

As illustrated in FIG. 4, the DPB 31 is shared by the encoders 11, 12, 21 and 22, and stores the color image C#1 picture encoded and locally decoded by the encoder 11, and, in addition, the color image C#2 picture encoded and locally decoded by the encoder 12, the disparity image D#1 picture encoded and locally decoded by the encoder 21 and the disparity image D#2 encoded and locally decoded by the encoder 22, too.

In addition, the inverse quantization unit 118, the inverse orthogonal transform unit 119 and the arithmetic operation unit 120 locally decode the I picture, the P picture and the Bs picture which are referable pictures which can be reference pictures, and the DPB 31 stores decoded images of the I picture, the P picture and the Bs picture.

When the target picture is the I picture, the P picture or the B picture (including the Bs picture) which can be subjected to intra prediction (intra screen prediction), the intra screen prediction unit 122 reads a locally decoded portion (decoded image) of a target picture from the DPB 31. Further, the intra screen prediction unit 122 sets part of the decoded image of the target picture read from the DPB 31 as a predicted image of a target block of the target picture supplied from the screen rearrangement buffer 112.

Furthermore, the intra screen prediction unit 122 calculates an encoding cost required to encode the target block using the predicted image, that is, the encoding cost required to encode, for example, a residual of the target block from the predicted image, and supplies the encoding cost to the predicted image selection unit 124 together with the predicted image.

When the target picture is the P picture or the B picture (including the Bs picture) which can be subjected to inter prediction, the inter prediction unit 123 reads one or more pictures encoded and locally decoded before the target picture, from the DPB 31 as the reference pictures.

Further, the inter prediction unit 123 detects a displacement vector which represents displacement (a disparity or a motion) between the target block and a corresponding block of the reference picture corresponding to the target block (for example, a block which minimizes a SAD with the target block) by ME using the target block of the target picture from the screen rearrangement buffer 112 and the reference picture.

Meanwhile, when the reference picture is the same view picture as the target picture, the displacement vector detected by ME using the target block and the reference picture, is a motion vector which represents a motion (temporal displacement) between the target block and the reference picture.

Further, when the reference picture is a different view picture from the target picture, a displacement vector detected by ME using the target block and the reference picture becomes a disparity vector which represents a disparity (spatial displacement) between the target block and the reference picture.

As described above, the disparity vector calculated by ME is also referred to as a "calculated disparity vector" to distinguish the image capturing disparity vector described with reference to FIG. 5.

Although the image capturing disparity vector is a vector the y component of which is 0 in the present embodiment for ease of description, the calculated disparity vector detected by ME represents displacement (positional relationship) between the target block and a block (corresponding block) which minimizes the SAD of the reference picture with the target block, and therefore the y component is not necessarily 0.

The inter prediction unit 123 generates a predicted image by performing displacement compensation (motion compensation for compensating for displacement corresponding to a motion or disparity compensation for compensating for displacement corresponding to a disparity) which is MC (Motion Compensation) of the reference picture from the DPB 31 according to the displacement vector of the target block.

That is, the inter prediction unit 123 acquires as the predicted image the corresponding block of the reference picture which is a block (area) at a (displaced) position moved from the position of the target block according to the displacement vector of this target block.

Further, the inter prediction unit 123 calculates an encoding cost required to encode the target block using the predicted image per inter prediction mode of different macro blocks described below.

Furthermore, based on the inter prediction mode of the minimum encoding cost as the optimal inter prediction mode which is an optimal inter prediction mode, the inter prediction unit 123 supplies the predicted image and the encoding cost obtained by this optimal inter prediction mode, to the predicted image selection unit 124.

Meanwhile, generating a predicted image based on a displacement vector (a disparity vector and a motion vector) is also referred to as "displacement prediction (disparity prediction and motion prediction)" or "displacement compensation (disparity compensation and motion compensation)". In addition, the displacement prediction includes a displacement vector detection where necessary.

The predicted image selection unit 124 selects a predicted image of a smaller encoding cost among the predicted images from the intra screen prediction unit 122 and the inter prediction unit 123, and supplies the predicted image to the arithmetic operation units 113 and 120.

In addition, the intra screen prediction unit 122 supplies information related to intra prediction to the variable length encoding unit 116 as header information, and the inter prediction unit 123 supplies information related to inter prediction (displacement vector information or a reference index allocated to a reference picture) to the variable length encoding unit 116 as header information.

The variable length encoding unit 116 selects header information from which the predicted image of a smaller encoding cost is generated among the header information from the intra screen prediction unit 122 and the inter prediction unit 123, and includes the header information in a header of the encoded data.

[Macro Block Type]

Figure 9:
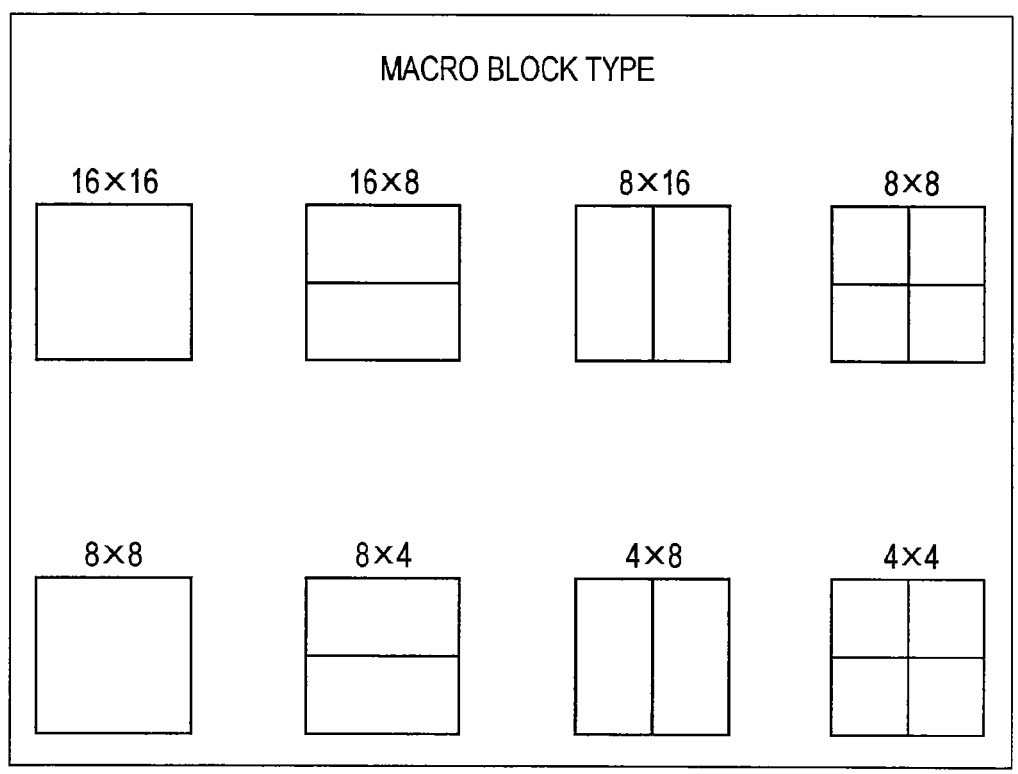
FIG. 9 is a view for explaining a macro block type according to the MVC (AVC) standard.

FIG. 9 is a view for explaining a macro block type according to the MVC (AVC) standard.

Although a macro block of a target block is a block of 16 horizontal pixels×16 vertical pixels according to the MVC standard, ME (and generation of a predicted image) can be performed per partition by dividing a macro block into partitions.

That is, according to the MVC standard, by dividing the macro block into one of partitions of 16×16 pixels, 16×8 pixels, 8×16 pixels or 8×8 pixels, it is possible to detect a displacement vector (a motion vector or a calculated disparity vector) by performing ME per partition.

Further, according to the MVC standard, by dividing the partition of the 8×8 pixels into sub partitions of one of 8×8 pixels, 8×4 pixels, 4×8 pixels or 4×4 pixels, it is possible to detect a displacement vector (a motion vector or a calculated disparity vector) by performing ME per sub partition.

The macro block type represents into which partition (sub partitions) a macro block is divided.

Upon inter prediction of the inter prediction unit 123 (FIG. 8), an encoding cost of each macro block type is calculated as an encoding cost of each inter prediction mode, and the inter prediction mode (macro block type) of the minimum encoding cost is selected as the optimal inter prediction mode.

[Predicted Motion Vector (PMV)]

Figure 10:
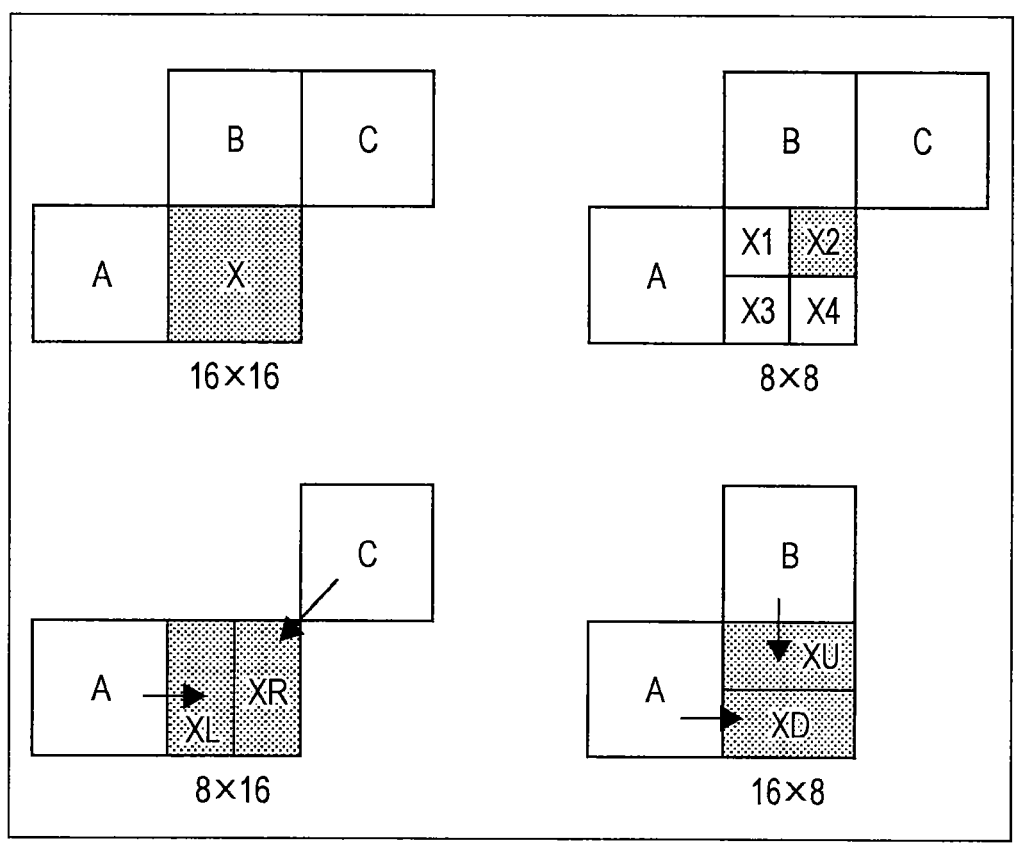
FIG. 10 is a view for explaining a predicted motion vector (PMV) according to the MVC (AVC) standard.

FIG. 10 is a view for explaining a predicted motion vector (PMV) according to the MVC (AVC) standard.

Upon inter prediction of the inter prediction unit 123 (FIG. 8), a displacement vector (a motion vector or a calculated disparity vector) of a target block is detected by ME, and a predicted image is generated using this displacement vector.

Although the displacement vector is required to decode an image on the decoding side, and therefore information of the displacement vector needs to be encoded and included in the encoded data, if the displacement vector is encoded as is, the bit rate of the displacement vector increases and encoding efficiency deteriorates in some cases.

That is, according to the MVC standard, as illustrated in FIG. 9, a macro block is divided into partitions of 8×8 pixels, and further the partitions of the 8×8 pixels are divided into sub partitions of 4×4 pixels in some cases. In this case, one macro block is finally divided into 4×4 sub partitions, 16 (=4×4) displacement vectors are generated for one macro block, and, when the displacement vector is encoded as is, the bit rate of the displacement vector increases and the encoding efficiency deteriorates.

Hence, according to the MVC (AVC) standard, vector prediction of predicting a displacement vector is performed, and a residual (residual vector) of the displacement vector for the predicted motion vector obtained by this vector prediction is encoded.

When, for example, the macro block which is the target block X of the encoding target is divided into partitions 16×16 pixels (the target block X is used as a partition as is), a predicted motion vector PMVX is generated for the target block X which is this partition according to the median prediction standard.

That is, for the partitions of 16×16 pixels, the predicted motion vector PMVX is calculated according to equation (4) from a displacement vector mvA of a macro block A neighboring on the left of the target block X, a displacement vector mvB of a macro block B neighboring on the upper side and a displacement vector mvC of a macro block C neighboring on the diagonal upper right.

$$PMVX = \text{med}(mvA, mvB, mvC) \quad (4)$$

Meanwhile, in equation (4), med( ) represents a median (center value) in a value in a parenthesis.

In addition, when the target block X is a macro block at a right end of a picture, that is, when, for example, the displacement vector mvC of the macro block C is unavailable, the predicted motion vector PMVX is calculated using a displacement vector of a macro block neighboring on a diagonal upper left of the target block X instead of the displacement vector mvC.

Further, the predicted motion vector PMVX is independently calculated according to equation (4) for the x component and the y component.

When, for example, a macro block which is the target block X of the encoding target is divided into four partitions of X1, X2, X3 and X4 of 8×8 pixels, a median of a displacement vector of the partition X1 neighboring on the left of the partition X2, the displacement vector of the macro block B neighboring on the upper side and the displacement vector of the macro block C neighboring on the diagonal upper right is calculated as a predicted motion vector according to the median prediction standard for the upper right partition X2.

For the other partitions X1, X3 and X4, predicted motion vectors are calculated as defined in the MVC (AVC) standard.

When, for example, the macro block which is the target block X of the encoding target is divided into two left and right partitions XL and XR of 8×16 pixels, the displacement vector of the macro block A neighboring on the left of this left partition XL is used as is as the predicted motion vector for the left partition XL.

Further, for the right partition XR, the displacement vector of the macro block C neighboring on the upper right of this right partition XL is used as is as a predicted motion vector.

When, for example, the macro block which is the target block X of the encoding target is divided into two upper and lower partitions XU and XD of 16×8 pixels, the displacement vector of the macro block A neighboring on the left of this lower partition XD is used as is as the predicted motion vector for the lower partition XD.

Further, for the upper partition XU, the displacement vector of the macro block B neighboring on the upper side of this upper partition XU is used as is as a predicted motion vector.

The inter prediction unit 123 (FIG. 8) includes in header information a residual vector mvX-PMV which is a difference between a displacement vector mvX of the target block X and the predicted motion vector PMVX.

Figure 11:
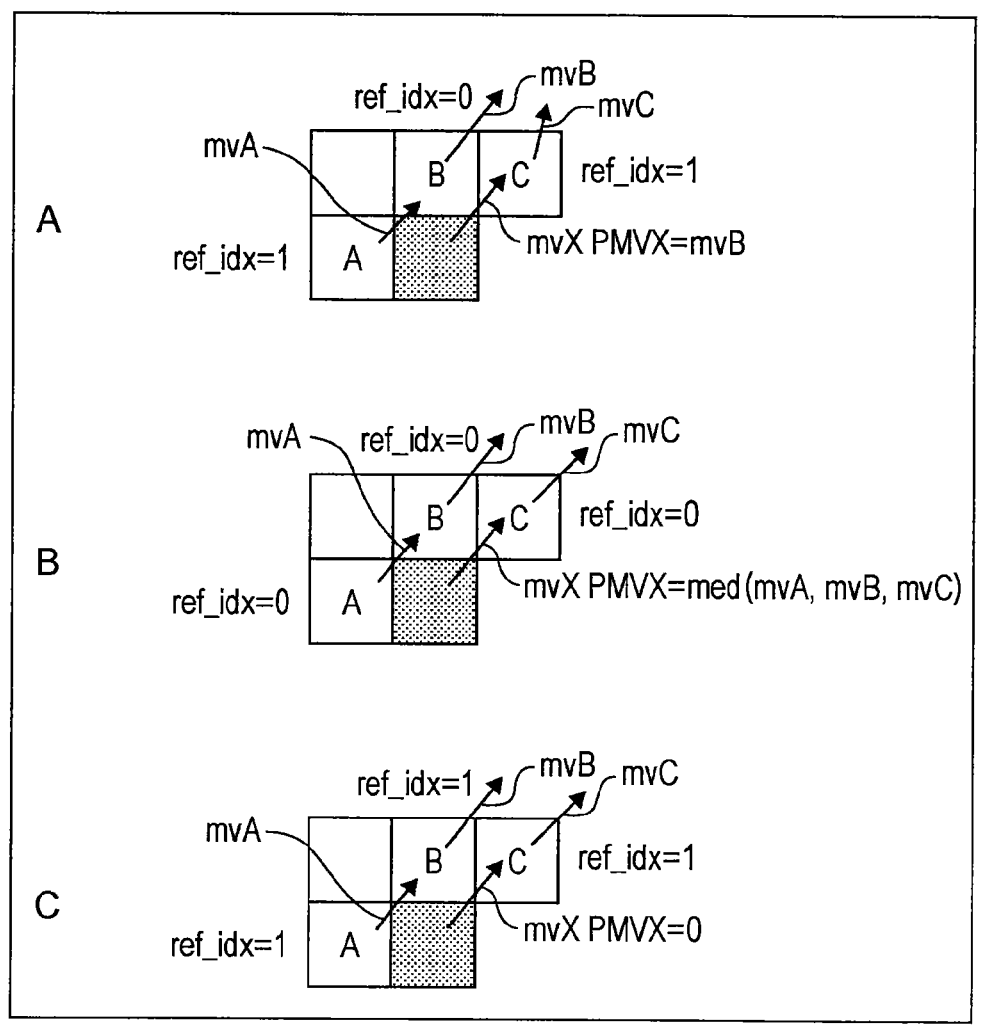
FIG. 11 is a view for explaining a relationship between a predicted motion vector and a reference index according to the MVC (AVC) standard.

FIG. 11 is a view for explaining a relationship between a predicted motion vector and a reference index according to the MVC (AVC) standard.

The predicted motion vector generated according to the MVC standard differs depending on a reference index (also referred to as a "prediction reference index" below) allocated to a reference picture used to generate a predicted image of a macro block in a surrounding of a target block.

Meanwhile, (a picture which can be) a reference picture according to the MVC (AVC) standard, and a reference index will be described.

According to the AVC standard, a plurality of pictures can be used as a reference picture upon generation of a predicted image.

Further, in a codec according to the AVC standard, a reference picture is stored in a buffer which is referred to as a "DPB" after decoding (local decoding).

The DPB marks a picture which is referred to in a short term as a short-term reference picture (used for short-term reference), a picture which is referred to in a long term as a long-term reference picture (used for long-term reference) and a picture which is not referred to as a non-reference picture (unused for reference).

A management standard which manages the DPB manages two types of sliding window process and adaptive memory control process.

According to the sliding window process, the DPB is managed according to a FIFO (First In First Out) standard, and a picture stored in the DPB is released in order of pictures of smaller frame_num (becomes a non-reference picture).

That is, according to sliding window process, an I (Intra) picture, a P (Predictive) picture and a Bs picture which is a referable B (Bi-directional Predictive) picture are stored in the DPB as short-term reference pictures.

Further, after the DPB can store reference pictures (and which could be reference pictures) as much as possible, the earliest (oldest) short-term reference picture in the short-term reference pictures stored in the DPB is released.

In addition, when long-term reference pictures are stored in the DPB, the sliding window process does not influence the long-term reference pictures stored in the DPB. That is, according to the sliding window process, pictures managed by the FIFO standard among reference pictures are only short-term reference pictures.

According to adaptive memory control process, pictures stored in the DPB are managed using a command which is referred to as a MMCO (Memory management control operation).

According to the MMCO command, by setting a short-term reference picture to a non-reference picture or allocating a long-term frame index which is a reference index of managing a long-term reference picture to a short-term reference picture by targeting at a reference picture stored in the DPB, it is possible to set a short-term reference picture as a long-term reference picture, set a maximum value of long-term frame index and set all reference pictures to non-reference pictures.

Although inter prediction of generating a predicted image is performed by performing motion compensation (displacement compensation) of a reference picture stored in the DPB according to the AVC standard, it is possible to use reference pictures of two pictures at maximum for inter prediction of the B picture (including the Bs picture). Inter prediction using the reference pictures of these two pictures are referred to as L0 (List 0) prediction and L1 (List 1) prediction.

For the B picture (including the Bs picture), L0 prediction, L1 prediction or both of L0 prediction and L1 prediction are used as inter prediction. For the P picture, only L0 prediction is used as inter prediction.

Upon inter prediction, a reference picture which is referred to to generate a predicted image is managed by a reference picture list.

In the reference picture list, a reference index which is an index for specifying (a reference picture which can be) a reference picture which is referred to to generate a predicted image is allocated to (a picture which can be) a reference picture stored in the DPB.

When a target picture is a P picture, only L0 prediction is used as inter prediction for the P picture as described above, and the reference index is allocated only upon L0 prediction.

Further, when the target picture is the B picture (including the Bs picture), both of L0 prediction and L1 prediction are used for the B picture as inter prediction in some cases as described above, and the reference index is allocated upon both of L0 prediction and L1 prediction.

Meanwhile, a reference index for L0 prediction is also referred to as a "L0 index", and a reference index for L1 prediction is also referred to as a "L1 index".

When the target picture is the P picture, as a default (default value) according to the AVC standard, a reference index (L0 index) of a smaller value is allocated to a reference picture of a later decoding order stored in the DPB.

The reference index is an integer equal to or more than 0, and a minimum value is 0. Hence, when the target picture is the P picture, 0 is allocated as the L0 index to the reference picture decoded immediately before the target picture.

When the target picture is the B picture (including the Bs picture), as the AVC default, reference indices (the L0 index and the L1 index) are allocated to the reference pictures stored in the DPB in POC (Picture Order Count) order, that is, in display order.

That is, upon L0 prediction, the L0 index of a smaller value is allocated in display order to a reference picture which is temporarily before the target picture and is closer to the target picture, and then the L0 index of a smaller value is allocated in display order to a reference picture which is temporarily after the target picture and is close to the target picture.

That is, upon L1 prediction, the L1 index of a smaller value is allocated in display order to a reference picture which is temporarily after the target picture and is closer to the target picture, and then the L1 index of a smaller value is allocated in display order to a reference picture which is temporarily before the target picture and is close to the target picture.

In addition, reference indices (the L0 index and the L1 index) as the above defaults according to the AVC standard are allocated targeting at short-term reference pictures. A reference index is allocated to a long-term reference picture after the reference index is allocated to a short-term reference picture.

Hence, as the AVC default, a reference index of a higher value than a short-term reference picture is allocated to a long-term reference picture.

According to the AVC standard, a reference index can be allocated according to the above default method or allocated in an arbitrary manner using a command (also referred to as a "RPLR command" below) which is referred to as Reference Picture List Reordering.

In addition, when there is a reference picture to which a reference index is not allocated after the reference index is allocated using the RPLR command, the reference index is allocated to this reference picture according to the default method.

According to the MVC (AVC) method, as illustrated in FIG. 11, the predicted motion vector PMVX of the displacement vector mvX of the target block X is calculated according to a method which differs depending on prediction reference indices (reference indices allocated to the reference pictures used to generate predicted images of the macro blocks A, B and C) of the macro block A neighboring on the left of the target block X, the macro block B neighboring on the upper side and the macro block C neighboring on the diagonal upper right.

That is, a prediction reference index ref_idx of the target block X is, for example, 0.

As indicated by FIG. 11A, when there is one macro block the prediction reference index ref_idx of which is same 0 as the target block X among the three macro blocks A to C neighboring to the target block X, a displacement vector of this one macro block (a macro block the prediction reference index ref_idx of which is 0) is the predicted motion vector PMVX of the displacement vector mvX of the target block X.

Meanwhile, in FIG. 11A, only the macro block B among the three macro blocks A to C neighboring to the target block X is the macro block the prediction reference index ref_idx of which is 0, and therefore the displacement vector mvB of the macro block A is the predicted motion vector PMVX of (the displacement vector mvX of) the target block X.

Further, as indicated by FIG. 11B, when there are two or more macro blocks the prediction reference indices ref_idx of which are same 0 as the target block X among the three macro blocks A to C neighboring to the target block X, the median of displacement vectors of two or more macro blocks the prediction reference indices ref_idx of which are 0 are the predicted motion vector PMVX of the target block X (the predicted motion vector PMVX is calculated according to the median prediction standard).

Meanwhile, as indicated by FIG. 11B, all of the three macro blocks A to C neighboring to the target block X are macro blocks the prediction reference indices ref_idx of which are 0, and therefore medians med (mvA, mvB and mvC) of the displacement vector mvA of the macro block A, the displacement vector mvB of the macro block B and the displacement vector mvC of the macro block C are the predicted motion vectors PMVX of the target block X.

Further, as indicated by FIG. 11C, when there is not even one macro block the prediction reference index ref_idx of which is same 0 as the target block X among the three macro blocks A to C neighboring to the target block X, a 0 vector is the predicted motion vector PMVX of the target block X.

Further, as indicated by FIG. 11C, when there is not a macro block the prediction reference index ref_idx of which is same 0 among the three macro blocks A to C neighboring to the target block X, a 0 vector is the predicted motion vector PMVX of the target block X.

In addition, according to the MVC (AVC) standard, when the prediction reference index ref_idx of the target block X is 0, the target block X can be encoded as a skip macro block (skip mode).

As to the skip macro block, neither a residual of the target block nor the residual vector is encoded. Further, upon decoding, the predicted motion vector is adopted as is as a displacement vector of the skip macro block, and a copy of a block (corresponding block) of the reference picture at a position displaced by a displacement vector (predicted motion vector) from the position of the skip macro block is a decoding result of the skip macro block.

Whether or not the target block is a skip macro block depends on a specification of the encoder and is determined based on, for example, the bit rate of encoded data or an encoding cost of a target block.

[Example Structure of Encoder 12]

Figure 12:
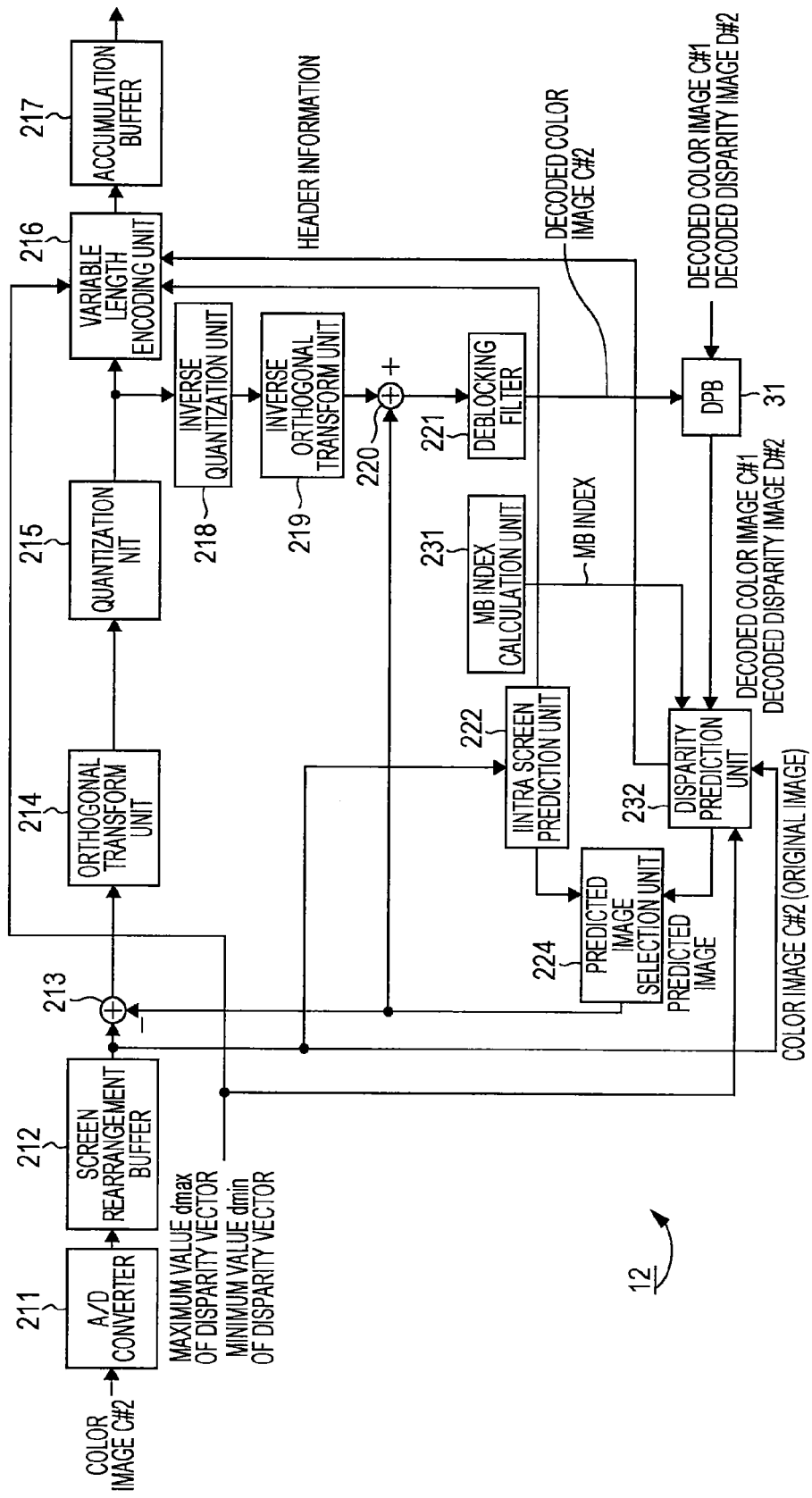
FIG. 12 is a block diagram illustrating an example structure of an encoder 12.

FIG. 12 is a block diagram illustrating an example structure of the encoder 12 in FIG. 4.

Although the encoder 12 encodes the viewpoint (view) #2 color image C#2 which is an encoding target image using the MVC standard, a predicted motion vector is generated (subjected to vector prediction) as described with reference to FIG. 3.

In FIG. 12, the encoder 12 has an A/D converter 211, a screen rearrangement buffer 212, an arithmetic operation unit 213, an orthogonal transform unit 214, a quantization unit 215, a variable length encoding unit 216, an accumulation buffer 217, an inverse quantization unit 218, an inverse orthogonal transform unit 219, an arithmetic operation unit 220, a deblocking filter 221, an intra screen prediction unit 222, a predicted image selection unit 224, an MB index calculation unit 231 and a disparity prediction unit 232.

The A/D converter 211 to the intra screen prediction unit 222 and the predicted image selection unit 224 employ the same configurations as those of the A/D converter 111 to the intra screen prediction unit 122 and the predicted image selection unit 124 of the encoder 11 in FIG. 8, and therefore will not be adequately described.

In FIG. 12, the DPB 31 receives a supply of a decoded image, that is, the color image (also referred to as a "decoded color image" below) C#2 picture encoded and locally decoded by the encoder 12, from the deblocking filter 221 and stores the picture as (a picture which can be) a reference picture.

Further, as described with reference to FIGS. 4 and 8, the DPB 31 also receives a supply of and stores the color image (decoded color image) C#1 picture encoded and locally decoded by the encoder 11, the disparity image (decoded disparity image) D#1 encoded and locally decoded by the encoder 21 and the disparity image (decoded disparity image) D#2 picture encoded and locally decoded by the encoder 22.

The encoder 12 uses the decoded color image C#1 picture obtained by the encoder 11 and the decoded disparity image D#2 obtained by the encoder 22 in addition to the decoded color image C#2 picture from the deblocking filter 221 to encode the color image C#2 which is an encoding target. Hence, FIG. 12 illustrates arrows which indicate a supply of the decoded color image C#1 obtained by the encoder 11 and the decoded disparity image D#2 obtained by the encoder 22 to the DPB 31.

The MB index calculation unit 231 finds (calculates) an MB index which is information for specifying (a position of) the color image C#2 target block from which a predicted image is generated by the disparity prediction unit 232, and supplies the MB index to the disparity prediction unit 232.

The disparity prediction unit 232 receives a supply of the maximum value dmax and the minimum value dmin of the image capturing disparity vector d (the viewpoint #2 image capturing disparity vector d2), the base line length L and the focal distance f as disparity related information (FIG. 4).

Using the disparity related information and the decoded disparity image D#2 picture (the picture at the same time as the target picture) stored in the DPB 31 where necessary, the disparity prediction unit 232 performs disparity prediction on the target block (generates a predicted image) using the viewpoint #1 decoded color image D#1 picture stored in the DPB 31 as a reference picture.

That is, the disparity prediction unit 232 performs ME using the decoded color image C#1 picture stored in the DPB 31 as a reference picture, and calculates a calculated disparity vector of the target block.

Further, the disparity prediction unit 232 performs MC using the decoded color image C#1 picture stored in the DPB 31 as a reference picture, according to the calculated disparity vector of the target block, and generates a predicted image of the target block.

Furthermore, the disparity prediction unit 232 calculates for each macro block type an encoding cost required to encode (perform predictive encoding on) the target block using the predicted image obtained by disparity prediction from the reference picture.

Still further, the disparity prediction unit 232 selects a macro block type of a minimum encoding cost as the optimal inter prediction mode, and supplies a predicted image generated by this optimal inter prediction mode to the predicted image selection unit 224.

Moreover, the disparity prediction unit 232 outputs information such as the optimal inter prediction mode to the variable length encoding unit 216 as header information.

In addition, as described above, a reference index is allocated to the reference picture, and the disparity prediction unit 232 selects as a prediction reference index of the target block the reference index allocated to the reference picture which is referred to upon generation of the predicted image generated in the optimal inter prediction mode and outputs the reference index to the variable length encoding unit 216 as one of header information.

Further, although the disparity prediction unit 232 which performs only disparity prediction among inter prediction is provided in the encoder 12 in FIG. 12 for ease of description, the encoder 12 can also perform time prediction in addition to disparity prediction similar to the inter prediction unit 123 of the encoder 11 in FIG. 8.

When performing both of disparity prediction and time prediction, the encoder 12 allocates reference indices to the decoded color image C#1 picture which is a reference picture which can be referred to upon disparity prediction and the decoded color image C#2 picture (another time picture at a different time from the target picture) which is a reference picture which can be referred to upon time prediction.

Further, the encoder 12 selects as a prediction reference index of the target block a reference index allocated to the reference picture referred to to generate, for example, a predicted image of a smaller encoding cost of the target block among the predicted image generated by disparity prediction and the predicted image generated upon time prediction, and is used as one of header information.

Figure 13:
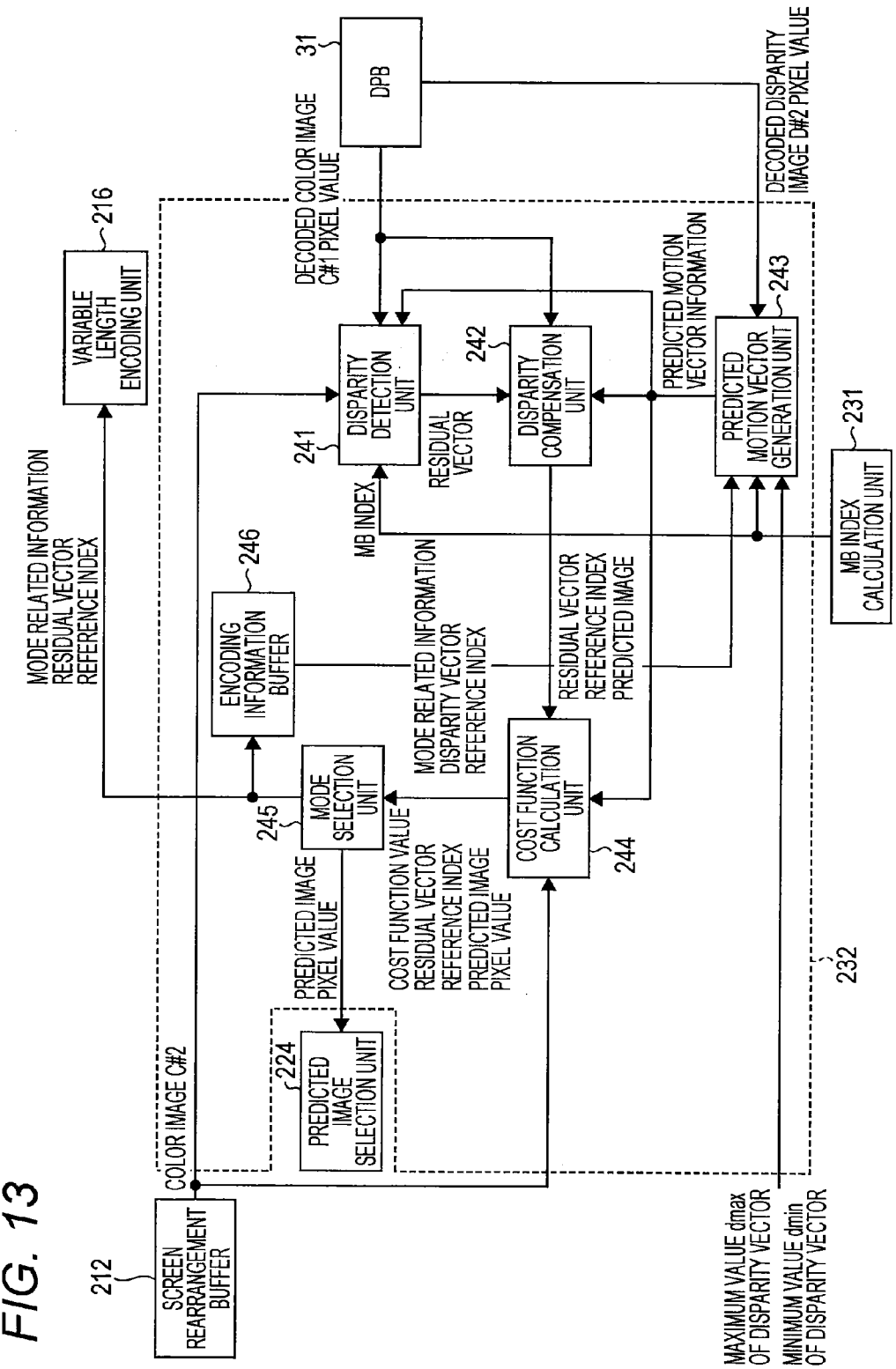
FIG. 13 is a block diagram illustrating an example structure of a disparity prediction unit 232.

FIG. 13 is a block diagram illustrating an example structure of the disparity prediction unit 232 in FIG. 12.

In FIG. 13, the disparity prediction unit 232 has a disparity detection unit 241, a disparity compensation unit 242, a predicted motion vector generation unit 243, a cost function calculation unit 244, a mode selection unit 245 and an encoding information buffer 246.

The disparity detection unit 241 receives a supply of the decoded color image C#1 picture which is a reference picture stored in the DPB 31, and receives a supply of the color image C#2 picture (target picture) of the encoding target from the screen rearrangement buffer 212.

Further, the disparity detection unit 241 receives a supply of the MB index of the target block from the MB index calculation unit 231, and receives a supply of predicted motion vector information from the predicted motion vector generation unit 243.

The disparity detection unit 241 recognizes a target block in the target picture from the screen rearrangement buffer 212 based on the MB index from the MB index calculation unit 231.

Further, similar to the MVC standard, by performing ME using the target block and the decoded color image C#1 picture which is a reference picture, the disparity detection unit 241 detects per macro block type a displacement vector which represents displacement between the target block and a corresponding block which minimizes the SAD with the target block in the decoded color image C#1 picture, that is, the calculated disparity vector mv of the target block which represents the disparity with respect to the viewpoint #1.

In addition, although the block which minimizes the SAD with the target block in the decoded color image C#1 picture is a corresponding block used to calculate the calculated disparity vector mv for ease of description, the disparity detection unit 241 can detect the corresponding block (furthermore, the calculated disparity vector mv) which minimizes an encoding cost COST of the target block which is represented by, for example, equation COST=D+λR.

Meanwhile, in equation COST=D+λR, D represents a SAD of the target block and a block of the decoded color image C#1 picture at a position moved by the calculated disparity vector mv from the target block, and λ is a weight with respect to R and is set according to a quantization step of the residual of the target block (residual between the target block and the corresponding block).

Further, in equation COST=D+λR, R is a value corresponding to the bit rate of the calculated disparity vector mv.

In addition, according to the MVC standard, a residual vector between the calculated disparity vector mv and the predicted motion vector is encoded, so that the value R can take a value corresponding to the bit rate of the residual vector.

When the value R takes the value corresponding to the bit rate of the residual vector, the disparity detection unit 241 recognizes the predicted motion vector from the predicted motion vector information supplied from the predicted motion vector generation unit 243, and calculates a residual vector from the predicted motion vector and the calculated disparity vector mv.

When detecting the calculated disparity vector mv of the target block, the disparity detection unit 241 calculates a residual vector which is a difference between the calculated disparity vector mv of the target block and the predicted motion vector obtained from the predicted motion vector information supplied from the predicted motion vector generation unit 243, and supplies the residual vector to the disparity compensation unit 242.

The disparity compensation unit 242 receives a supply of the residual vector of the calculated disparity vector mv from the disparity detection unit 241, and, in addition, receives a supply of the decoded color image C#1 picture which is a reference picture stored in the DPB 31.

Further, the disparity compensation unit 242 receives a supply of predicted motion vector information from the predicted motion vector generation unit 243.

The disparity compensation unit 242 restores the calculated disparity vector mv of the target block from the residual vector from the disparity detection unit 241 and the predicted motion vector information from the predicted motion vector generation unit 243.

Further, the disparity compensation unit 242 generates a predicted image of the target block per macro block type by performing displacement compensation (disparity compensation) on the reference picture which is the decoded color image C#1 picture from the DPB 31 using the calculated disparity vector mv of the target block in the same way as the MVC standard.

That is, the disparity compensation unit 242 acquires as a predicted image a corresponding block which is a block at a position displaced by the calculated disparity vector mv, from the position of the target block in the decoded color image C#1 picture.

Further, the disparity compensation unit 242 supplies the predicted image to the cost function calculation unit 244 together with the residual vector from the disparity detection unit 241 and the reference index allocated to the reference picture (here, the decoded color image C#1 picture) used to generate the predicted image.

The predicted motion vector generation unit 243 receives a supply of the decoded disparity image D#2 picture stored in the DPB 31, and receives a supply of the MB index from the MB index calculation unit 231.

Further, the predicted motion vector generation unit 243 receives a supply of the disparity related information (FIG. 4) such as the maximum value dmax and the minimum value dmin of the image capturing disparity vector d (the viewpoint #2 image capturing disparity vector d2).

Furthermore, the predicted motion vector generation unit 243 receives a supply of encoding information of encoded surrounding color blocks in a surrounding of the target block in the color image C#2, that is, the surrounding color blocks CA to CC in FIG. 3, from the encoding information buffer 246.

Meanwhile, the encoding information of a surrounding color block includes mode related information described below, a calculated disparity vector and a reference index (a prediction reference index) obtained when the surrounding color block is encoded as a target block.

The predicted motion vector generation unit 243 recognizes a target block in the target picture from the screen rearrangement buffer 212 based on the MB index from the MB index calculation unit 231.

Further, the predicted motion vector generation unit 243 generates as a predicted motion vector used for an operation of the target block a predicted motion vector which is estimated to be precisely predicted among a predicted motion vector generated according to the disparity information use prediction standard and a predicted motion vector generated according to the MVC standard, based on encoding information of the surrounding color blocks CA to CC from the encoding information buffer 246.

The predicted motion vector generation unit 243 generates a predicted motion vector for each macro block type (FIG. 9), and supplies the predicted motion vector as predicted motion vector information to the disparity detection unit 241, the disparity compensation unit 242 and the cost function calculation unit 244.

Meanwhile, disparity related information supplied to the predicted motion vector generation unit 243 is used to generate a predicted motion vector according to the disparity information use prediction standard.

That is, when a predicted motion vector is generated according to the disparity information use prediction standard, the predicted motion vector generation unit 243 transforms the disparity value v which is a pixel value of a block (same position block) at the same position as that of the target block in the decoded disparity image D#2 picture (a picture at the same time as the target picture) from the DPB 31, into the image capturing disparity vector d(d2) per pixel according to equation (2) using the maximum value dmax and the minimum value dmin of the image capturing disparity vector d(d2) included in disparity related information.

Meanwhile, when a depth image is used as a disparity information image instead of a disparity image, the depth Z which is a value prior to normalization of the value y which is a pixel value of a depth image is transformed into the image capturing disparity vector d according to equation (3) using the base line length L and the focal distance f included in the disparity related information.

Further, the predicted motion vector generation unit 243 calculates, for example, an average value (average vector) of the image capturing disparity vector d(d2) of each pixel of the same position block, and uses this average value as the predicted motion vector according to the disparity information use prediction standard.

The cost function calculation unit 244 receives a supply of the predicted image, the residual vector and the reference index from the disparity compensation unit 242, receives a supply of the predicted motion vector information from the predicted motion vector generation unit 243 and receives a supply of the color image C#2 target picture from the screen rearrangement buffer 212.

The cost function calculation unit 244 calculates an encoding cost required to encode a target block of a target picture from the screen rearrangement buffer 212 according to a predetermined cost function of calculating the encoding cost per macro block type (FIG. 9).

That is, the cost function calculation unit 244 calculates a value MV corresponding to a bit rate of the residual vector recognized from residual vector information from the disparity compensation unit 242, and calculates a value IN corresponding to a bit rate of the reference index (prediction reference index) from the disparity compensation unit 242.

Further, the cost function calculation unit 244 calculates a SAD which is a value D corresponding to the residual of the target block with respect to the predicted image from the disparity compensation unit 242.

Furthermore, the cost function calculation unit 244 calculates the encoding COST per macro block type according to equation COST=D+λ1×MV+λ2×IN using λ1 and λ2 as weights.

When calculating the encoding cost (cost function value) per macro block type, the cost function calculation unit 244 supplies the encoding cost to the mode selection unit 245 together with the reference index, the predicted image and the residual vector.

The mode selection unit 245 detects a minimum cost which is a minimum value from the encoding cost of each macro block type from the cost function calculation unit 244.

Further, the mode selection unit 245 selects the macro block type from which the minimum cost can be obtained, as the optimal inter prediction mode.

Furthermore, the mode selection unit 245 supplies, for example, mode related information which represents an optimal inter prediction mode, a reference index of the optimal inter prediction mode (prediction reference index) and the residual vector of the optimal inter prediction mode as header information to the variable length encoding unit 216.

Still further, the mode selection unit 245 supplies the predicted image and the encoding cost (minimum cost) of the optimal inter prediction mode to the predicted image selection unit 224.

In addition, when the reference index from which the minimum cost can be obtained is a reference index a value of which is 0, the mode selection unit 245 determines whether or not to encode the target block as a skip macro block, based on, for example, a minimum cost.

When the target block is determined to be encoded as the skip macro block in the mode selection unit 245, the optimal inter prediction mode is set to a skip mode of encoding the target block as a skip macro block.

Further, the mode selection unit 245 recognizes the predicted motion vector used to encode the target block in the optimal inter prediction mode, from predicted motion vector information supplied from the predicted motion vector generation unit 243 to the cost function calculation unit 244, and restores the calculated disparity vector of the target block by adding this predicted motion vector and the residual vector of the optimal inter prediction mode.

Furthermore, the mode selection unit 245 supplies the calculated disparity vector of the target block, the mode related information and the prediction reference index as encoding information of the target block to the encoding information buffer 246.

The encoding information buffer 246 temporarily stores encoding information from the mode selection unit 246.

Figure 14:
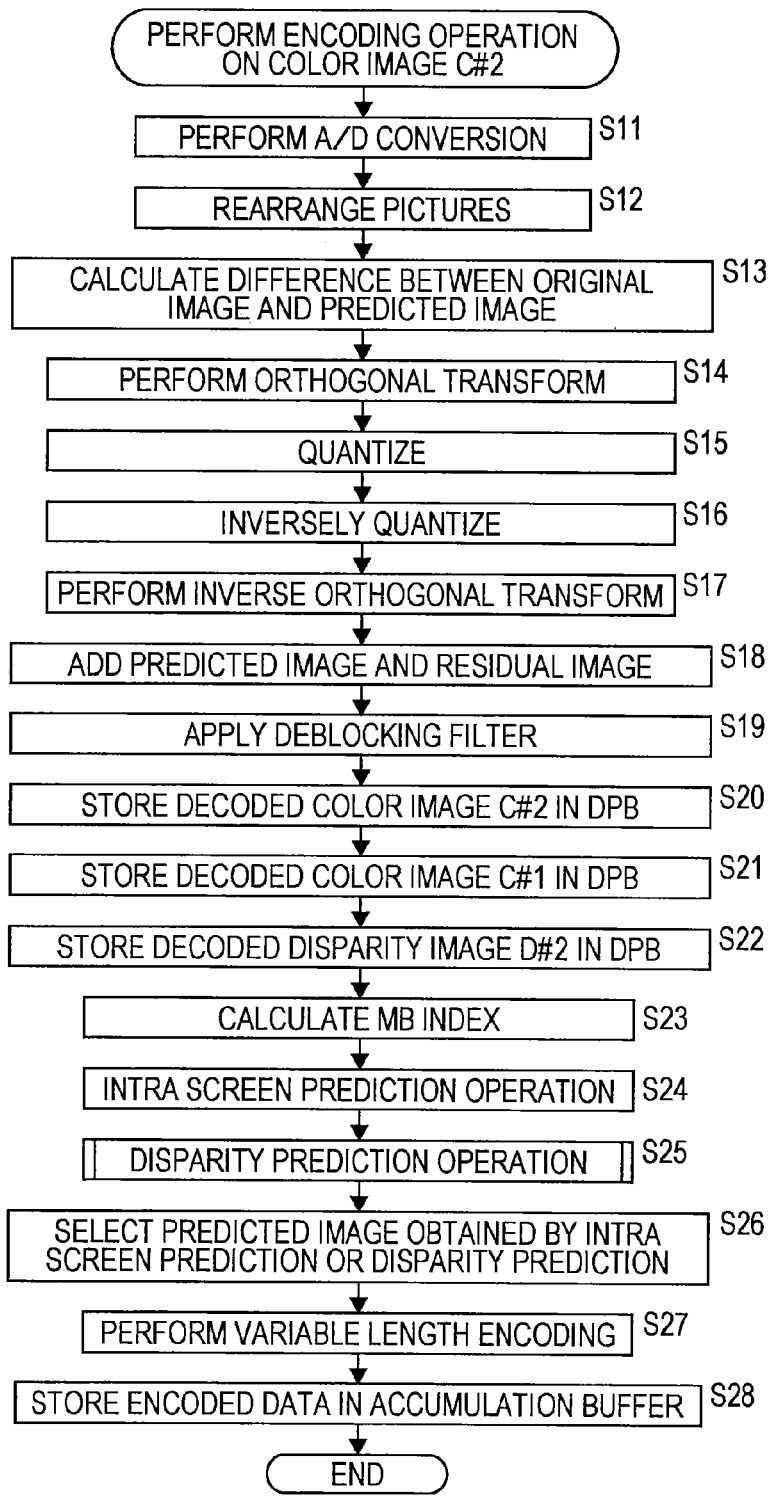
FIG. 14 is a flowchart for explaining an encoding operation of encoding a viewpoint #2 color image C#2.

FIG. 14 is a flowchart for explaining an encoding operation of encoding of the viewpoint #2 color image C#2 performed by the encoder 12 in FIG. 12.

In step S11, the A/D converter 211 performs an A/D conversion on the analog signal of the viewpoint #2 color image C#2 picture supplied thereto and supplies the analog signal to the screen rearrangement buffer 212, and the operation moves to step S12.

In step S12, the screen rearrangement buffer 212 temporarily stores the color image C#2 picture from the A/D converter 211, reads the picture according to the GOP structure determined in advance, and rearranges an arrangement of pictures in encoding order (decoding order) instead of display order.

The picture read from the screen rearrangement buffer 212 is supplied to the arithmetic operation unit 213, the intra screen prediction unit 222 and the disparity prediction unit 232, and the operation moves from step S12 to step S13.

In step S13, the arithmetic operation unit 213 sets the color image C#2 picture from the screen rearrangement buffer 212 as the target picture of the encoding target, and sequentially sets a macro block which forms the target picture as the target block of the encoding target.

Further, the arithmetic operation unit 213 calculates the difference (residual) between the pixel value of the target block and the pixel value of the predicted image supplied from the predicted image selection unit 224 where necessary and supplies the difference to the orthogonal transform unit 214, and the operation moves from step S13 to step S14.

In step S14, the orthogonal transform unit 214 performs an orthogonal transform on the target block from the arithmetic operation unit 213 and supplies the resulting transform coefficient to the quantization unit 215, and the operation moves to step S15.

In step S15, the quantization unit 215 quantizes the transform coefficient supplied from the orthogonal transform unit 214 and supplies the resulting quantization value to the inverse quantization unit 218 and the variable length encoding unit 216, and the operation moves to step S16.

In step S16, the inverse quantization unit 218 inversely quantizes the quantization value from the quantization unit 215 to the transform coefficient and supplies the transform coefficient to the inverse orthogonal transform unit 219, and the operation moves to step S17.

In step S17, the inverse orthogonal transform unit 219 performs an inverse orthogonal transform on the transform coefficient from the inverse quantization unit 218 and supplies the transform coefficient to the arithmetic operation unit 220, and the operation moves to step S18.

In step S18, the arithmetic operation unit 220 adds the pixel value of the predicted image supplied from the predicted image selection unit 224 to data supplied from the inverse orthogonal transform unit 219 where necessary, and calculates the decoded color image C#2 obtained by decoding (locally decoding) the target block. Further, the arithmetic operation unit 220 supplies the decoded color image C#2 obtained by locally decoding the target block to the deblocking filter 221, and the operation moves from step S18 to step S19.

In step S19, the deblocking filter 221 filters the decoded color image C#2 from the arithmetic operation unit 220 and supplies the decoded color image to the DPB 31 (FIG. 4), and the operation moves to step S20.

In step S20, the DPB 31 stores the decoded color image C#2 from the deblocking filter 221, and the operation moves to step S21.

In step S21, the DPB 31 waits for a supply of the decoded color image C#1 obtained by encoding and locally decoding the color image C#1 from the encoder 11 which encodes the color image D#1 and stores this decoded color image C#1, and the operation moves to step S22.

In step S22, the DPB 31 waits for a supply of the decoded disparity image D#2 obtained by encoding and locally decoding the disparity image D#2 from the encoder 22 which encodes the disparity image D#2 and stores this decoded disparity image D#2, and the operation moves to step S23.

In step S23, the MB index calculation unit 231 calculates an MB index of a next target block which is a macro block of a next encoding target and supplies the MB index to the disparity prediction unit 232, and the operation moves to step S24.

In step S24, the intra screen prediction unit 222 performs an intra prediction operation (intra screen prediction operation) on the next target block.

That is, the intra screen prediction unit 222 performs intra prediction (intra screen prediction) of generating a predicted image (a predicted image of intra prediction) from the decoded color image C#2 picture stored in the DPB 31, on the next target block.

Further, the intra screen prediction unit 222 calculates an encoding cost required to encode the next target block using the predicted image of intra prediction and supplies the encoding cost to the predicted image selection unit 224 together with the predicted image of intra prediction, and the operation moves from step S24 to step S25.

In step S25, the disparity prediction unit 232 performs a disparity prediction operation on the next target block using the decoded color image C#1 picture as a reference picture.

That is, by performing disparity prediction on the next target block using the decoded color image C#1 picture stored in the DPB 31, the disparity prediction unit 232 calculates, for example, a predicted image or an encoding cost per inter prediction mode of different macro block types.

Further, the disparity prediction unit 232 sets the inter prediction mode of the minimum encoding cost as the optimal inter prediction mode and supplies the predicted image of this optimal inter prediction mode to the predicted image selection unit 224 together with an encoding cost, and the operation moves from step S25 to step S26.

In step S26, the predicted image selection unit 224 selects, for example, a predicted image of a smaller encoding cost of the predicted image (the predicted image of intra prediction) from the intra screen prediction unit 222 and the predicted image (the predicted image of inter prediction) from the disparity prediction unit 232 and supplies the predicted image to the arithmetic operation units 213 and 220, and the operation moves to step S27.

Meanwhile, the predicted image selected by the predicted image selection unit 224 in step S26 is used for the operations in step S13 or S18 performed upon encoding of the next target block.

Further, the intra screen prediction unit 222 supplies information related to intra prediction obtained in the intra prediction operation in step S24 as header information to the variable length encoding unit 216, and the disparity prediction unit 232 supplies information (mode related information which represents an optimal inter prediction mode) related to disparity prediction (inter prediction) obtained by the disparity prediction operation in step S25 as header information to the variable length encoding unit 216.

In step S27, the variable length encoding unit 216 performs variable length encoding on a quantization value from the quantization unit 215, and obtains encoded data.

Further, the variable length encoding unit 216 selects header information from which the predicted image of a smaller encoding cost is generated among the header information from the intra screen prediction unit 222 and the disparity prediction unit 232, and includes the header information in a header of the encoded data.

Further, the variable length encoding unit 216 supplies the encoded data to the accumulation buffer 217, and the operation moves from step S27 to step S28.

Meanwhile, in addition, the variable length encoding unit 216 (FIG. 12) also receives a supply of disparity related information (the maximum value dmax and the minimum value dmin of the image capturing vector d (the viewpoint #2 image capturing disparity vector d2). The variable length encoding unit 216 includes the disparity related information in, for example, a header of encoded data.

In addition, the disparity related information can be multiplexed by, for example, the multiplexing unit 4 (FIG. 4) instead of being included in the header of the encoded data by the variable length encoding unit 216.

In step S28, the accumulation buffer 217 temporarily stores the encoded data from the variable length encoding unit 216, and outputs the encoded data at a predetermined data rate.

The encoded data outputted from the accumulation buffer 217 is supplied to the multiplexing unit 32 (FIG. 4).

The encoder 12 repeatedly performs the operations in steps S11 to S28 adequately.

Figure 15:
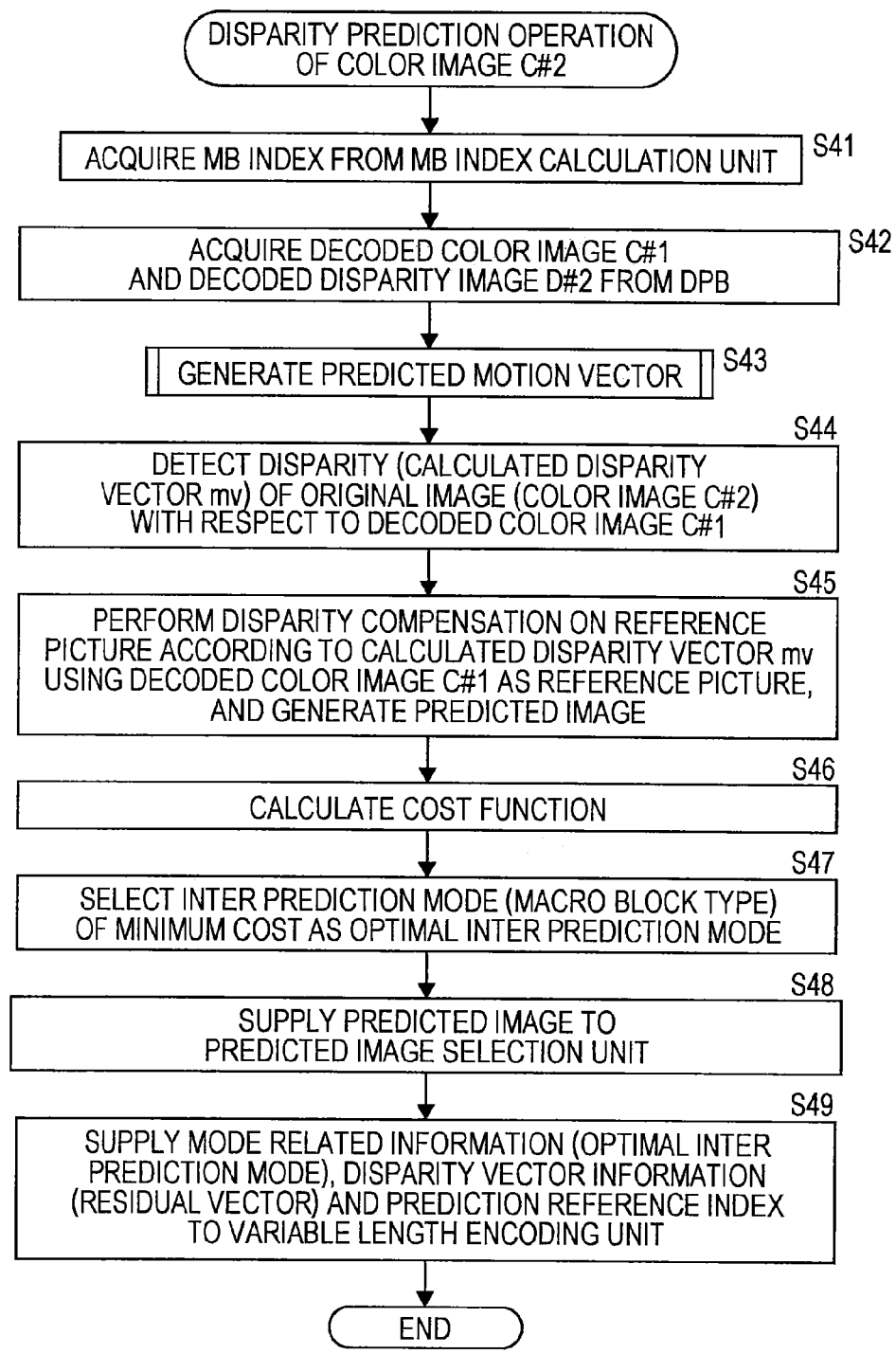
FIG. 15 is a flowchart for explaining a disparity prediction operation.

FIG. 15 is a flowchart for explaining a disparity prediction operation performed by the disparity prediction unit 232 in FIG. 13 in step S25 in FIG. 14.

In step S41, the disparity prediction unit 232 acquires an MB index of a (next) target block supplied from the MB index calculation unit 231 and supplies the MB index to the disparity detection unit 241 and the predicted motion vector generation unit 243, and the operation moves to step S42.

In step S42, the disparity prediction unit 232 acquires from the DPB 31 the decoded color image C#1 picture which is a reference picture, and acquires the decoded disparity image D#2.

Further, the disparity prediction unit 232 supplies the decoded color image C#1 picture to the disparity detection unit 241 and the disparity compensation unit 242 and supplies the decoded disparity image D#2 to the predicted motion vector generation unit 243, and the operation moves to step S43.

In step S43, the predicted motion vector generation unit 243 recognizes a (next) target block in the target picture supplied from the screen rearrangement buffer 212 based on the MB index from the MB index calculation unit 231.

Further, the predicted motion vector generation unit 243 performs a predicted motion vector generation operation of generating a predicted motion vector of the (next) target block on each macro block type (FIG. 9) using the encoding information stored in the encoding information buffer 246, the decoded disparity image D#2 from the DPB 31 and, in addition, disparity related information where necessary.

Furthermore, the predicted motion vector generation unit 243 supplies the predicted motion vector of the target block obtained by the predicted motion vector generation operation as predicted motion vector information to the disparity detection unit 241, the disparity compensation unit 242 and the cost function calculation unit 244, and the operation moves from step S43 to step S44.

In step S44, the disparity detection unit 241 recognizes a target block in the target picture supplied from the screen rearrangement buffer 212 based on the MB index from the MB index calculation unit 231.

Further, the disparity detection unit 241 performs ME on the (next) target block using the decoded color image C#1 picture from the DPB 31 as a reference picture, and detects the calculated disparity vector mv which represents the disparity of the target block with respect to the viewpoint #1.

Furthermore, the disparity detection unit 241 calculates a residual vector which is a difference between the calculated disparity vector mv of the target block and the predicted motion vector obtained from the predicted motion vector information supplied from the predicted motion vector generation unit 243, and supplies the residual vector to the disparity compensation unit 242, and the operation moves from step S44 to step S45.

In step S45, the disparity compensation unit 242 restores the calculated disparity vector mv of the target block from the residual vector from the disparity detection unit 241 and the predicted motion vector information from the predicted motion vector generation unit 243.

Further, the disparity compensation unit 242 performs MC using the decoded color image C#1 picture from the DPB 31 as a reference picture, according to the calculated disparity vector mv of the target block, and generates a predicted image of the (next) target block.

That is, the disparity compensation unit 242 acquires as a predicted image a corresponding block which is a block at a position displaced by the calculated disparity vector mv, from the position of the target block in the decoded color image C#1 picture.

Further, the disparity compensation unit 242 supplies the predicted image to the cost function calculation unit 244 together with the residual vector from the disparity detection unit 241 and the reference index allocated to the reference picture (the decoded color image C#1 picture) used to generate the predicted image, and the operation moves from step S45 to step S46.

In step S46, the cost function calculation unit 244 calculates an encoding cost required to encode the target block of the target picture from the screen rearrangement buffer 212 according to a predetermined cost function per macro block type (FIG. 9) and supplies the encoding cost to the mode selection unit 245 together with the reference index, the predicted image and the residual vector from the disparity compensation unit 242, and the operation moves to step S47.

In step S47, the mode selection unit 245 detects a minimum cost which is a minimum value from the encoding cost of each macro block type from the cost function calculation unit 244.

Further, the mode selection unit 245 selects the macro block type from which the minimum cost can be obtained, as the optimal inter prediction mode, and the operation moves from step S47 to step S48.

In step S48, the mode selection unit 245 supplies the predicted image and the encoding cost (minimum cost) of the optimal inter prediction mode to the predicted image selection unit 224, and the operation moves to step S49.

In step S49, the mode selection unit 245 supplies mode related information which represents an optimal inter prediction mode, a reference index of the optimal inter prediction mode (prediction reference index) and the residual vector of the optimal inter prediction mode as header information to the variable length encoding unit 216.

Further, in step S49, the mode selection unit 245 recognizes the predicted motion vector used to encode the target block in the optimal inter prediction mode, from predicted motion vector information supplied from the predicted motion vector generation unit 243 to the cost function calculation unit 244, and restores the calculated disparity vector of the target block by adding this predicted motion vector and the residual vector of the optimal inter prediction mode.

Furthermore, the mode selection unit 245 supplies the calculated disparity vector of the target block, the mode related information and the prediction reference index as encoding information of the target block to the encoding information buffer 246 to store, and the operation returns.

Figure 16:
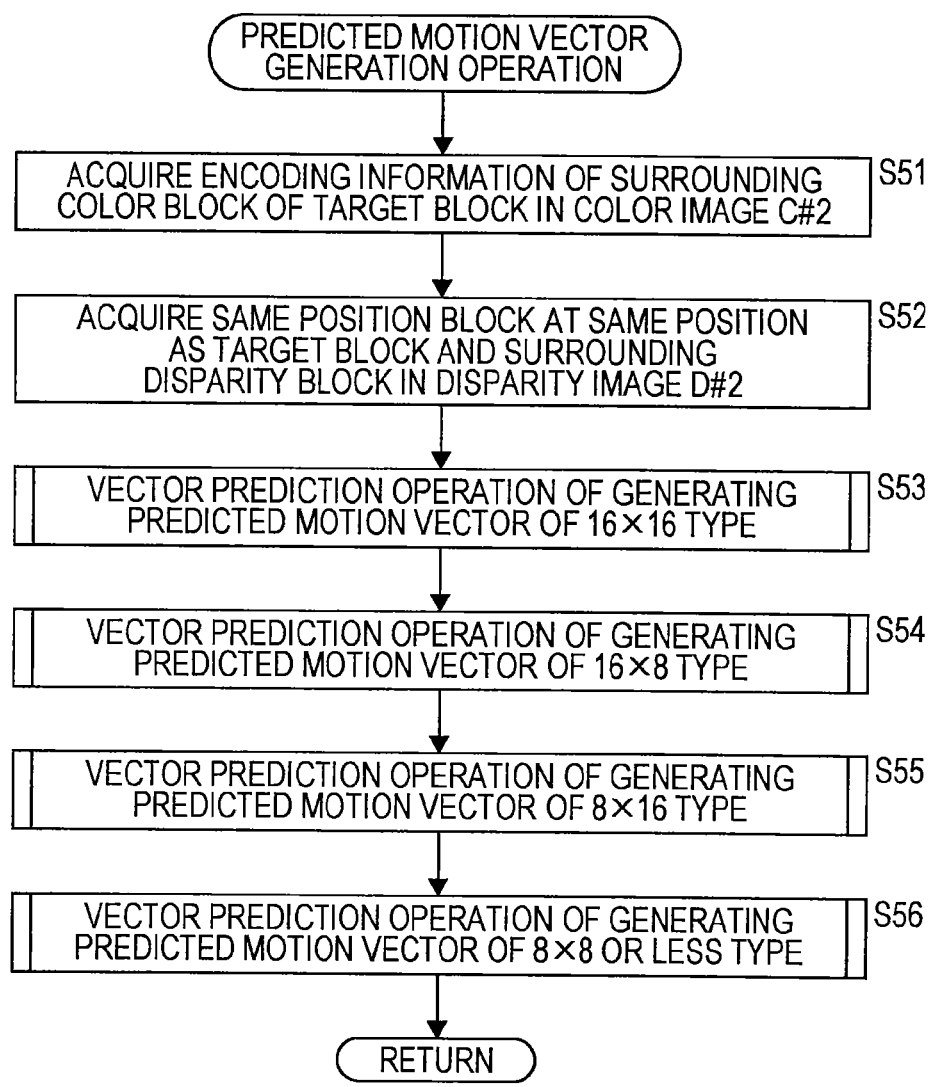
FIG. 16 is a flowchart for explaining a predicted motion vector generation operation.

FIG. 16 is a flowchart for explaining a predicted motion vector generation operation performed by the predicted motion vector generation unit 243 (FIG. 13) in step S43 in FIG. 15.

In step S51, the predicted motion vector generation unit 243 acquires encoding information of encoded surrounding color blocks in the surrounding of the target block in the color image C#2, that is, encoding information of the three surrounding color blocks CA to CC in FIG. 3, from the encoding information buffer 246, and the operation moves to step S52.

In step S52, the predicted motion vector generation unit 243 acquires a block (same position block) which is at the same position as that of the target block and surrounding disparity blocks (surrounding disparity blocks which are at the same positions as those of the surrounding color blocks from which the encoding information is acquired in step S51) in the surrounding of this same position block, that is, for example, the three surrounding disparity blocks DA to DC in FIG. 3 from the decoded disparity image D#2 picture (the picture at the same time as the target picture) from the DPB 31, and the operation moves to step S53.

Hereinafter, in steps S53 to S56, each macro block type is subjected to a vector prediction operation of generating a predicted motion vector of the target block, and the operation returns.

That is, in step S53, the predicted motion vector generation unit 243 performs the vector prediction operation on a macro block type (16×16 type) of dividing the target block into partitions of 16×16 pixels, and the operation moves to step S54.

In step S54, the predicted motion vector generation unit 243 performs a vector prediction operation on the macro block type (16×8 type) of dividing the target block into partitions of 16×8 pixels, and the operation moves to step S55.

In step S55, the predicted motion vector generation unit 243 performs a vector prediction operation on the macro block type (8×16 type) of dividing the target block into partitions of 8×16 pixels, and the operation moves to step S56.

In step S56, the predicted motion vector generation unit 243 performs a vector prediction operation on each macro block type (8×8 or less type) of dividing the target block into partitions of 8×8 pixels or less, and the operation returns.

FIG. 17 is a view for explaining a vector prediction operation performed on each macro block type by the predicted motion vector generation unit 243 (FIG. 13) in steps S53 to S56 in FIG. 16.

In the vector prediction operation, for a reference index matching block which has a reference index which represents a reference picture which is referred to to generate a predicted image, and which matches the target block among the surrounding color blocks (for example, the three surrounding color blocks CA to CC) in the surrounding of the target block CX in the color image C#2, the predicted motion vector generation unit 243 calculates differences between the surrounding disparity blocks (for example, the three surrounding disparity blocks DA to DC in FIG. 3) at the same position as that of the reference index matching block, and the same position block DX in the (decoded) disparity image D#2.

Further, in the vector prediction operation, based on the difference between the surrounding disparity block at the same position as that of the reference index matching block and the same position block, the predicted motion vector generation unit 243 generates as a predicted motion vector used for the operation of the target block CX a predicted motion vector which is estimated to be precisely predicted among the predicted motion vector according to the disparity information use prediction standard and the predicted motion vector according to the MVC standard.

That is, for the 16×16 type for example, based on encoding information of the three surrounding color blocks of the color image C#2 used to generate a predicted motion vector according to the MVC standard, that is, encoding information of the surrounding color block A neighboring on the left of the target block X, the surrounding color block B neighboring on the upper side and the surrounding color block C neighboring on the diagonal upper right illustrated in FIG. 10, the predicted motion vector generation unit 243 calculates the number of reference index matching blocks the prediction reference indices of which match the target block X among the surrounding color blocks A to C.

Meanwhile, the range of the number of the reference index matching blocks of the 16×16 type is 0 to 3.

When the number of reference index matching blocks is zero, the predicted motion vector generation unit 243 generates a predicted motion vector of a target block according to the disparity information use prediction standard (disparity information use predictor).

Meanwhile, according to the MVC standard, when the number of reference index matching blocks is zero, the 0 vector is the predicted motion vector of the target block as described with reference to FIG. 11.

Meanwhile, according to the disparity information use prediction standard, as illustrated in FIG. 13, an average value the image capturing disparity vector d(d2) calculated from the disparity value v which is a pixel value of the block (same position block) at the same position as that of the target block in the decoded disparity image D#2 picture is a predicted motion vector of the target block.

The image capturing vector d(d2) calculated from the decoded disparity image D#2 is a vector which represents the disparity of the color image C#2, so that it is estimated that a predicted motion vector is more precisely predicted than a predicted motion vector of the 0 vector calculated according to the MVC standard by calculating the predicted motion vector from the image capturing disparity vector d(d2).

When the number of reference index matching blocks is one or more, the predicted motion vector generation unit 243 calculates for the reference index matching block SADs (also referred to as "disparity SADs" below) which are values corresponding to differences between the surrounding disparity blocks (the surrounding disparity blocks DA to DC in FIG. 3) at the same position as that of the reference index matching block and the same position block (the same position block DX in FIG. 3).

Further, the predicted motion vector generation unit 243 generates as predicted motion vectors of target blocks the predicted motion vector according to the disparity information use prediction standard and the predicted motion vector according to the MVC standard based on the number of reference index matching blocks which have the disparity SADs exceeding a predetermined threshold.

That is, when the number of reference index matching blocks is one and the number of reference index matching blocks which have the disparity SADs exceeding a predetermined threshold is 0, that is, when the number of reference index matching blocks is one and the disparity SADs of the reference index matching blocks are a predetermined threshold or less, the predicted motion vector generation unit 243 generates the predicted motion vector of the target block according to the MVC standard.

Meanwhile, according to the MVC standard, when the number of reference index matching blocks is one, the calculated disparity vector of the reference index matching block is the predicted motion vector of the target block as described with reference to FIG. 11.

When the number of reference index matching blocks is one and the disparity SAD of this reference index matching block is a predetermined threshold or less, the same subject is estimated to be shown in this one reference index matching block and the target block (there is no significant difference between the disparities) (there is a correlation of the disparity).

Consequently, by using the calculated disparity vector of this reference index matching block as the predicted motion vector of the target block, a predicted motion vector which is more precisely predicted than the disparity information use standard of calculating the predicted motion vector from the image capturing disparity vector d(d2) is estimated to be obtained.

When the number of reference index matching blocks is one and the number of reference index matching blocks which have disparity SADs exceeding a predetermined threshold is one, that is, when the number of reference index matching blocks is only one and the disparity SAD of this reference index matching block exceeds a predetermined threshold, the predicted motion vector generation unit 243 generates a predicted motion vector of a target block according to the disparity information use prediction standard.

Meanwhile, when the disparity SAD of the reference index matching block exceeds a predetermined threshold, different subjects are estimated to be shown in this reference index matching block and the target block (there is a significant difference between the disparities) (there is no correlation between the disparities).

Consequently, instead of using the calculated disparity vector of this reference index matching block as the predicted motion vector of the target block, a predicted motion vector which is more precisely predicted according to the disparity information use standard of calculating the predicted motion vector from the image capturing disparity vector d(d2) is estimated to be obtained.

When the number of reference index matching blocks is two and the number of reference index matching blocks which have the disparity SADs exceeding a predetermined threshold among these blocks is 0, that is, when the number of reference index matching blocks is two and the disparity SADs of the two reference index matching blocks are a predetermined threshold or less, the predicted motion vector generation unit 243 generates the predicted motion vector of the target block according to the MVC standard.

Meanwhile, according to the MVC standard, when the number of reference index matching blocks is two (or more), the predicted motion vector of the target block is calculated according to the median prediction standard (median predictor) which uses the calculated disparity vectors of the two (or more) reference index matching blocks described with reference to FIG. 11.

Further, the two surrounding color blocks of the surrounding color blocks A to C are reference index matching blocks, and all disparity SADs of the two reference index matching blocks are a predetermined threshold or less, the same subject is estimated to be shown in the two reference index matching blocks and the target block (there is no significant difference between the disparities).

Consequently, the calculated disparity vectors of the two reference index matching blocks which have the disparity SADs equal to or less than the predetermined threshold, and the calculated disparity vectors of these reference index matching blocks and the calculated disparity vector of the target block are similar.

Consequently, by using as the predicted motion vector of the target block one of the calculated disparity vectors of the two reference index matching blocks which have the disparity SADs equal to or less than a predetermined threshold, a predicted motion vector which is more precisely predicted than the disparity information use standard of calculating the predicted motion vector from the image capturing disparity vector d(d2) is estimated to be obtained.

When the two reference index matching blocks which have the disparity SADs equal to or less than a predetermined threshold are included in the three surrounding color blocks A to C, the calculated disparity vector of one of the two reference index matching blocks which have the disparity SADs equal to or less than a predetermined threshold is a predicted motion vector of the target block according to the median prediction standard, so that it is possible to obtain a predicted motion vector which is precisely predicted.

When the number of reference index matching blocks is two and the number of reference index matching blocks which have the disparity SADs exceeding a predetermined threshold among these blocks is two, that is, when the number of reference index matching blocks is two and the disparity SAD of one reference index matching block of the two reference index matching blocks exceeds a predetermined threshold and the disparity SAD of the other reference index matching block is a predetermined threshold or less, the predicted motion vector generation unit 243 generates the predicted motion vector of the target block according to the disparity information use prediction standard.

Meanwhile, according to the MVC standard, when the number of reference index matching blocks is two or more as described above, the predicted motion vector of the target block is obtained according to the median prediction standard (median predictor) which uses the calculated disparity vectors of the two or more reference index matching blocks.

When two surrounding color blocks of the surrounding color blocks A to C used for the median prediction standard are reference index matching blocks, the disparity SAD of one reference index matching block of the two reference index matching blocks exceeds a predetermined threshold and the disparity SAD of the other reference index matching block is a predetermined threshold or less, different subjects are estimated be shown in one reference index matching block and the other reference index matching block (there is a significant difference between the disparities), and the same subject is estimated to be shown in the other reference index matching block and the target block (there is no significant difference between the disparities).

Hence, the calculated disparity vector of the (one) reference index matching block which has the disparity SAD exceeding a predetermined threshold and the calculated disparity vector of the (other) reference index matching block which has the disparity SAD equal to or less than a predetermined threshold are not similar.

Further, by using the calculated disparity vectors of the reference index matching blocks which have the disparity SADs equal to or less than a predetermined threshold as the predicted motion vector of the target block, a predicted motion vector which is precisely predicted is estimated to be obtained.

However, when the two reference index matching blocks are one reference index matching block which has the disparity SAD exceeding a predetermined threshold and one reference index matching block which has the disparity SAD equal to or less than a predetermined threshold, the calculated disparity vector of the reference index matching block which has the disparity SAD equal to or more than a predetermined threshold is not necessarily set as a predicted motion vector of a target block according to the median prediction standard.

That is, according to the median prediction standard, a calculated disparity vector of a surrounding color block other than the reference index matching block which has the disparity SAD equal to or less than a predetermined threshold is set as a predicted motion vector of a target block in some cases and, in these cases, prediction precision deteriorates.

Hence, when the number of reference index matching blocks is two and the number of reference index matching blocks which have disparity SADs exceeding a predetermined threshold among these blocks is one, the predicted motion vector generation unit 243 generates a predicted motion vector of a target block according to the disparity information use prediction standard instead of the MVC standard (median prediction standard) which deteriorates prediction precision.

Hence, when the number of reference index matching blocks is two and the number of reference index matching blocks which have disparity SADs exceeding a predetermined threshold among these blocks is two, the predicted motion vector generation unit 243 generates a predicted motion vector of a target block according to the disparity information use prediction standard.

That is, when the number of reference index matching blocks is two and all disparity SADs of the two reference index matching blocks exceed a predetermined threshold, prediction precision according to the median prediction standard deteriorates similar to the above case that the number of reference index matching blocks is two and the disparity SAD of one of the two reference index matching blocks exceeds a predetermined threshold, and therefore a predicted motion vector of a target block is generated according to the disparity information use prediction standard which provides relatively good prediction precision.

When the number of reference index matching blocks is three and the number of reference index matching blocks which have disparity SADs exceeding a predetermined threshold is 0 among these blocks, it is estimated that a predicted motion vector which is more precisely predicted according to the MVC standard (median prediction standard) than the disparity information use prediction standard of calculating a predicted motion vector from the image capturing predicted motion vector d(d2) can be obtained similar to the above case that the number of reference index matching blocks is two and the number of reference index matching blocks which have disparity SADs exceeding a predetermined threshold among the two reference index matching blocks is 0.

Hence, the predicted motion vector generation unit 243 generates a predicted motion vector of a target block according to the MVC standard (median prediction standard).

When the number of reference index matching blocks is three and the number of reference index matching blocks which have the disparity SADs exceeding a predetermined threshold among these blocks is one, that is, when the disparity SAD of one reference index matching block of the three reference index matching blocks exceeds a predetermined threshold and the disparity SADs of the other reference index matching blocks are a predetermined threshold or less, the predicted motion vector generation unit 243 generates the predicted motion vector of the target block according to the MVC standard.

Meanwhile, according to the MVC standard, when the number of reference index matching blocks is three as described above, the predicted motion vector of the target block is calculated according to the median prediction standard (median predictor) which uses the calculated disparity vectors of the three surrounding color blocks which are the three reference index matching blocks.

When all surrounding color blocks used for the median prediction standard are reference index matching blocks, the disparity SAD of one reference index matching block of the three reference index matching blocks exceeds a predetermined threshold and the disparity SADs of the other two reference index matching blocks are a predetermined threshold or less, different subjects are estimated to be shown in one reference index matching block and the other two reference index matching blocks (there is a significant difference between the disparities), and the same subject is estimated to be shown in the other two reference index matching blocks and the target block (there is no significant difference between the disparities).

Consequently, the calculated disparity vectors of the two reference index matching blocks which have the disparity SADs equal to or less than the predetermined threshold are similar.

Consequently, by using one of the two calculated disparity vectors of the reference index matching blocks which have the disparity SADs equal to or less than a predetermined threshold as the predicted motion vector of the target block, a predicted motion vector which is more precisely predicted than the disparity information use standard of calculating the predicted motion vector from the image capturing disparity vector d(d2) is estimated to be obtained.

When the two reference index matching blocks which have the disparity SADs equal to or less than a predetermined threshold are included in the three surrounding color blocks, the calculated disparity vector of one of the two reference index matching blocks which have the disparity SADs equal to or less than a predetermined threshold is a predicted motion vector of the target block according to the median prediction standard, so that it is possible to obtain a predicted motion vector which is precisely predicted.

When the number of reference index matching blocks is three and the number of reference index matching blocks which have the disparity SADs exceeding a predetermined threshold among these blocks is two, that is, when the disparity SADs of the two reference index matching blocks of the three reference index matching blocks exceed a predetermined threshold and the disparity SAD of the other one reference index matching block is a predetermined threshold or less, the predicted motion vector generation unit 243 generates the predicted motion vector of the target block according to the disparity information use prediction standard.

Meanwhile, according to the MVC standard, when the number of reference index matching blocks is three as described above, the predicted motion vector of the target block is obtained according to the median prediction standard (median predictor) which uses the calculated disparity vectors of the three surrounding color blocks which are the three or more reference index matching blocks.

When all surrounding color blocks used for the median prediction standard are reference index matching blocks, the disparity SADs of the two reference index matching blocks of the three reference index matching blocks exceed a predetermined threshold and the disparity SAD of the other one reference index matching block is a predetermined threshold or less, different subjects are estimated to be shown in the two reference index matching blocks and the other one reference index matching block (there is a significant difference between the disparities), and the same subject is estimated to be shown in the other one reference index matching block and the target block (there is no significant difference between the disparities).

Hence, the calculated disparity vectors of the two reference index matching blocks which have the disparity SADs exceeding a predetermined threshold and the calculated disparity vector of the other one reference index matching block which has the disparity SAD equal to or less than a predetermined threshold are not similar.

Further, by using the calculated disparity vectors of the (other one) reference index matching block which has the disparity SAD equal to or less than a predetermined threshold as the predicted motion vector of the target block, a predicted motion vector which is precisely predicted is estimated to be obtained.

However, when the three surrounding color blocks are two reference index matching blocks which have the disparity SADs exceeding a predetermined threshold and one reference index matching block which has the disparity SAD equal to or less than a predetermined threshold, the calculated disparity vector of the reference index matching block which has the disparity SAD equal to or more than a predetermined threshold is not necessarily set as a predicted motion vector of a target block according to the median prediction standard.

That is, according to the median prediction standard, a calculated disparity vector of a surrounding color block other than the reference index matching block which has the disparity SAD equal to or less than a predetermined threshold is set as a predicted motion vector of a target block in some cases and, in these cases, prediction precision deteriorates.

Hence, when the number of reference index matching blocks is three and the number of reference index matching blocks which have disparity SADs exceeding a predetermined threshold among these blocks is two, the predicted motion vector generation unit 243 generates a predicted motion vector of a target block according to the disparity information use prediction standard instead of the MVC standard (median prediction standard) which deteriorates prediction precision.

That is, when the number of reference index matching blocks is three and all disparity SADs of the three reference index matching blocks exceed a predetermined threshold, prediction precision according to the median prediction standard deteriorates similar to the above case that the number of reference index matching blocks is three and the disparity SADs of two of the three reference index matching blocks exceed a predetermined threshold, and therefore the predicted motion vector generation unit 243 generates a predicted motion vector of a target block according to the disparity information use prediction standard which provides relatively good prediction precision.

In addition, the predicted motion vector generation unit 243 performs a vector prediction operation on a macro block type other than the 16×16 type similar to the case of the 16×16 type.

Meanwhile, targets which are counted as reference index matching blocks become, for example, surrounding color blocks used to generate a predicted motion vector according to the MVC standard.

That is, in case of, for example, the 16×16 type, surrounding color blocks used to generate a predicted motion vector according to the MVC standard are three of the surrounding color block A neighboring on the left of the target block X, the surrounding color block B neighboring on the upper side and the surrounding color block C neighboring on the diagonal upper right as illustrated in FIG. 10, and, the three surrounding color blocks A to C are targets to be counted as the reference index matching blocks.

That is, in case of, for example, the 8×16 type and the 16×8 type, a surrounding color block used to generate a predicted motion vector according to the MVC standard is only one surrounding color block A neighboring on the left of the target block X, only one surrounding color block B neighboring on the upper side or only one surrounding color block C neighboring on the diagonal upper right, and, one surrounding color block is a target to be counted as the reference index matching block.

Consequently, the range of the number of the reference index matching blocks of the 8×16 type and the 16×8 type is 0 or 1.

Figure 18:
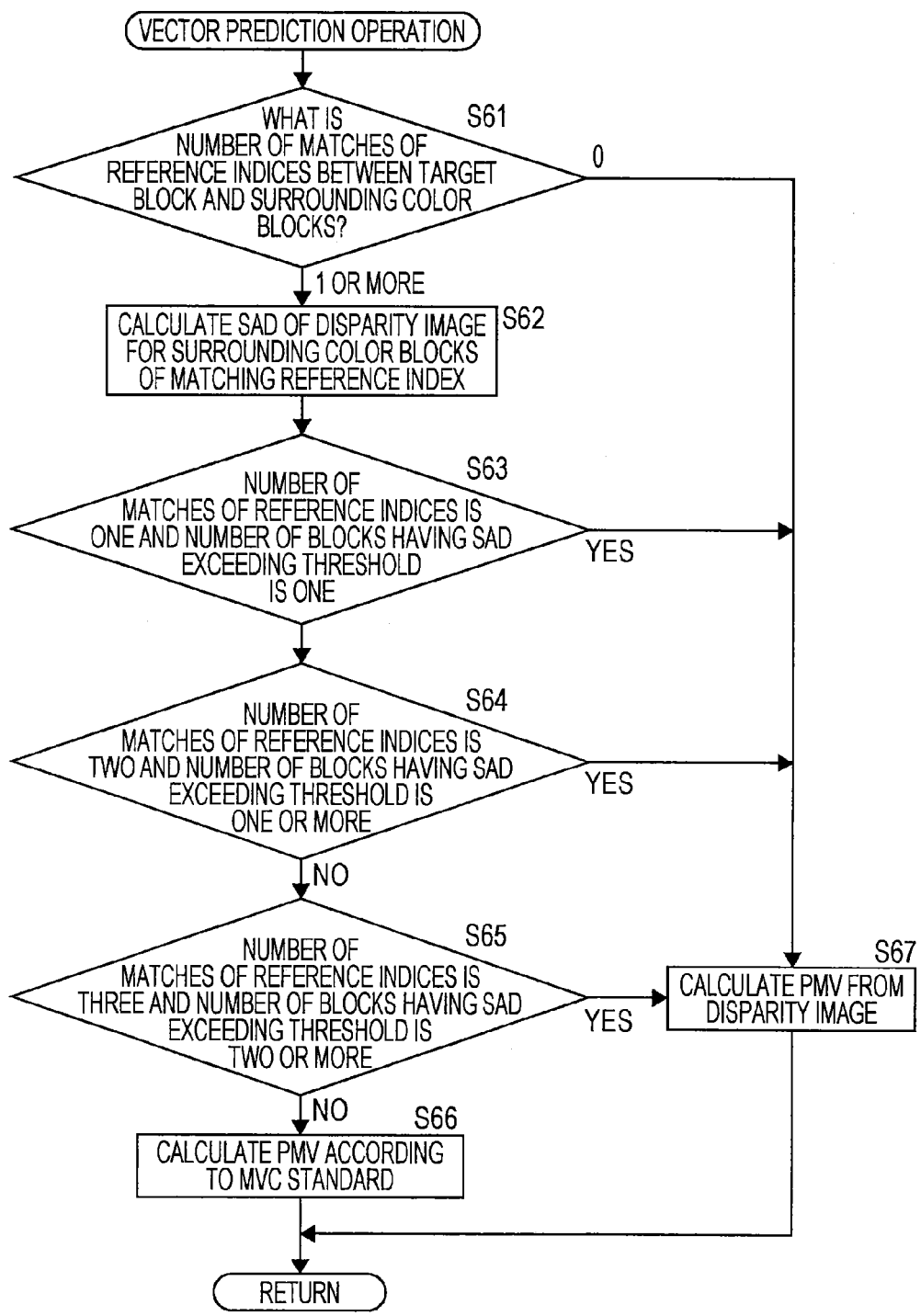
FIG. 18 is a flowchart for explaining a vector prediction operation.

FIG. 18 is a flowchart for explaining a vector prediction operation performed on each macro block type by the predicted motion vector generation unit 243 (FIG. 13) in steps S53 to S56 in FIG. 16.

In step S61, the predicted motion vector generation unit 243 determines the number of reference index matching blocks which have reference indices which represent reference pictures which are referred to to generate a predicted image and which match the target block among surrounding color blocks (for example, the three surrounding color blocks CA to CC in FIG. 3) in the surrounding of the target block in the color image C#2 based on encoding information.

When it is determined in step S61 that the number of reference index matching blocks is zero, the operation moves to step S67, the predicted motion vector generation unit 243 generates a predicted motion vector of a target block from the decoded disparity image D#2 according to the disparity information use prediction standard and the operation returns.

Further, when it is determined in step S61 that the number of reference index matching blocks is one or more, the operation moves to step S62, the predicted motion vector generation unit 243 calculates for the reference index matching blocks disparity SADs which are SADs as values corresponding to differences between the surrounding disparity blocks (for example, the surrounding disparity blocks DA to DC in FIG. 3) of the decoded disparity image D#2 at the same position as those of this reference index matching block and the same position block (the same position block DX in FIG. 3), and the operation moves to step S63.

In step S63, the predicted motion vector generation unit 243 determines whether or not the number of reference index matching blocks is one and the number of reference index matching blocks which have disparity SADs exceeding a predetermined threshold is one.

When it is determined in step S63 that the number of reference index matching blocks is one and it is determined that the number of reference index matching blocks which have disparity SADs exceeding a predetermined value is one, the operation moves to step S67, the predicted motion vector generation unit 243 generates a predicted motion vector of a target block from the decoded disparity image D#2 according to the disparity information use prediction standard, and the operation returns.

Further, when it is determined in step S63 that the number of reference index matching blocks is not one or when it is determined that, even if the number of reference index matching block is one, the number of reference index matching blocks which have disparity SADs exceeding a predetermined threshold is not one, the operation moves to step S64, and the predicted motion vector generation unit 243 determines whether or not the number of reference index matching blocks is two and the number of reference index matching blocks which have disparity SADs exceeding a predetermined threshold is one or more.

When it is determined in step S64 that the number of reference index matching blocks is two and it is determined that the number of reference index matching blocks which have disparity SADs exceeding a predetermined value is one or more, the operation moves to step S67, the predicted motion vector generation unit 243 generates a predicted motion vector of a target block from the decoded disparity image D#2 according to the disparity information use prediction standard, and the operation returns.

Further, when it is determined in step S64 that the number of reference index matching blocks is not two or when it is determined that, even if the number of reference index matching block is two, the number of reference index matching blocks which have disparity SADs exceeding a predetermined threshold is not one or more, the operation moves to step S65, and the predicted motion vector generation unit 243 determines whether or not the number of reference index matching blocks is three and the number of reference index matching blocks which have disparity SADs exceeding a predetermined threshold is two or more.

When it is determined in step S65 that the number of reference index matching blocks is three and it is determined that the number of reference index matching blocks which have disparity SADs exceeding a predetermined value is two or more, the operation moves to step S67, the predicted motion vector generation unit 243 generates a predicted motion vector of a target block from the decoded disparity image D#2 according to the disparity information use prediction standard, and the operation returns.

Further, when it is determined in step S65 that the number of reference index matching blocks is not three or it is determined that, even if the number of reference index matching blocks is three, the number of reference index matching blocks which have disparity SADs exceeding a predetermined threshold is not two or more, the operation moves to step S66, the predicted motion vector generation unit 243 generates a predicted motion vector of the target block according to the MVC standard, and the operation returns.

As described above, in the vector prediction operation, based on a disparity SAD corresponding to a difference between a surrounding disparity block at the same position as that of the reference index matching block and the same position block, it is possible to obtain a predicted motion vector which is precisely predicted by generating as a predicted motion vector used for the operation of the target block a predicted motion vector which is precisely estimated among the predicted motion vector according to the disparity information use prediction standard and the predicted motion vector according to the MVC standard.

[Embodiment of Multi-View Image Decoder to which Present Technique is Applied]

Figure 19:
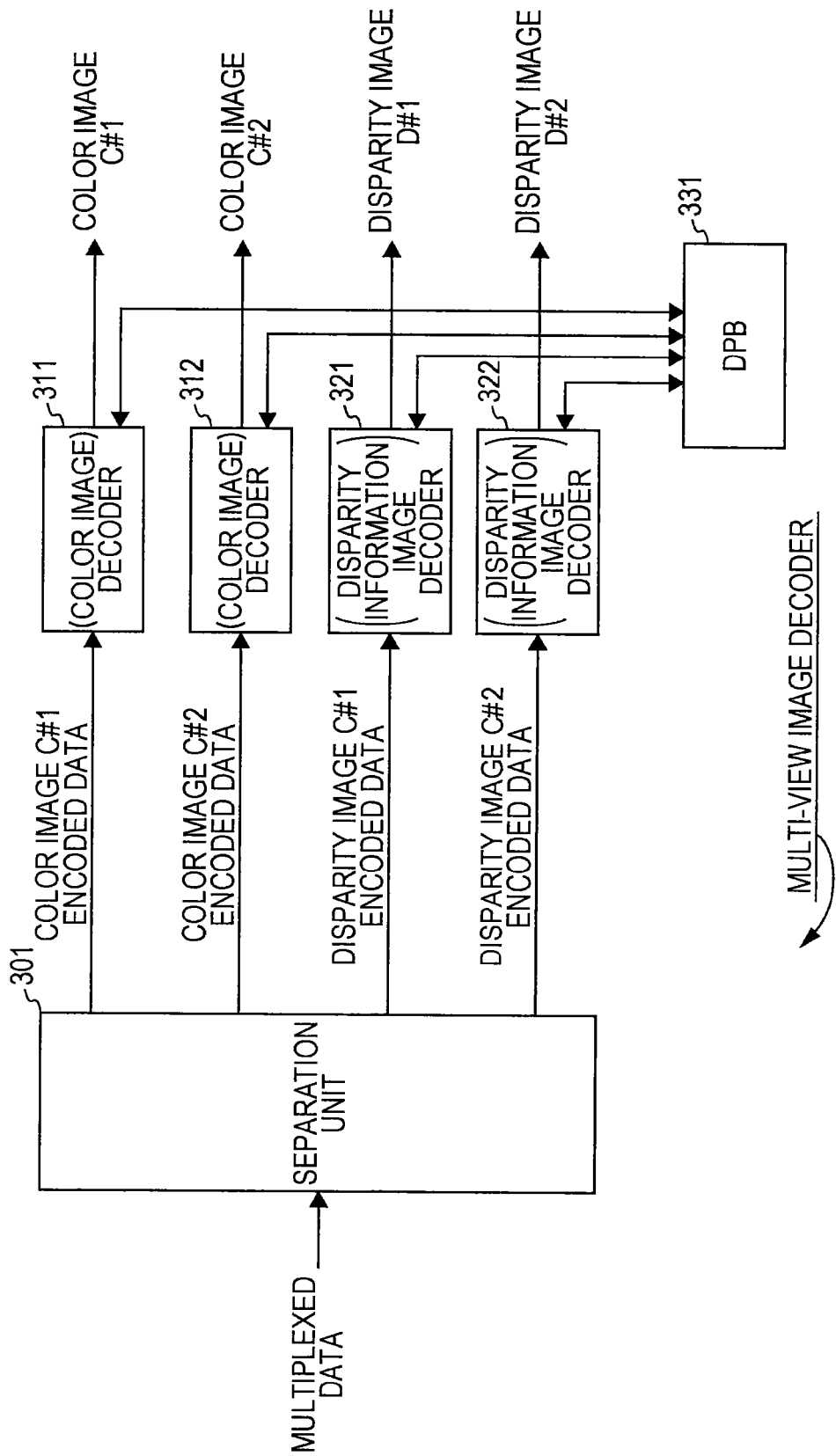
FIG. 19 is a block diagram illustrating an example structure of an embodiment of a multi-view image decoder to which the present technique is applied.

FIG. 19 is a block diagram illustrating an example structure of an embodiment of a multi-view decoder to which the present technique is applied.

A multi-view image decoder in FIG. 19 is a decoder which decodes data obtained by encoding a plurality of viewpoint images using, for example, MVC standard, and the same operations as those in the MVC standard will not be adequately described below.

In addition, the multi-view decoder is not limited to the decoder which uses the MVC standard.

The multi-view image decoder in FIG. 19 decodes multiplexed data outputted from the multi-view image encoder in FIG. 4 to the viewpoint #1 color image C#1 and the viewpoint #2 color image C#2 which are the two viewpoint #1 and viewpoint #2 color images and the viewpoint #1 disparity image D#1 and the viewpoint #2 disparity image D#2 which are two viewpoint #1 and #2 disparity information images.

In FIG. 19, the multi-view image decoder has a separating unit 301, decoders 311, 312, 321 and 322 and a DPB 331.

The multiplexed data outputted from the multi-view image encoder in FIG. 4 is supplied to the separating unit 301 through a recording medium or a transmission medium which is not illustrated.

The separating unit 301 separates color image C#1 encoded data, color image C#2 encoded data, disparity image D#1 encoded data and disparity image D#2 encoded data from multiplexed data supplied thereto.

Further, the separating unit 301 supplies the color image C#1 encoded data to the decoder 311, the color image C#2 encoded data to the decoder 312, the disparity image D#1 encoded data to the decoder 321 and the disparity image D#2 encoded data to the decoder 322.

The decoder 311 decodes the color image C#1 encoded data from the separating unit 301, and outputs the resulting color image C#1.

The decoder 312 decodes the color image C#2 encoded data from the separating unit 301, and outputs the resulting color image C#2.

The decoder 321 decodes the disparity image D#1 encoded data from the separating unit 301, and outputs the resulting disparity image D#1.

The decoder 322 decodes the disparity image D#2 encoded data from the separating unit 301, and outputs the resulting disparity image D#2.

The DPB 331 temporarily stores a decoded image obtained by decoding a decoding target image in the decoders 311, 312, 321 and 322 as a reference picture (candidate) which is referred to upon generation of a predicted image.

That is, the decoders 311, 312, 321 and 322 decode images subjected to predictive encoding in the encoders 11, 12, 21 and 22 in FIG. 4.

A predicted image used upon predictive encoding is required to decode the image subjected to predictive encoding, and therefore the decoders 311, 312, 321 and 322 temporarily decode a decoding target image and then temporarily store the decoded image which is used to generate a predicted image, in the DPB 331 to generate a predicted image used upon predictive encoding.

The DPB 331 is a common buffer which temporarily stores decoded images obtained by the decoders 311, 312, 321 and 322, and selects a reference picture which is referred to to decode a decoding target image, from a decoded image stored in the DPB 331 and generates a predicted image using this reference picture.

The DPB 331 is shared between the decoders 331, 312, 321 and 322, so that the decoders 311, 312, 321 and 322 can also refer to the decoded images obtained by the other decoders in addition to the decoded image obtained each decoder.

[Example Structure of Decoder 311]

Figure 20:
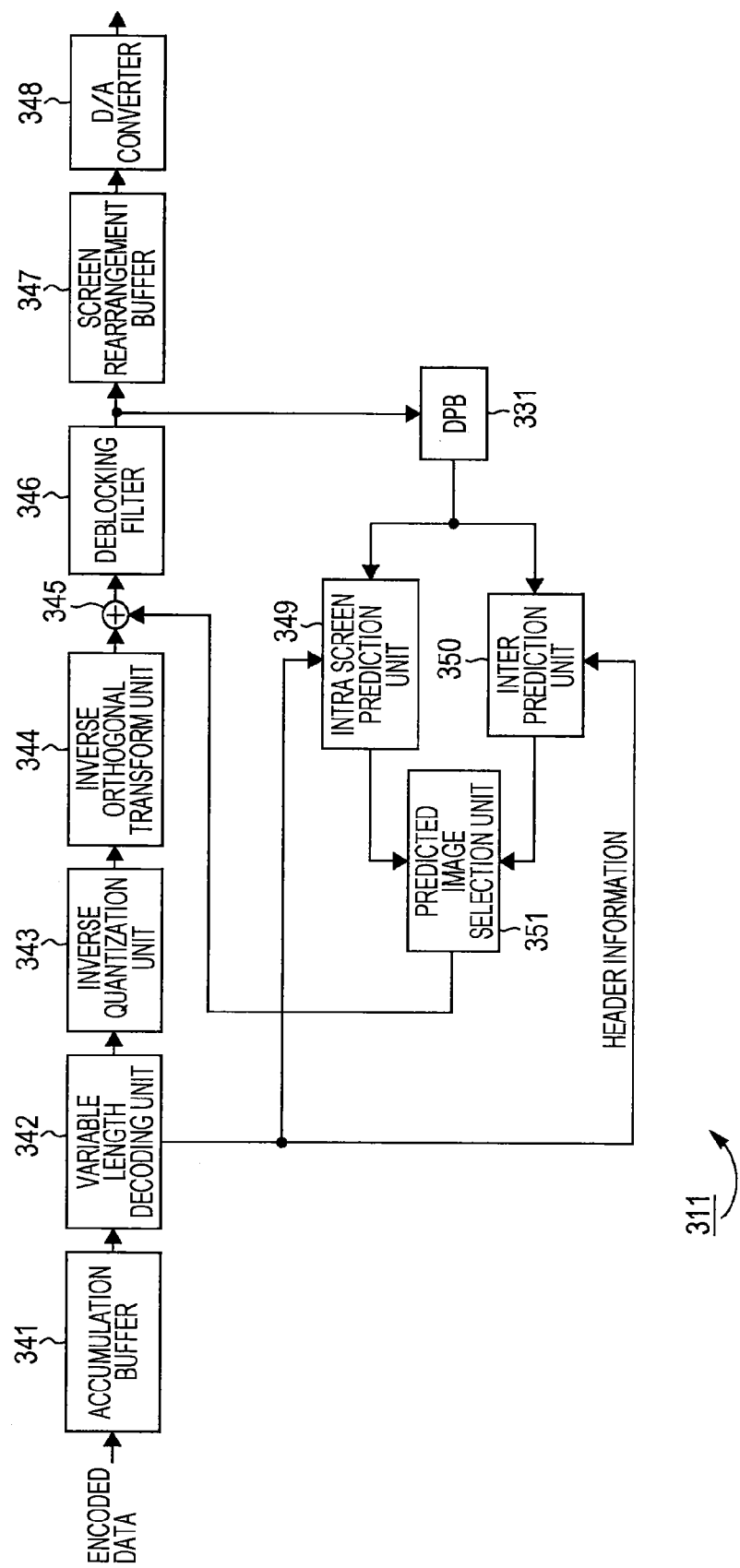
FIG. 20 is a block diagram illustrating an example structure of a decoder 311.

FIG. 20 is a block diagram illustrating an example structure of the decoder 311 in FIG. 19.

In addition, the decoders 321 and 322 in FIG. 19 also employ the same configurations as that of the decoder 311, and, for example, encode images according to, for example, the MVC standard.

In FIG. 20, the decoder 311 has an accumulation buffer 341, a variable length decoding unit 342, an inverse quantization unit 343, an inverse orthogonal transform unit 344, an arithmetic operation unit 345, a deblocking filter 346, a screen rearrangement buffer 347, a D/A converter 348, an intra screen prediction unit 349, an inter prediction unit 350 and a predicted image selection unit 351.

The accumulation buffer 341 receives a supply of the color image C#1 encoded data from the separating unit 301 (FIG. 19).

The accumulation buffer 341 temporarily stores encoded data supplied thereto, and supplies the encoded data to the variable length decoding unit 342.

The variable length decoding unit 342 restores a quantization value and header information by performing variable length decoding on encoded data from the accumulation buffer 341. Further, the variable length decoding unit 342 supplies the quantization value to the inverse quantization unit 343, and supplies header information to the intra screen prediction unit 349 and the inter prediction unit 350.

The inverse quantization unit 343 inversely quantizes the quantization value from the variable length decoding unit 342 to a transform coefficient, and supplies the transform coefficient to the inverse orthogonal transform unit 344.

The inverse orthogonal transform unit 344 performs an inverse transform on the transform coefficient from the inverse quantization unit 343, and supplies the transform coefficient to the arithmetic operation unit 345 in macro block units.

The arithmetic operation unit 345 obtains a decoded image by adding the predicted image supplied from the predicted image selection unit 351 where necessary to a target block which is a decoding target macro block supplied from the inverse orthogonal transform unit 344, and supplies the decoded image to the deblocking filter 346.

The deblocking filter 346 filters the decoded image from the arithmetic operation unit 345 in the same way as the deblocking filter 121 in FIG. 8, and supplies the filtered decoded image to the screen rearrangement buffer 347.

The screen rearrangement buffer 347 rearranges an arrangement of pictures in the original order (display order) by temporarily storing and reading a picture of a decoded image from the deblocking filter 346, and supplies the picture to the D/A (Digital/Analog) converter 348.

When needing to output a picture from the screen rearrangement buffer 347 as an analog signal, the D/A converter 348 performs a D/A conversion on and outputs this picture.

Further, the deblocking filter 346 supplies decoded images of the I picture, the P picture and the Bs picture which are referable pictures among the filtered decoded image, to the DBP 331.

Meanwhile, the DPB 331 stores a decoded image picture from the deblocking filter 346, that is, the color image C#1 picture as a reference picture which is referred to to generate a predicted image used for decoding performed later in time.

As described with reference to FIG. 19, the DPB 331 is shared between the decoders 311, 312, 321 and 322, and therefore stores the color image C#1 picture decoded by the decoder 311 and, in addition, the color image C#2 picture decoded by the decoder 312, the disparity image D#1 picture decoded by the decoder 321 and the disparity image D#2 picture decoded by the decoder 322.

The intra screen prediction unit 349 recognizes whether or not a target block is encoded using a predicted image generated by intra prediction (intra screen prediction) based on the header information from the variable length decoding unit 342.

When the target block is encoded using a predicted image generated by intra prediction, the intra screen prediction unit 349 reads a decoded portion (decoded image) of a picture (target picture) including the target block from the DPB 331 similar to the intra screen prediction unit 122 in FIG. 8. Further, the intra screen prediction unit 349 supplies part of the decoded image of the target picture read from the DPB 331 as a predicted image of the target block to the predicted image selection unit 351.

The inter prediction unit 350 recognizes whether or not a target block is encoded using a predicted image generated by inter prediction based on the header information from the variable length decoding unit 342.

When the target block is encoded using the predicted image generated by inter prediction, the inter prediction unit 350 recognizes a prediction reference index, that is, a reference index allocated to a reference picture used to generate the predicted image of the target block based on header information from the variable length decoding unit 342.

Further, the inter prediction unit 350 reads the reference picture to which the prediction reference index is allocated, from the reference picture stored in the DPB 331.

Furthermore, the inter prediction unit 350 recognizes a displacement vector (a disparity vector or a motion vector) used to generate the predicted image of the target block based on header information from the variable length decoding unit 342, and generates the predicted image by performing displacement compensation (motion compensation of compensating for displacement corresponding to a motion or disparity compensation of compensating for displacement corresponding to a displacement) on the reference picture according to this displacement vector similar to the inter prediction unit 123 in FIG. 8.

That is, the inter prediction unit 350 acquires as the predicted image the block (corresponding block) of the reference picture at a position (displaced) moved from the position of the target block according to the displacement vector of this target block.

Further, the inter prediction unit 350 supplies the predicted image to the predicted image selection unit 351.

The predicted image selection unit 351 selects and supplies the predicted image to the arithmetic operation unit 345 when receiving a supply of the predicted image from the intra screen prediction unit 349, and selects and supplies the predicted image to arithmetic operation unit 345 when receiving a supply of the predicted image from the inter prediction unit 350.

[Example Structure of Decoder 322]

Figure 21:
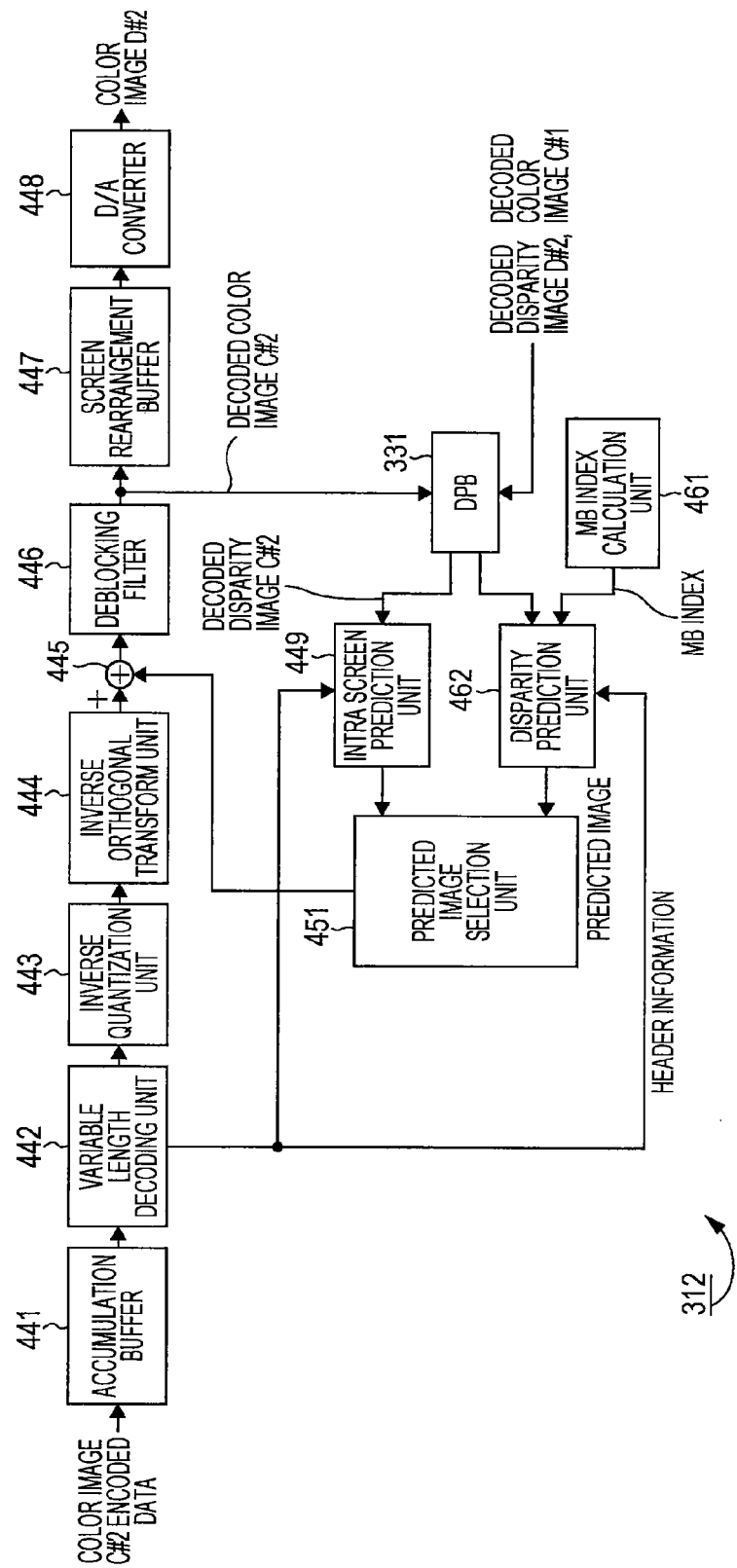
FIG. 21 is a block diagram illustrating an example structure of a decoder 312.

FIG. 21 is a block diagram illustrating an example structure of the decoder 312 in FIG. 19.

The decoder 312 decodes the viewpoint #2 color image C#2 encoded data which is a decoding target using the MVC standard, that is, in the same way as local decoding performed by the encoder 12 in FIG. 12.

In FIG. 21, the decoder 312 has an accumulation buffer 441, a variable length decoding unit 442, an inverse quantization unit 443, an inverse orthogonal transform unit 444, an arithmetic operation unit 445, a deblocking filter 446, a screen rearrangement buffer 447, a D/A converter 448, an intra screen prediction unit 449, a predicted image selection unit 451, an MB index calculation unit 461 and a disparity prediction unit 462.

The accumulation buffer 441 to the intra screen prediction unit 449 and the predicted image selection unit 451 employ the same configurations as the accumulation buffer 341 to the intra screen prediction unit 349 in FIG. 20 and the predicted image selection unit 351, and therefore will not be described adequately.

In FIG. 21, the DPB 331 receives a supply of a decoded image, that is, the decoded color image C#2 picture which is a color image decoded in the decoder 312 from the deblocking filter 446, and stores the picture as the reference picture.

Further, as described with reference to FIGS. 19 and 20, the DPB 331 also receives a supply of and stores the color image (decoded color image) C#1 picture decoded by the decoder 311, the disparity image (decoded disparity image) D#1 picture decoded by the decoder 321 and the disparity image (decoded disparity image) D#2 decoded by the decoder 322.

Meanwhile, the decoder 312 uses the decoded color image C#2 picture from the deblocking filter 446, and, in addition, the decoded color image C#1 obtained by the decoder 311 and the decoded disparity image D#2 obtained by the decoder 322 to decode the color image C#2 which is a decoding target, and then FIG. 21 illustrates arrows indicating that the decoded color image C#1 obtained by the decoder 311 and the decoded disparity image D#2 obtained by the decoder 322 are supplied to the DPB 331.

The MB index calculation unit 461 calculates an MB index of the target block similar to the MB index calculation unit 231 in FIG. 12, and supplies the MB index to the disparity prediction unit 462.

The disparity prediction unit 462 recognizes whether or not a target block is encoded using a predicted image generated by disparity prediction (inter prediction) based on the header information from the variable length decoding unit 442.

When the target block is encoded using the predicted image generated by disparity prediction, the disparity prediction unit 462 recognizes (acquires) a prediction reference index, that is, a reference index allocated to a reference picture used to generate the predicted image of the target block based on header information from the variable length decoding unit 442.

Further, the disparity prediction unit 462 selects as a reference picture a picture to which the prediction reference index is allocated in the decoded color image C#1 picture stored in the DPB 331.

Furthermore, the disparity prediction unit 462 restores the calculated disparity vector used to generate a predicted image of a candidate block based on the header information from the variable length decoding unit 442, and generates a predicted image by performing disparity prediction according to this calculated disparity vector similar to the disparity prediction unit 232 in FIG. 12.

That is, the disparity prediction unit 462 acquires as a predicted image a block (corresponding block) of the reference picture at a position moved (displaced) according to the calculated disparity vector of this target block from the position of the target block.

Further, the disparity prediction unit 462 supplies the predicted image to the predicted image selection unit 451.

In addition, although the disparity prediction unit 462 which performs only disparity prediction of inter prediction is provided in the decoder 322 in FIG. 21 for ease of description similar to the encoder 12 in FIG. 12, when the encoder 12 in FIG. 12 also performs time prediction in addition to disparity prediction, the decoder 322 performs disparity prediction and time prediction (generation of a predicted image) in the same way as the encoder 12.

Figure 22:
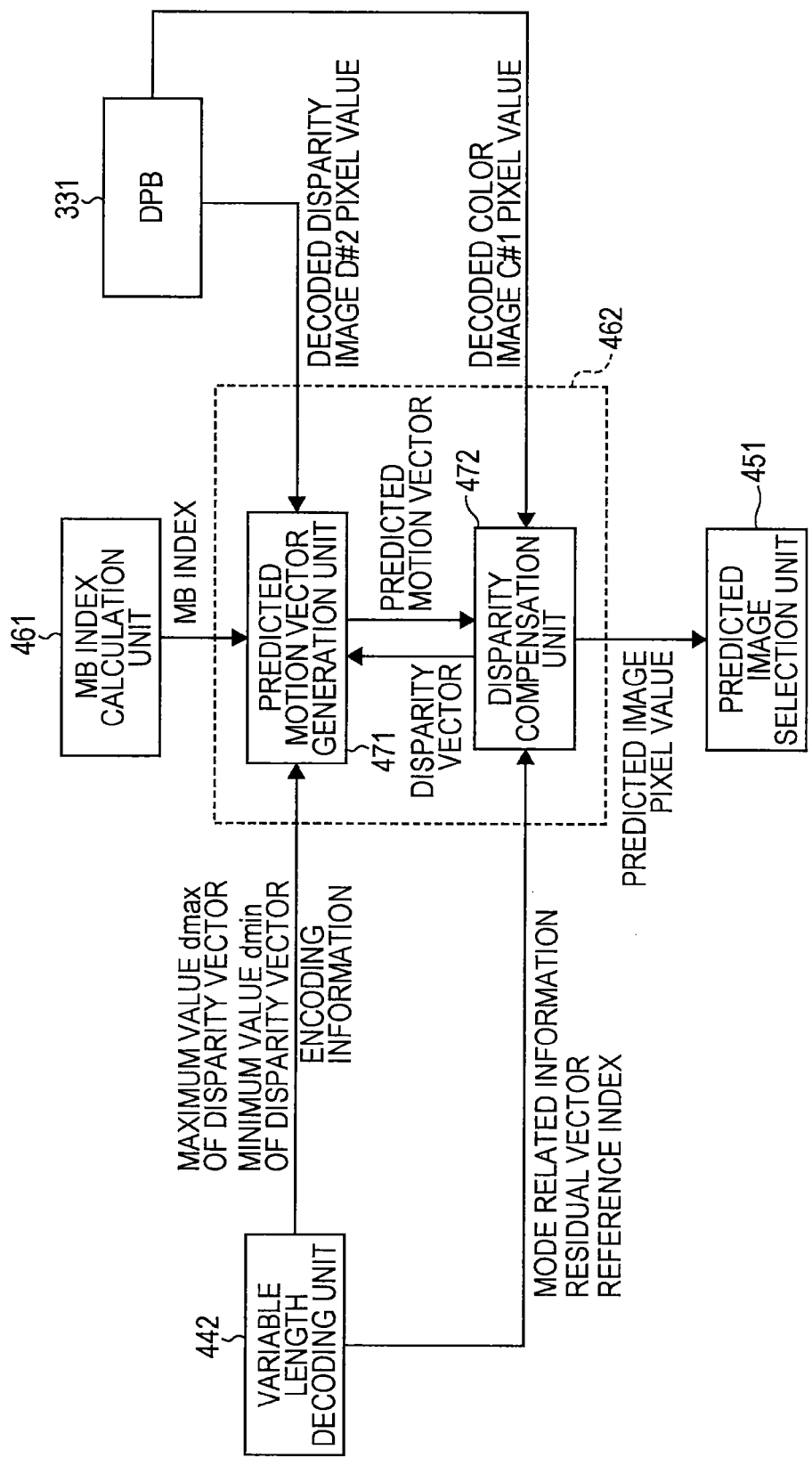
FIG. 22 is a block diagram illustrating an example structure of a disparity prediction unit 462.

FIG. 22 is a block diagram illustrating an example structure of the disparity prediction unit 462 in FIG. 21.

In FIG. 22, the disparity prediction unit 462 has a predicted motion vector generation unit 471 and a disparity compensation unit 472.

The predicted motion vector generation unit 471 receives a supply of the decoded disparity image D#2 picture stored in the DPB 331, and receives a supply of the MB index from the MB index calculation unit 461.

Further, the predicted motion vector generation unit 471 receives a supply of the disparity related information (FIG. 4) such as the maximum value dmax and the minimum value dmin of the image capturing disparity vector d (the viewpoint #2 image capturing disparity vector d2) included in the header information from the variable length decoding unit 442.

Furthermore, the predicted motion vector generation unit 471 receives a supply of encoding information of surrounding color blocks neighboring on the left, the upper side and the diagonal upper right of the target block, that is, for example, the surrounding color blocks CA to CC in FIG. 3 in the decoded color image C#2 block which is included in the header information from the variable length decoding unit 442, and encoding information of the target block.

Meanwhile, the encoding information of the surrounding color block included in the header information from the variable length decoding unit 442 includes mode related information (macro block type) of this surrounding color block and the reference index (prediction reference index), and the encoding information of the target block included in the header information from the variable length decoding unit 442 includes mode related information (macro block type) of this target block, a residual vector and the reference index (prediction reference index).

Further, the predicted motion vector generation unit 471 receives a supply of the calculated disparity vector of the decoded surrounding color block from the disparity compensation unit 472.

The predicted motion vector generation unit 471 recognizes a target block in the target picture based on the MB index from the MB index calculation unit 461.

Further, the predicted motion vector generation unit 471 generates the predicted motion vector of the target block using the decoded disparity image D#2 picture stored in the DPB 331, the disparity related information, the encoding information and the calculated disparity vectors of the surrounding color blocks from the disparity compensation unit 472 where necessary similar to the predicted motion vector generation unit 243 in FIG. 13, and supplies the predicted motion vector to the disparity compensation unit 472.

That is, the predicted motion vector generation unit 471 recognizes the macro block mode of the target block based on the encoding information of the target block, and generates as the predicted motion vector of the target block a predicted motion vector which is estimated to be precisely predicted among a predicted motion vector generated according to the disparity information use prediction standard and a predicted motion vector generated according to the MVC standard.

Meanwhile, disparity related information supplied to the predicted motion vector generation unit 471 is used to generate a predicted motion vector according to the disparity information use prediction standard similar to the predicted motion vector generation unit 243 in FIG. 13.

The disparity compensation unit 472 receives a supply of the predicted motion vector of the target block from the predicted motion vector generation unit 471 and, in addition, the mode related information of the target block, the residual vector and the prediction reference index included in the header information from the variable length decoding unit 442.

Further, the disparity compensation unit 472 receives a supply of the decoded color image C#1 picture which is a reference picture stored in the DPB 331.

The disparity compensation unit 472 restores the calculated disparity vector mv of the target block by adding the residual vector from the variable length decoding unit 442 and the predicted motion vector from the predicted motion vector generation unit 471.

Further, the disparity compensation unit 472 performs displacement compensation (disparity compensation) on a reference picture which is a picture to which the prediction reference index from the variable length decoding unit 442 is allocated in the decoded color image C#1 picture stored in the DPB 331, using the calculated disparity vector mv of the target block similar to the MVC standard, and generates the predicted image of the target block for the macro block type which represents the mode related information from the variable length decoding unit 442.

That is, the disparity compensation unit 472 acquires as a predicted image a corresponding block which is a block of the decoded color image C#1 picture at a position displaced by the calculated disparity vector mv from the position of the target block.

Further, the disparity compensation unit 472 supplies the predicted image to the predicted image selection unit 451.

Figure 23:
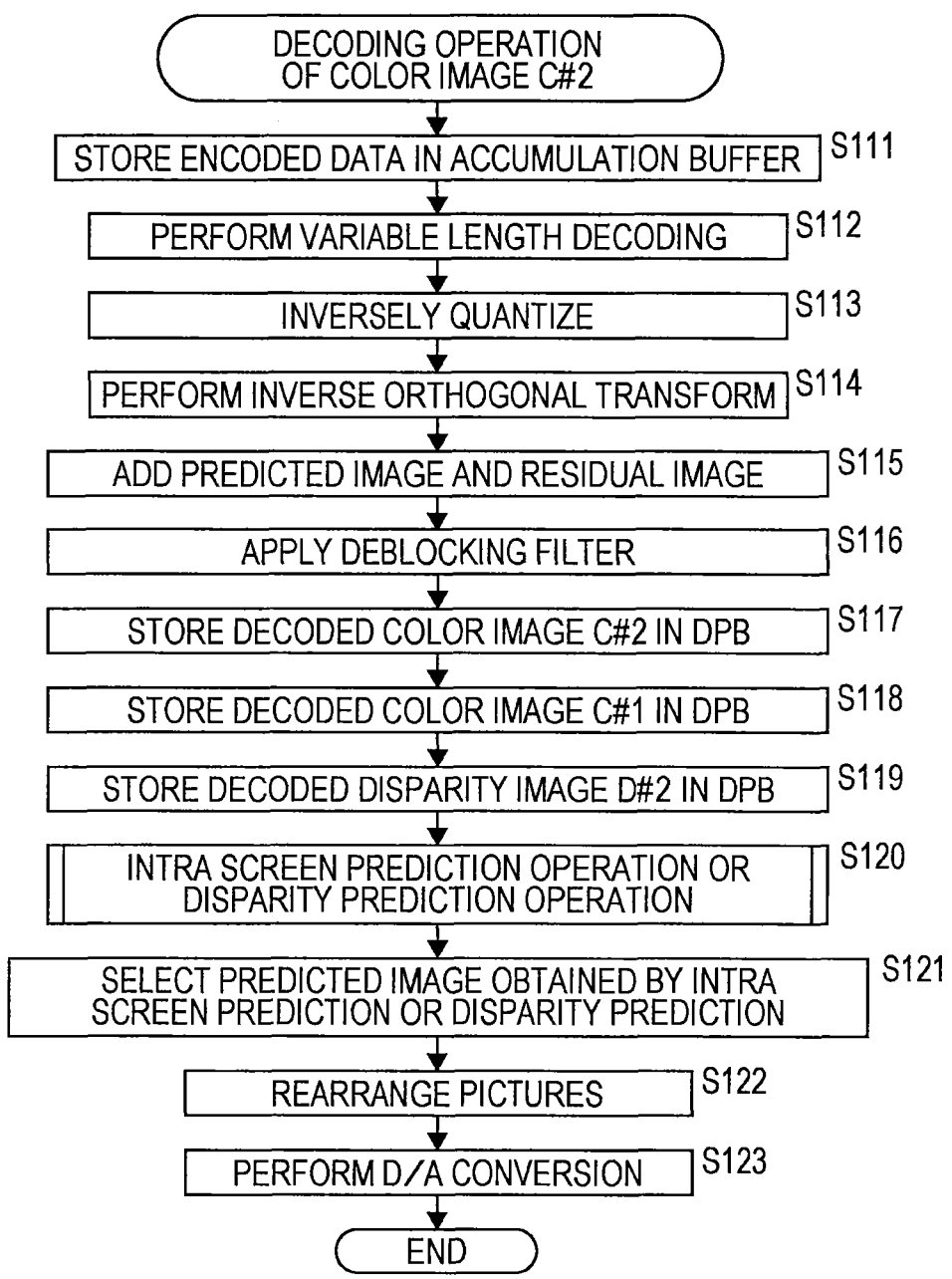
FIG. 23 is a flowchart for explaining a decoding operation of decoding viewpoint #2 color image C#2 encoded data.

FIG. 23 is a flowchart for explaining a decoding operation of decoding the viewpoint #2 color image C#2 encoded data by the decoder 322 in FIG. 21.

In step S111, the accumulation buffer 441 stores the viewpoint C#2 color image C#2 encoded data supplied thereto, and the operation moves to step S112.

In step S112, the variable length decoding unit 442 restores a quantization value and header information by reading encoded data stored in the accumulation buffer 441 and performing variable length decoding on the encoded data. Further, the variable length decoding unit 442 supplies the quantization value to the inverse quantization unit 443 and supplies the header information to the intra screen prediction unit 449 and the disparity prediction unit 450, and the operation moves to step S113.

In step S113, the inverse quantization unit 443 inversely quantizes the quantization value from the variable length decoding unit 442 to the transform coefficient and supplies the transform coefficient to the inverse orthogonal transform unit 444, and the operation moves to step S114.

In step S114, the inverse orthogonal transform unit 444 performs an inverse orthogonal transform on the transform coefficient from the inverse quantization unit 443 and supplies the transform coefficient to the arithmetic operation unit 445 in macro block units, and the operation moves to step S115.

In step S115, the arithmetic operation unit 445 obtains a decoded image by adding the predicted image supplied from the predicted image selection unit 451 where necessary to a target block (residual image) which is a decoding target macro block supplied from the inverse orthogonal transform unit 444. Further, the arithmetic operation unit 445 supplies the decoded image to the deblocking filter 446, and the operation moves from step S115 to step S116.

In step S116, the deblocking filter 446 filters the decoded image from the arithmetic operation unit 445 and supplies the filtered decoded image (decoded color image C#2) to the DPB 331 and the screen rearrangement buffer 447, and the operation moves to step S117.

In step S117, the DPB 331 stores the decoded color image C#2 from the deblocking filter 446, and the operation moves to step S118.

In step S118, the DPB 331 waits for a supply of the decoded color image C#1 from the decoder 311 which decodes the color image C#1 and stores the decoded color image C#1, and the operation moves to step S119.

In step S119, the DPB 331 waits for a supply of the decoded disparity image D#2 from the decoder 322 which decodes the disparity image D#2 and stores this decoded disparity image D#2, and the operation moves to step S120.

In step S120, the intra screen prediction unit 449 and the disparity prediction unit 462 recognizes which one of prediction standards of intra prediction (intra screen prediction) and disparity prediction (inter prediction) is used to generate a predicted image used to encode the next target block (a macro block of a next decoding target), based on the header information supplied from the variable length decoding unit 442.

Further, when the next target block is encoded using the predicted image generated by intra screen prediction, the intra screen prediction unit 449 performs an intra prediction operation (intra screen prediction operation).

That is, the intra screen prediction unit 449 performs intra prediction (intra screen prediction) of generating a predicted image (a predicted image of intra prediction) from the decoded color image C#2 picture stored in the DPB 331, on the next target block and supplies this predicted image to the predicted image selection unit 451, and the operation moves from step S120 to step S121.

Further, when the next target block is encoded using the predicted image generated by disparity prediction (inter prediction), the disparity prediction unit 462 performs a disparity prediction operation (inter prediction operation).

That is, the disparity prediction unit 462 selects for the next target block as a reference picture a picture which is included in the header information from the variable length decoding unit 442 and to which a prediction reference index of the next target block is allocated in the decoded color image C#1 picture stored in the DPB 331.

Further, the disparity prediction unit 462 generates a predicted image by performing disparity prediction (disparity compensation) using, for example, mode related information included in the header information from the variable length decoding unit 442 and supplies this predicted image to the predicted image selection unit 451, and the operation moves from step S120 to step S121.

In step S121, the predicted image selection unit 451 selects a predicted image supplied from one of the intra screen prediction unit 449 and the disparity prediction unit 462 and supplies this predicted image to the arithmetic operation unit 445, and the operation moves to step S122.

Meanwhile, the predicted image selected by the predicted image selection unit 451 in step S121 is used for the operations in step S115 performed upon decoding of the next target block.

In step S122, the screen rearrangement buffer 447 temporarily stores and reads the decoded disparity image D#2 picture from the deblocking filter 446, rearranges an arrangement of pictures in the original order and supplies the pictures to the D/A converter 448, and the operation moves to step S123.

In step S123, when needing to output a picture from the screen rearrangement buffer 447 as an analog signal, the D/A converter 348 performs a D/A conversion on and outputs this picture.

The decoder 312 repeatedly performs the operations in above steps S111 to S123 adequately.

Figure 24:
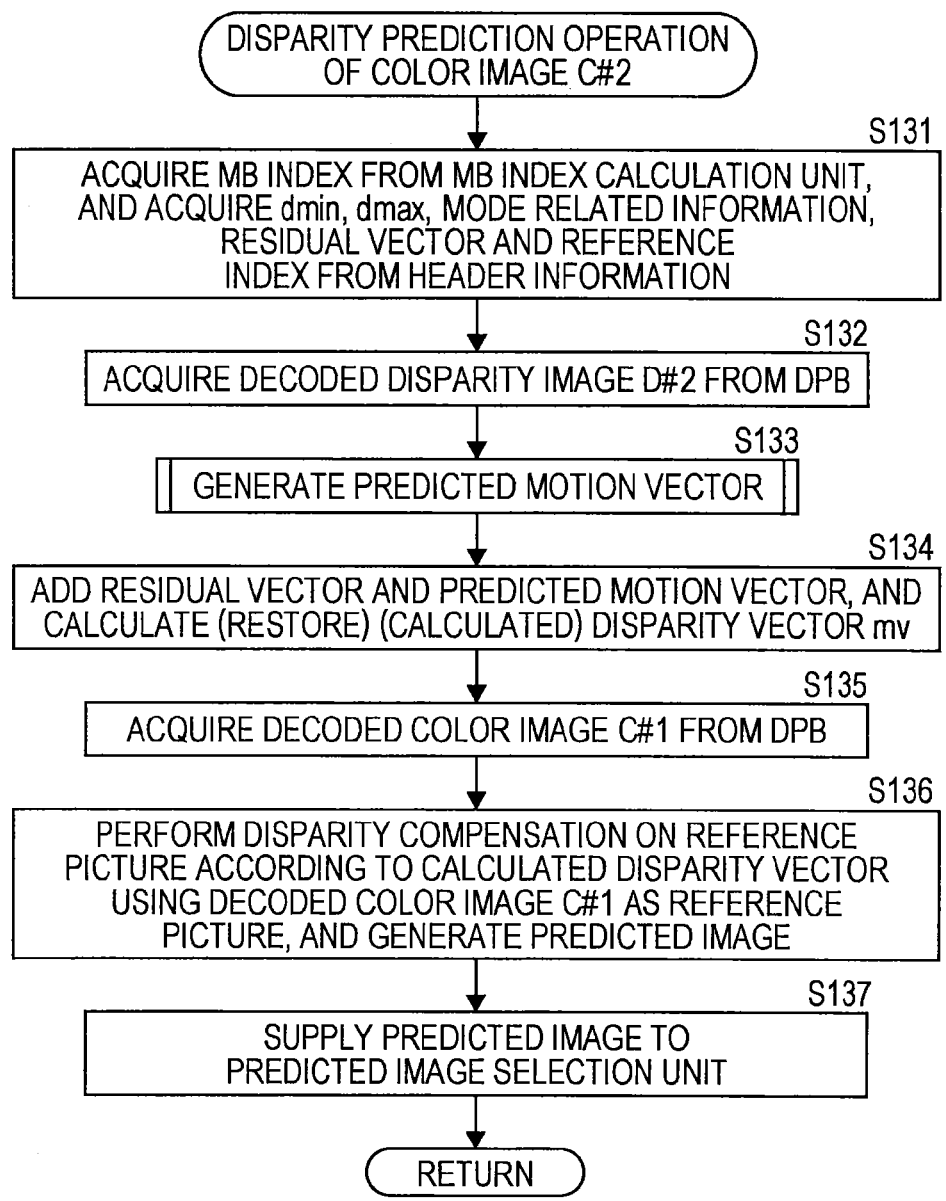
FIG. 24 is a flowchart for explaining a disparity prediction operation.

FIG. 24 is a flowchart for explaining a disparity prediction operation performed by the disparity prediction unit 462 in FIG. 22 in step S120 in FIG. 23.

In step S131, the disparity prediction unit 462 acquires an MB index of a (next) target block from the MB index calculation unit 461, and supplies the MB index to the predicted motion vector generation unit 471.

Further, the disparity prediction unit 462 acquires the disparity related information (FIG. 4) such as the maximum value dmax and the minimum value dmin of the image capturing disparity vector d (the viewpoint #2 image capturing disparity vector d2) included in the header information from the variable length decoding unit 442, and supplies the disparity related information to the predicted motion vector generation unit 471.

Furthermore, the disparity prediction unit 462 acquires encoding information (the mode related information, the residual vector and the prediction reference index) of the (next) target block included in the header information from the variable length decoding unit 442 and supplies the encoding information to the predicted motion vector generation unit 471 and the disparity compensation unit 472, and the operation moves from step S131 to step S132.

In step S132, the disparity prediction unit 462 acquires the decoded disparity image D#2 picture (a picture at the same time as the target picture) from the DPB 331 and supplies the picture to the predicted motion vector generation unit 471, and the operation moves to step S133.

In step S133, the predicted motion vector generation unit 471 recognizes the (next) target block in the target picture based on the MB index from the MB index calculation unit 461, and performs a predicted motion vector generation operation of generating the predicted motion vector of this target block.

Further, the predicted motion vector generation unit 471 supplies the predicted motion vector of the target block obtained by the predicted motion vector generation operation to the disparity compensation unit 472, and the operation moves from step S133 to step S134.

In step S134, the disparity compensation unit 472 restores the calculated disparity vector mv of the target block by adding the residual vector of the target block included in header information from the variable length decoding unit 442 and the predicted motion vector from the predicted motion vector generation unit 471, and the operation moves to step S135.

In addition, the disparity compensation unit 472 supplies the calculated disparity vector mv of the target block to the predicted motion vector generation unit 471. The predicted motion vector generation unit 471 performs the above predicted motion vector generation operation in step S133 using the calculated disparity vector mv supplied from the disparity compensation unit 472 as a calculated disparity vector of a surrounding color block of a block which becomes a target block later.

In step S135, the disparity compensation unit 472 acquires as a reference picture the decoded color image C#1 picture to which the prediction reference index of the target block is allocated, from the DPB 331, and the operation moves to step S136.

In step S136, the disparity compensation unit 472 generates a predicted image of the target block by performing MC on the decoded color image C#1 picture which is the reference picture from the DPB 331, according to the calculated disparity vector mv of the target block, and the operation moves to step S137.

That is, the disparity compensation unit 472 acquires as a predicted image a corresponding block which is a block of the decoded color image C#1 picture at a position displaced by the calculated disparity vector mv from the position of the target block.

In step S137, the disparity compensation unit 472 supplies the predicted image to the predicted image selection unit 451, and the operation returns.

Figure 25:
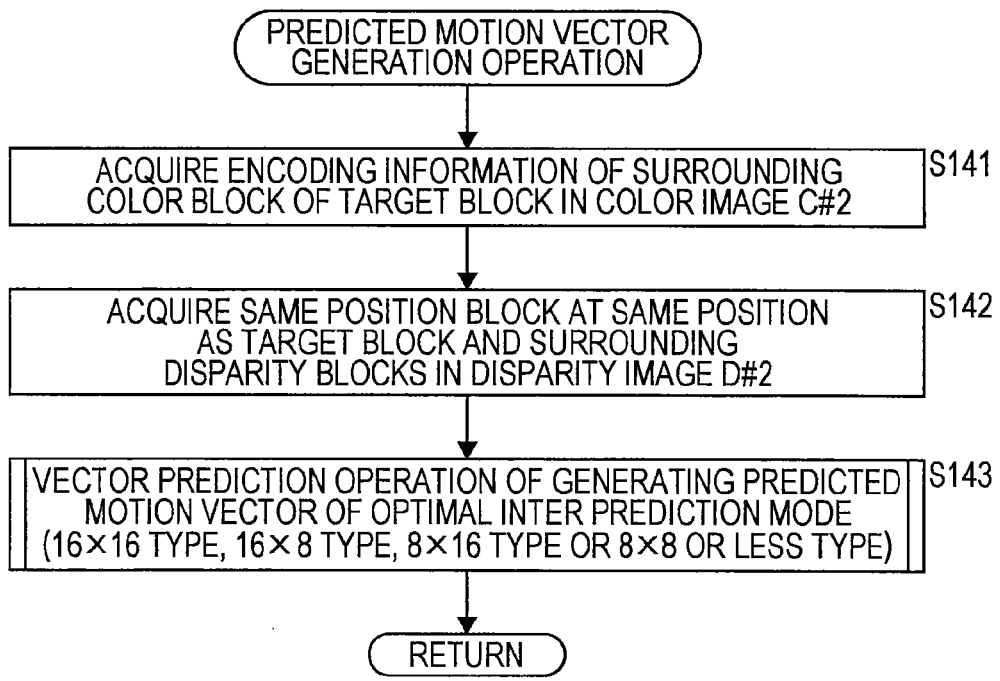
FIG. 25 is a flowchart for explaining a predicted motion vector generation operation.

FIG. 25 is a flowchart for explaining a predicted motion vector generation operation performed by the predicted motion vector generation unit 471 (FIG. 22) in step S133 in FIG. 24.

In step S141, the predicted motion vector generation unit 471 acquires encoding information of the encoded color image C#2 surrounding color blocks (for example, the three surrounding blocks CA to CC in FIG. 3) from the header information from the variable length decoding unit 442, and the operation moves to step S142.

In step S142, the predicted motion vector generation unit 471 acquires a block (same position block) which is at the same position as that of the target block and surrounding disparity blocks (a block of the decoded disparity image D#2 picture which is at the same position as those of the surrounding color blocks from which the encoding information is acquired in step S141) (for example, the three surrounding disparity blocks DA to DC in FIG. 3) in the surrounding of this same position block from the decoded disparity image D#2 picture (the picture at the same time as the target picture) from the DPB 331, and the operation moves to step S143.

In step S143, the predicted motion vector generation unit 471 generates a predicted motion vector of the target block of a macro block mode which is an optimal inter prediction mode indicated by mode related information included in the encoding information of the target block by performing the same vector prediction operation as described with reference to FIGS. 17 and 18 using, for example, the information acquired in steps S141 and S142 where necessary.

Further, the predicted motion vector generation unit 471 supplies the predicted motion vector of the target block to the disparity compensation unit 472, and the operation returns.

In addition, although the MVC standard (median prediction standard) has been adopted above as a vector prediction standard other than the disparity information use prediction standard, for example, the SAD minimum prediction standard described with reference to FIGS. 1 and 2 can be additionally adopted as the vector prediction standard other than the disparity information use prediction standard.

[Method of Estimating Prediction Precision Based on Encoding Cost]

Figure 26:
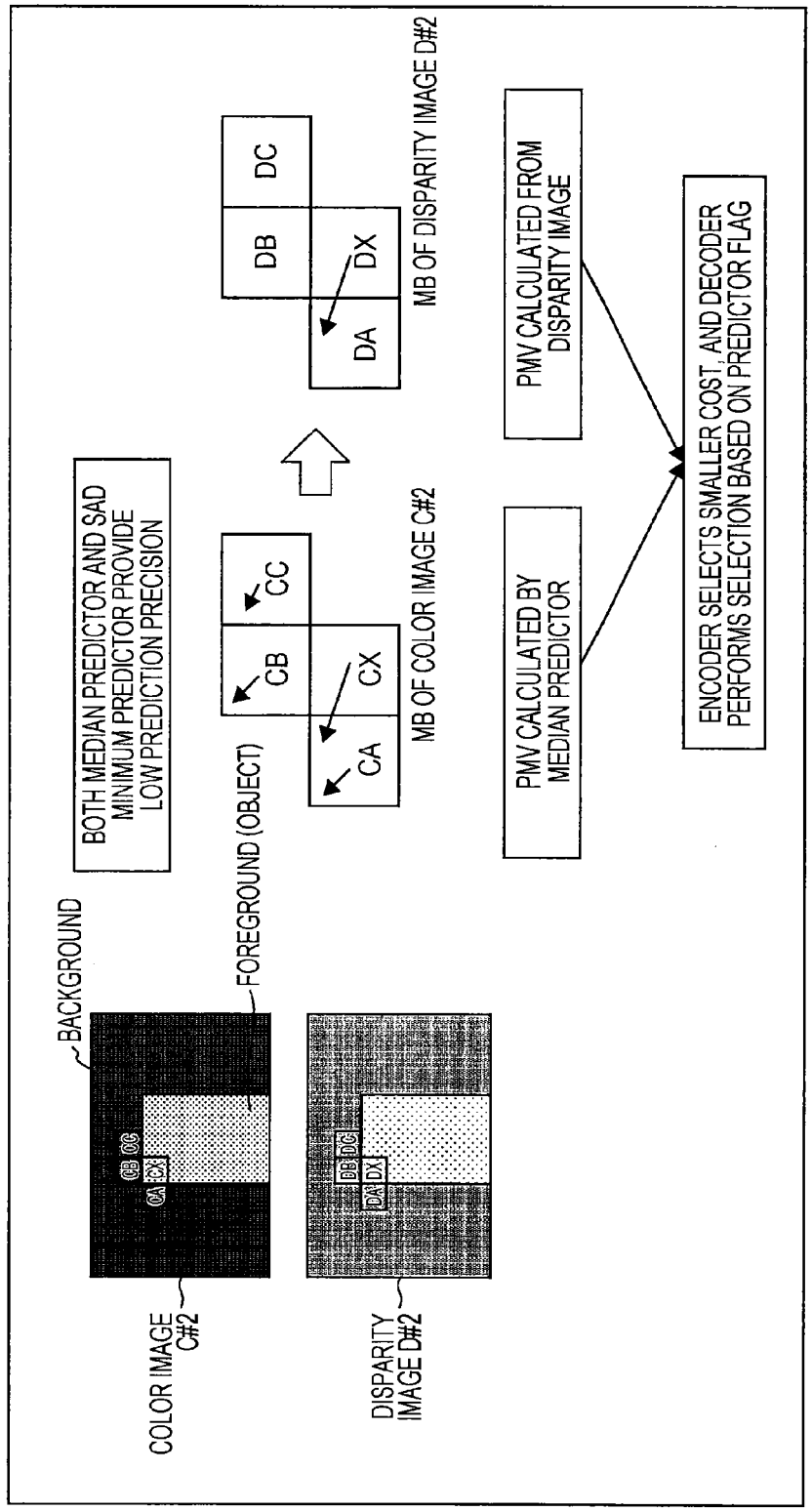
FIG. 26 is a view for explaining a method of estimating prediction precision according to a disparity information use prediction standard and the MVC standard based on an encoding cost.

FIG. 26 is a view for explaining a method of estimating prediction precision according to a disparity information use prediction standard and the MVC standard (median prediction standard) based on an encoding cost.

Meanwhile, while, in FIG. 3, prediction precision according to the disparity information use prediction standard and the median prediction standard (MVC standard) is estimated based on SADs (disparity SADs), between the surrounding disparity blocks DA to DC of the disparity (information) image D#2 and the same position block DX, and a predicted motion vector is generated according to a vector prediction standard which is estimated to provide better prediction precision among the disparity information use prediction standard and the median prediction standard, prediction precision according to the disparity information use prediction standard and the median prediction standard can be estimated based on the encoding cost of the target block.

Similar to FIGS. 2A and 3, in FIG. 26, a background and a rectangular foreground which is an object existing in front of this background are shown in the color image C#2, and the color image C#2 target block CX is the upper left block of the rectangular foreground.

Hence, the surrounding color block CA neighboring on the left of the target block CX, the surrounding color block CB neighboring on the upper side and the surrounding color block CC neighboring on the diagonal upper right side are all background blocks.

As described above, when the target block CX is the foreground block and the surrounding color blocks CA to CC are background blocks, even the median prediction standard (median predictor) or the SAD minimum prediction standard (SAD minimum predictor) provides poor prediction precision of the predicted motion vector as described with reference to FIG. 2A.

Hence, the present technique calculates the encoding cost COSTD obtained by encoding a target block using the predicted motion vector PMVD according to the disparity information use prediction standard (disparity information use predictor) and the encoding cost COSTC obtained by encoding a target block using the predicted motion vector PMVC according to the median prediction standard (median predictor).

Further, based on the encoding costs COSTD and COSTC, a predicted motion vector of a smaller encoding cost of the predicted motion vector PMVD according to the disparity information use prediction standard and the predicted motion vector PMVC according to the median prediction standard is selected as a predicted motion vector of the target block.

In addition, when the predicted motion vector of the target block is selected based on the encoding costs COSTD and COSTC as described above, the decoder side has difficulty in calculating the encoding costs COSTD and COSTC, and therefore the present technique transmits to the decoder side a predictor flag which is a flag which represents a smaller encoding cost among the predicted motion vector PMVD according to the disparity information use prediction standard and the predicted motion vector PMVC according to the median prediction standard (selected as the predicted motion vector of the target block).

Further, the decoder side generates as a predicted motion vector of the target block one of the predicted motion vector PMVD according to the disparity information use prediction standard and the predicted motion vector PMVC according to the median prediction standard based on the predictor flag.

Figure 27:
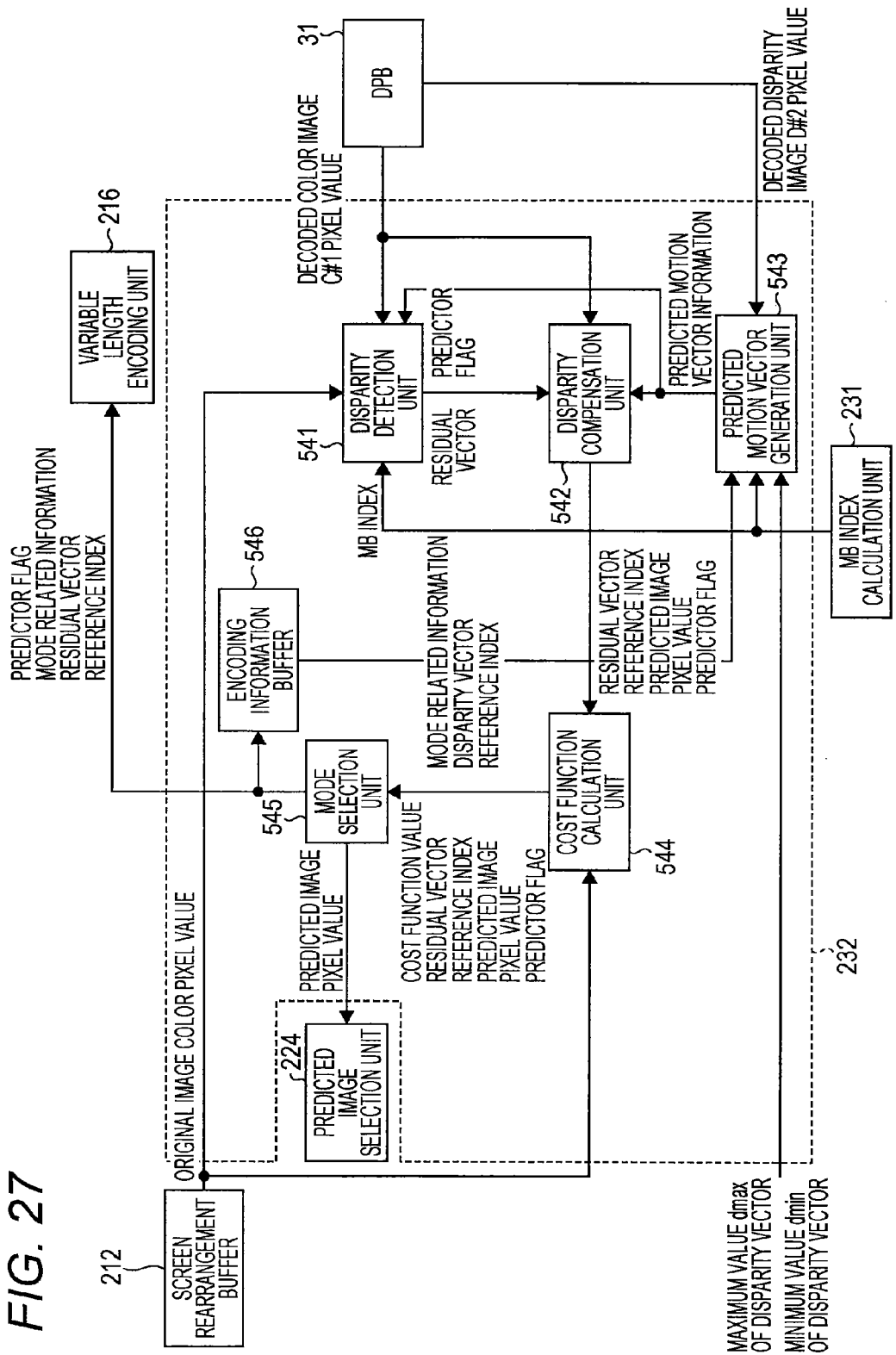
FIG. 27 is a block diagram illustrating an example structure of the disparity prediction unit 232.

FIG. 27 is a block diagram illustrating an example structure of the disparity prediction unit 232 in FIG. 12 when prediction precision is estimated based on an encoding cost.

In FIG. 27, the disparity prediction unit 232 has a disparity detection unit 541, a disparity compensation unit 542, a predicted motion vector generation unit 543, a cost function calculation unit 544, a mode selection unit 545 and an encoding information buffer 546.

The disparity detection unit 541 receives a supply of the decoded color image C#1 picture which is a reference picture stored in the DPB 31, and receives a supply of the color image C#2 picture (target picture) of the encoding target from the screen rearrangement buffer 212.

Further, the disparity detection unit 541 receives a supply of the MB index of the target block from the MB index calculation unit 231, and receives a supply of predicted motion vector information from the predicted motion vector generation unit 543.

The disparity detection unit 541 recognizes a target block in the target picture from the screen rearrangement buffer 212 based on the MB index from the MB index calculation unit 231.

Further, similar to the MVC standard, by performing ME using the target block and the decoded color image C#1 picture which is a reference picture, the disparity detection unit 541 detects per macro block type a displacement vector which represents displacement from a corresponding block which minimizes the SAD with the target block, that is, the calculated disparity vector mv of the target block which represents the disparity with respect to the viewpoint #1 in the decoded color image C#1 picture.

Furthermore, the disparity detection unit 541 recognizes the predicted motion vector PMVD according to the disparity information use prediction standard and the predicted motion vector PMVC according to the MVC standard (median prediction standard) from predicted motion vector information from the predicted motion vector generation unit 543, and calculates the encoding costs of the predicted motion vectors PMVD and PMVC.

That is, predicted motion vector information supplied from the predicted motion vector generation unit 543 to the disparity detection unit 541 includes the predicted motion vector PMVD according to the disparity information use prediction standard and a predictor flag (for example, one bit flag) which represents this predicted motion vector PMVD, and the predicted motion vector PMVC according to the MVC standard and a predictor flag which represents this predicted motion vector PMVC.

The disparity detection unit 541 calculates according to, for example, equation COST=D+λR the encoding cost (the encoding cost of the predicted motion vector PMVD) COSTD obtained encoding the target block using the predicted motion vector PMVD according to the disparity information use prediction standard, and the encoding cost (the encoding cost of the predicted motion vector PMVC) COSTC obtained by encoding the target block using the predicted motion vector PMVC according to the MVC standard.

Meanwhile, in equation COST=D+λR, D represents a SAD of the target block and a block (corresponding block) of the decoded color image C#1 picture at a position moved by the calculated disparity vector mv from the target block, and λ is a weight with respect to R and is set according to a quantization step of the residual of the target block.

Further, in equation COST=D+λR, R is a value corresponding to the bit rate of a residual vector which is a difference between the calculated disparity vector mv and the predicted motion vector. According to the MVC standard, when the degree of the residual vector is more significant, the bit rate becomes higher.

When calculating the encoding cost COSTD of the predicted motion vector PMVD and the encoding cost COSTC of the predicted motion vector PMVC, the disparity detection unit 541 selects as a predicted motion vector of a target block a predicted motion vector (also referred to as a "minimum cost predicted motion vector" below) obtained from a smaller cost of the encoding costs COSTD and COSTC, from the predicted motion vector PMVD according to the disparity information use prediction standard included in predicted motion vector supplied from the predicted motion vector generation unit 543 and the predicted motion vector PMVC according to the MVC standard.

That is, the disparity detection unit 541 estimates prediction precision of the predicted motion vector of a smaller (minimum) encoding cost among the predicted motion vector PMVD according to the disparity information use prediction standard and the predicted motion vector PMVC according to the MVC standard, and selects the predicted motion vector of a smaller encoding cost as the predicted motion vector of the target block.

Further, the disparity detection unit 541 calculates a residual vector which is a difference between the calculated disparity vector mv of the target block and the minimum cost predicted motion vector, and supplies the residual vector to the disparity compensation unit 542 together with a predictor flag which represents the minimum cost predicted motion vector.

The disparity compensation unit 542 receives a supply of the residual vector of the calculated disparity vector mv, and the predictor flag and, in addition, receives a supply of the decoded color image C#1 picture which is a reference picture stored in the DPB 31 from the disparity detection unit 541.

Further, the disparity compensation unit 542 receives a supply of predicted motion vector information from the predicted motion vector generation unit 543.

Based on the predictor flag from the disparity detection unit 541, the disparity compensation unit 542 selects the minimum cost predicted motion vector as the predicted motion vector of the target block from the predicted motion vector PMVD according to the disparity information use prediction standard included in the predicted motion vector information from the predicted motion vector generation unit 543 and the predicted motion vector PMVC according to the MVC standard.

Further, the disparity compensation unit 542 restores the calculated disparity vector mv of the target block by adding the residual vector from the disparity detection unit 541 and the predicted motion vector (minimum cost predicted motion vector) of the target block.

Furthermore, the disparity compensation unit 542 generates a predicted image of the target block per macro block type by performing displacement compensation (disparity compensation) on the reference picture which is the decoded color image C#1 picture from the DPB 31 using the calculated disparity vector mv of the target block similar to the MVC standard.

Still further, the disparity compensation unit 542 supplies the predicted image to the cost function calculation unit 544 together with the residual vector from the disparity detection unit 541, the reference index allocated to the reference picture (here, the decoded color image C#1 picture) used to generate the predicted image and the predictor flag (a predictor flag which represents the minimum cost predicted motion vector) from the disparity detection unit 541.

The predicted motion vector generation unit 543 receives a supply of the decoded disparity image D#2 picture stored in the DPB 31, and receives a supply of the MB index from the MB index calculation unit 231.

Further, the predicted motion vector generation unit 543 receives a supply of the disparity related information (FIG. 4) such as the maximum value dmax and the minimum value dmin of the image capturing disparity vector d (the viewpoint #2 image capturing disparity vector d2).

Furthermore, the predicted motion vector generation unit 543 receives a supply of encoding information of surrounding color blocks in a surrounding of the encoded color image C#2 target block, that is, for example, the surrounding color blocks CA to CC in FIG. 26 (FIG. 3), from the encoding information buffer 546.

Meanwhile, the encoding information of a surrounding color block includes mode related information, a calculated disparity vector and a reference index (prediction reference index) obtained when the surrounding color block is encoded as a target block similar to FIG. 13.

The predicted motion vector generation unit 543 recognizes a target block in the target picture from the screen rearrangement buffer 212 based on the MB index from the MB index calculation unit 231.

Further, the predicted motion vector generation unit 543 generates for each macro block type (FIG. 9) the predicted motion vector PMVD according to the disparity information use prediction standard using the disparity related information and the decoded disparity image D#2 picture similar to the predicted motion vector generation unit 243 in FIG. 13, and generates the predictor flag which represents the predicted motion vector PMVC according to the disparity information use prediction standard.

Furthermore, the predicted motion vector generation unit 543 generates for each macro block type (FIG. 9) the predicted motion vector PMVC according to the MVC standard using, for example, the encoding information of the surrounding color blocks CA to CC in the surrounding of the target block of the encoding information from the encoding information buffer 546 similar to the predicted motion vector generation unit 243 in FIG. 13, and generates the predictor flag which represents the predicted motion vector PMVC according to this MVC standard.

Still further, the predicted motion vector generation unit 543 supplies the predicted motion vector PMVD according to the disparity information use prediction standard and the predictor flag which represents the predicted motion vector PMVD, and the predicted motion vector PMVC according to the MVC standard and the predictor flag which represents the predicted motion vector PMVC of each macro block type (FIG. 9), as predicted motion vector information to the disparity detection unit 541 and the disparity compensation unit 542.

The cost function calculation unit 544 receives a supply of the predicted image, the residual vector, the residual index and the predictor flag from the disparity compensation unit 542, and, in addition, receives a supply of the color image C#2 target picture from the screen rearrangement buffer 212.

Similar to the cost function calculation unit 244 in FIG. 13, the cost function calculation unit 544 calculates an encoding cost required to encode a target block of a target picture from the screen rearrangement buffer 212 according to a predetermined cost function per macro block type (FIG. 9).

When calculating the encoding cost (cost function value) per macro block type, the cost function calculation unit 544 supplies the encoding cost to the mode selection unit 545 together with the reference index, the predicted image, the residual vector and the predictor flag.

The mode selection unit 545 detects a minimum cost which is a minimum value from the encoding cost of each macro block type from the cost function calculation unit 544.

Further, the mode selection unit 545 selects the macro block type from which the minimum cost can be obtained, as the optimal inter prediction mode.

Furthermore, the mode selection unit 545 supplies, for example, mode related information which represents an optimal inter prediction mode, a reference index of the optimal inter prediction mode (prediction reference index), the residual vector of the optimal inter prediction mode) and the predictor flag of the optimal inter prediction mode as header information to the variable length encoding unit 216.

Still further, the mode selection unit 545 supplies the predicted image and the encoding cost (minimum cost) of the optimal inter prediction mode to the predicted image selection unit 224.

In addition, similar to the mode selection unit 245 in FIG. 13, the mode selection unit 545 determines whether or not to encode the target block as a skip macro block.

Further, the mode selection unit 545 acquires the calculated disparity vector of the target block used to encode the target block in the optimal inter prediction mode, from the disparity detection unit 541.

Furthermore, the mode selection unit 545 supplies the calculated disparity vector of the target block, the mode related information and the prediction reference index as encoding information of the target block to the encoding information buffer 546.

The encoding information buffer 546 temporarily stores encoding information from the mode selection unit 546.

Figure 28:
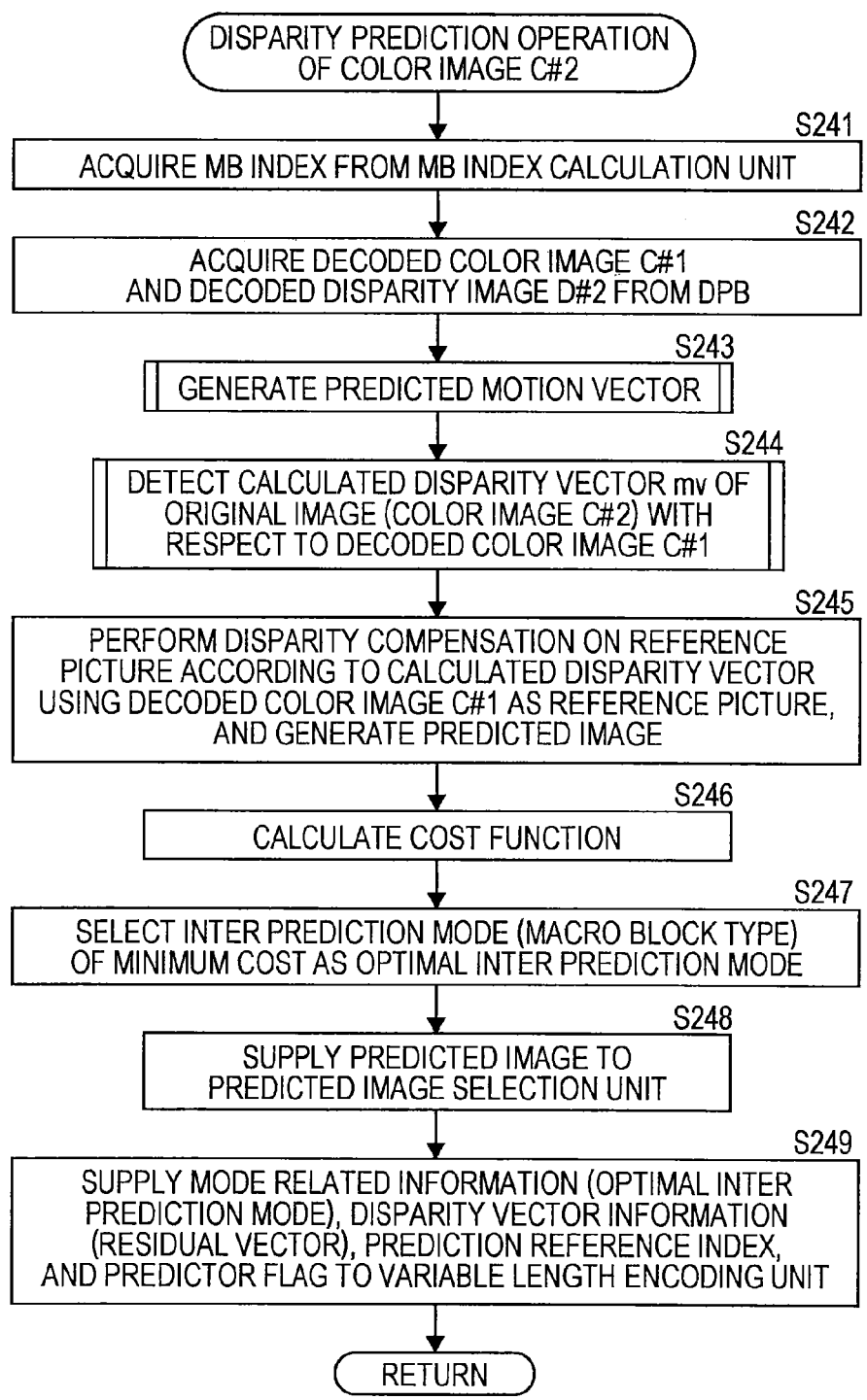
FIG. 28 is a flowchart for explaining a disparity prediction operation.

FIG. 28 is a flowchart for explaining a disparity prediction operation performed by the disparity prediction unit 232 in FIG. 27 in step S25 in FIG. 14.

In step S241, the disparity prediction unit 232 acquires an MB index of a (next) target block supplied from the MB index calculation unit 231 and supplies the MB index to the disparity detection unit 541 and the predicted motion vector generation unit 543, and the operation moves to step S242.

In step S242, the disparity prediction unit 232 acquires the decoded color image C#1 picture which is a reference picture, from the DPB 31, and acquires the decoded disparity image D#2.

Further, the disparity prediction unit 232 supplies the decoded color image C#1 picture to the disparity detection unit 541 and the disparity compensation unit 542 and supplies the decoded disparity image D#2 to the predicted motion vector generation unit 543, and the operation moves to step S243.

In step S243, the predicted motion vector generation unit 543 recognizes a (next) target block in the target picture supplied from the screen rearrangement buffer 212 based on the MB index from the MB index calculation unit 231.

Further, the predicted motion vector generation unit 543 performs a predicted motion vector generation operation of generating a predicted motion vector of the (next) target block on each macro block type (FIG. 9) using the encoding information stored in the encoding information buffer 546, the decoded disparity image D#2 stored in the DPB 31 and, in addition, disparity related information where necessary.

Meanwhile, in the predicted motion vector generation operation, the predicted motion vector generation unit 543 generates, for example, the predicted motion vector PMVD according to the disparity information use prediction standard and a predictor flag which represents this predicted motion vector PMVD, and the predicted motion vector PMVC according to the MVC standard and a predictor flag which represents this predicted motion vector PMVC.

Meanwhile, the predicted motion vector generation unit 543 supplies the predicted motion vector PMVD according to the disparity information use prediction standard and a predictor flag which represents this predicted motion vector PMVD, and the predicted motion vector PMVC according to the MVC standard and a predictor flag which represents this predicted motion vector PMVC obtained in the predicted motion vector generation operation, as predicted motion vector information to the disparity detection unit 541 and the disparity compensation unit 542, and the operation moves from step S243 to step S244.

In step S244, the disparity detection unit 541 recognizes a target block in the target picture supplied from the screen rearrangement buffer 212 based on the MB index from the MB index calculation unit 231.

Further, the disparity detection unit 541 performs for the (next) target block the (calculated) disparity vector detection operation of detecting the calculated disparity vector mv and calculating the predicted motion vector used to encode this target block.

That is, similar to the MVC standard, in the disparity vector detection operation, the disparity detection unit 541 performs ME on the (next) target block using the decoded color image C#1 picture from the DPB 31 as a reference picture, and detects the calculated disparity vector mv which represents the disparity of the target block with respect to the viewpoint #1.

Further, the disparity detection unit 541 calculates the encoding cost (the encoding cost of the predicted motion vector PMVD) COSTD obtained when the target block is encoded using the predicted motion vector PMVD according to the disparity information use prediction standard included in the predicted motion vector information from the predicted motion vector generation unit 543.

Furthermore, the disparity detection unit 541 calculates the encoding cost (the encoding cost of the predicted motion vector PMVC) COSTC obtained when the target block is encoded using the predicted motion vector PMVD according to the MVC standard included in the predicted motion vector information from the predicted motion vector generation unit 543.

Still further, the disparity detection unit 541 selects as the predicted motion vector of the target block the predicted motion vector (minimum cost predicted motion vector) from which a smaller encoding cost of the encoding costs COSTD and COSTC can be obtained among the predicted motion vectors PMVD and PMVC.

Moreover, the disparity detection unit 541 calculates a residual vector which is a difference between the calculated disparity vector mv of the target block and the predicted motion vector which is the minimum cost predicted motion vector, and supplies the residual vector to the disparity compensation unit 542 together with a predictor flag which represents this predicted motion vector (the minimum cost predicted motion vector), and the operation moves from step S244 to step S245.

In step S245, the disparity compensation unit 542 restores the calculated disparity vector mv of the target block from the residual vector from the disparity detection unit 541, the predictor flag and the predicted motion vector information from the predicted motion vector generation unit 543.

Further, the disparity compensation unit 542 performs MC using the decoded color image C#1 picture from the DPB 31 as a reference picture, according to the calculated disparity vector mv of the target block, and generates a predicted image of the (next) target block.

That is, the disparity compensation unit 542 acquires as a predicted image a corresponding block which is a block of the decoded color image C#1 picture at a position displaced by the calculated disparity vector mv, from the position of the target block.

Further, the disparity compensation unit 542 supplies the predicted image to the cost function calculation unit 544 together with the residual vector from the disparity detection unit 541, the predictor flag and the reference index allocated to the reference picture (the decoded color image C#1 picture) used to generate the predicted image, and the operation moves from step S245 to step S246.

In step S246, the cost function calculation unit 544 calculates an encoding cost required to encode the target block of the target picture from the screen rearrangement buffer 212 according to a predetermined cost function per macro block type (FIG. 9) and supplies the encoding cost to the mode selection unit 545 together with the reference index, the predictor flag, the predicted image and the residual vector from the disparity compensation unit 542, and the operation moves to step S247.

In step S247, the mode selection unit 545 detects a minimum cost which is a minimum value from the encoding cost of each macro block type from the cost function calculation unit 544.

Further, the mode selection unit 545 selects the macro block type from which the minimum cost can be obtained, as the optimal inter prediction mode, and the operation moves from step S247 to step S248.

In step S248, the mode selection unit 545 supplies the predicted image and the encoding cost (minimum cost) of the optimal inter prediction mode to the predicted image selection unit 224, and the operation moves to step S249.

In step S249, the mode selection unit 545 supplies mode related information which represents an optimal inter prediction mode, a reference index of the optimal inter prediction mode (prediction reference index), the residual vector of the optimal inter prediction mode and the predictor flag of the optimal inter prediction mode as header information to the variable length encoding unit 216.

Further, in step S249, the mode selection unit 545 acquires the calculated disparity vector of the target block used to encode the target block in the optimal inter prediction mode, from the disparity detection unit 541.

Furthermore, the mode selection unit 545 supplies the calculated disparity vector of the target block, the mode related information and the prediction reference index as encoding information of the target block to the encoding information buffer 546 to store, and the operation returns.

Figure 29:
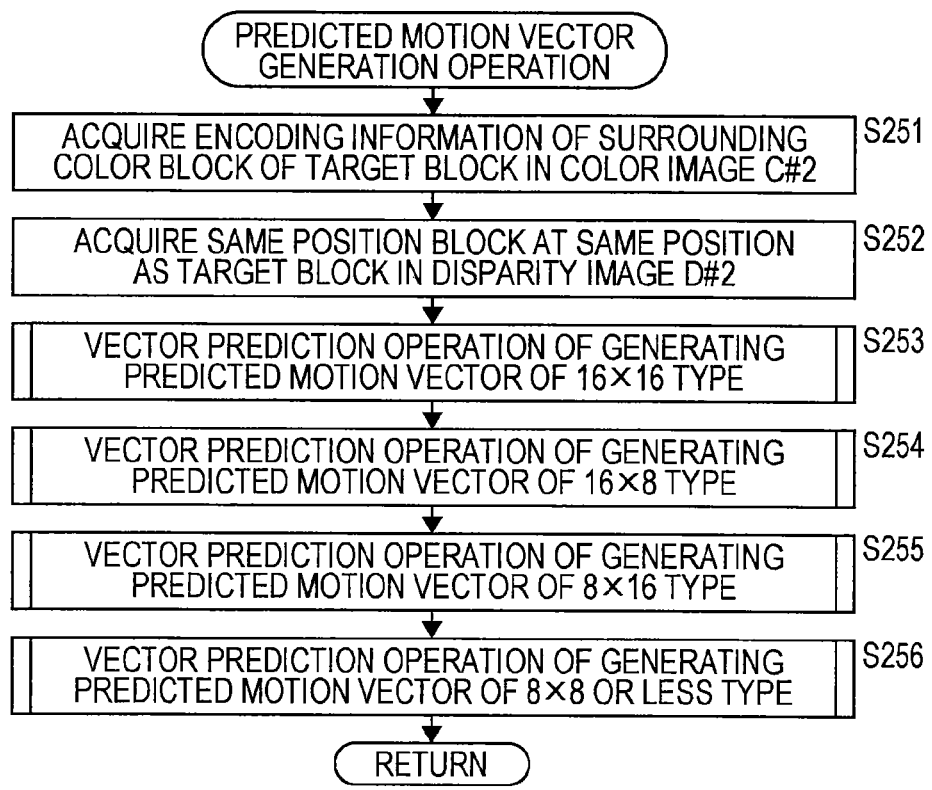
FIG. 29 is a flowchart for explaining a predicted motion vector generation operation.

FIG. 29 is a flowchart for explaining a predicted motion vector generation operation performed by the predicted motion vector generation unit 543 in FIG. 27 in step S243 in FIG. 28.

In step S251, the predicted motion vector generation unit 543 acquires encoding information of encoded surrounding color blocks (for example, the three surrounding color blocks CA to CC in FIG. 26 (FIG. 3)) of the target block in the color image C#2 from the encoding information buffer 546, and the operation moves to step S252.

In step S252, the predicted motion vector generation unit 543 acquires a block (same position block) at the same position as that of the target block from the decoded disparity image D#2 picture (the picture at the same time as the target picture) from the DPB 31, and the operation moves to step S253.

Hereinafter, in steps S253 and S256, the vector prediction operation of generating the predicted motion vector PMVD according to the disparity information use prediction standard, a predictor flag which represents this predicted motion vector PMVD, and the predicted motion vector PMVC according to the MVC standard and a predictor flag which represents this predicted motion vector PMVC is performed per macro block type using the encoding information acquired in step S251 and the same position block acquired in step S252 where necessary, and the operation returns.

That is, in step S253, the predicted motion vector generation unit 543 performs the vector prediction operation on the 16×16 type, and the operation moves to step S254.

In step S254, the predicted motion vector generation unit 543 performs the vector prediction operation on the 16×8 type, and the operation moves to step S255.

In step S255, the predicted motion vector generation unit 543 performs the vector prediction operation on the 8×16 type, and the operation moves to step S256.

In step S256, the predicted motion vector generation unit 543 performs the vector prediction operation on the 8×8 or less type, and the operation returns.

Figure 30:
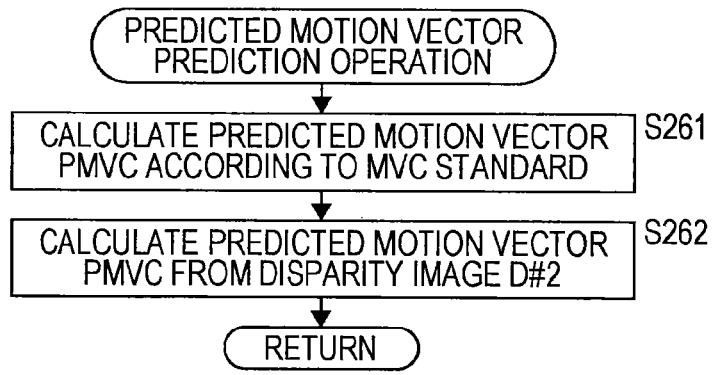
FIG. 30 is a flowchart for explaining a vector prediction operation.

FIG. 30 is a flowchart for explaining a vector prediction operation performed on each macro block type by the predicted motion vector generation unit 543 in FIG. 27 in steps S253 to S256 in FIG. 29.

In step S261, the predicted motion vector generation unit 543 calculates the predicted motion vector PMVC according to the MVC standard based on the encoding information of the surrounding color block as described with reference to FIG. 11 and generates the predictor flag which represents this predicted motion vector PMVC, and the operation moves to step S262.

In step S262, the predicted motion vector generation unit 543 calculates the predicted motion vector PMVD according to the disparity information use prediction standard from the same position block, that is, the block at the same position as that of the target block in the decoded disparity image D#2 and generates the predictor flag which represents this predicted motion vector PMVD, and the operation returns.

Figure 31:
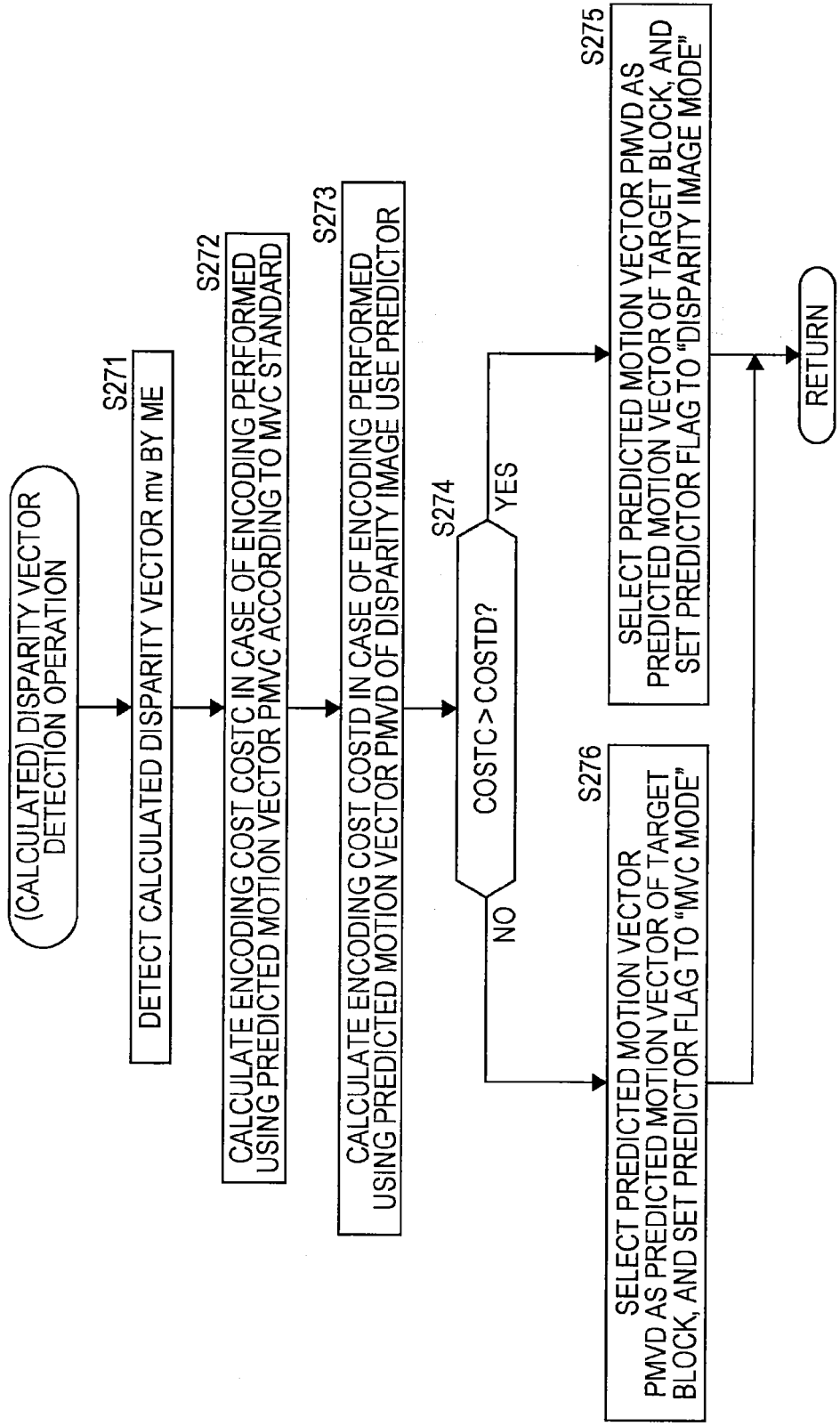
FIG. 31 is a flowchart for explaining a disparity vector detection operation.

FIG. 31 is a flowchart for explaining a disparity vector detection operation performed by the disparity detection unit 541 in FIG. 27 in FIG. 28.

In step S271, the disparity detection unit 541 performs ME on the target block using the decoded color image C#1 picture from the DPB 31 as a reference picture, and detects the calculated disparity vector mv of the target block, and the operation moves to step S272.

In step S272, the disparity detection unit 541 calculates the encoding cost (the encoding cost of the predicted motion vector PMVC) COSTC obtained when the target block is encoded using the predicted motion vector PMVC according to the MVC standard included in the predicted motion vector information from the predicted motion vector generation unit 543, and the operation moves to step S273.

In step S273, the disparity detection unit 541 calculates the encoding cost (the encoding cost of the predicted motion vector PMVD) COSTD obtained when the target block is encoded using the predicted motion vector PMVD according to the disparity information use prediction standard included in the predicted motion vector information from the predicted motion vector generation unit 543, and the operation moves to step S274.

In step S274, the disparity detection unit 541 determines a relationship as to which one of the encoding cost COSTC and the encoding cost COSTD is higher.

When it is determined in step S274 that the encoding cost COSTC is higher than the encoding cost COSTD, the operation moves to step S275, the disparity detection unit 541 selects the predicted motion vector according to the disparity information use prediction standard as the minimum cost prediction vector which is the predicted motion vector of the target block and sets to the predictor flag a value "disparity image mode" which represents that the predicted motion vector of the target block is the predicted motion vector PMVD according to the disparity information use prediction standard, and the operation returns.

Further, when it is determined in step S274 that the encoding cost COSTC is not higher than the encoding cost COSTD, the operation moves to step S276, the disparity detection unit 541 selects the predicted motion vector PMVC according to the MVC standard as the minimum cost prediction vector which is the predicted motion vector of the target block and sets to the predictor flag a value "MVC mode" which represents that the predicted motion vector of the target block is the predicted motion vector PMVC according to the MVC standard, and the operation returns.

As described above, the disparity prediction unit 232 in FIG. 27 generates the predicted motion vector PMVD according to the disparity information use prediction standard and the predicted motion vector PMVC according to the MVC standard as another vector prediction standard, calculates the encoding costs COSTD and COSTC required to encode the target block upon use of the predicted motion vector PMVD and upon use of the predicted motion vector PMVC and selects a predicted motion vector of a smaller encoding cost among the predicted motion vectors PMVD and PMVC based on the encoding costs COSTD and COSTC as the predicted motion vector which is estimated to be precisely predicted and is used for the operation of the target block, so that it is possible to obtain the predicted motion vector which has a lower bit rate of the residual vector and which is precisely predicted.

Further, the bit rate of the residual vector decreases, so that it is possible to allocate the bit rate to the residual of the target block and, as a result, improve image quality of the color image C#2 decoded image.

In addition, the disparity prediction unit 232 in FIG. 27 generates a predictor flag which represents a selected predicted motion vector of the target block from the predicted motion vectors PMVD and PMVC and includes the predictor flag in header information of encoded data, so that the decoder side can easily calculate the predicted motion vector of the target block based on this predictor flag.

Meanwhile, the predictor flag can be included in header information of encoded data or can be provided (transmitted) separately from the encode data.

Figure 32:
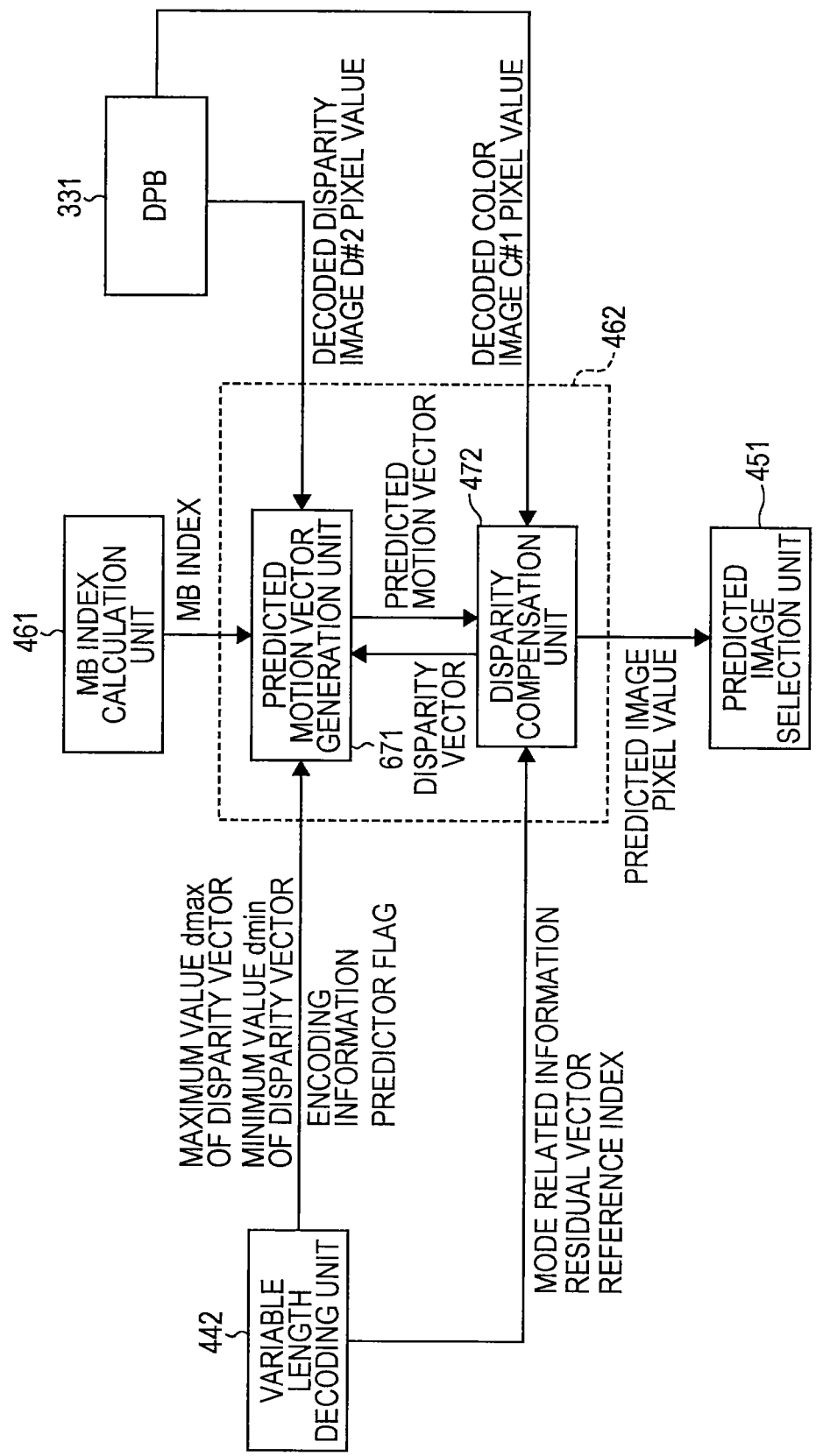
FIG. 32 is a block diagram illustrating an example structure of the disparity prediction unit 462.

FIG. 32 is a block diagram illustrating an example structure of the disparity prediction unit 462 in FIG. 21 when the disparity prediction unit 232 in FIG. 12 is configured as illustrated in FIG. 27.

In addition, components corresponding to the components in FIG. 22 will be assigned the same reference numerals, and will not be described below.

FIG. 32 is common to FIG. 22 in that the disparity prediction unit 462 includes the disparity compensation unit 472.

However, FIG. 32 differs from FIG. 22 in that the disparity prediction unit 462 includes the predicted motion vector generation unit 671 instead of the predicted motion vector generation unit 471.

The predicted motion vector generation unit 671 receives a supply of the decoded disparity image D#2 picture stored in the DPB 331, and receives a supply of the MB index from the MB index calculation unit 461.

Further, the predicted motion vector generation unit 671 receives a supply of the disparity related information (FIG. 4) such as the maximum value dmax and the minimum value dmin of the image capturing disparity vector d (the viewpoint #2 image capturing disparity vector d2) included in the header information from the variable length decoding unit 442.

Furthermore, the predicted motion vector generation unit 671 receives a supply of encoding information of decoded surrounding color blocks (for example, the surrounding color blocks CA to CC in FIG. 26 (FIG. 3)) in a surrounding of the target block in the color image C#2 included in the header information from the variable length decoding unit 442, and encoding information of the target block.

Meanwhile, the encoding information of the surrounding color block included in the header information from the variable length decoding unit 442 includes mode related information (macro block type) of this surrounding color block and the reference index (prediction reference index), and the encoding information of the target block included in the header information from the variable length decoding unit 442 includes mode related information (macro block type) of this target block, a residual vector and the reference index (prediction reference index).

Further, the predicted motion vector generation unit 671 receives a supply of the predictor flag of the target block included in the header information from the variable length decoding unit 442.

Furthermore, the predicted motion vector generation unit 671 receives a supply of the calculated disparity vector of the decoded surrounding color block from the disparity compensation unit 472.

The predicted motion vector generation unit 671 recognizes a target block in the target picture based on the MB index from the MB index calculation unit 461.

Further, the predicted motion vector generation unit 671 generates the predicted motion vector PMVD according to the disparity information use prediction standard or the predicted motion vector PMVC according to the MVC standard using the predictor flag, the disparity related information and the encoding information included in the header information from the variable length decoding unit 442, the decoded disparity image D#2 picture stored in the DPB 331 and the calculated disparity vectors of the surrounding color blocks from the disparity compensation unit 472 where necessary similar to the predicted motion vector generation unit 543 in FIG. 27, and supplies the predicted motion vector as the predicted motion vector of the target block to the disparity compensation unit 472.

That is, the predicted motion vector generation unit 671 recognizes the vector prediction standard of generating the predicted motion vector of the target block based on the predictor flag.

Further, the predicted motion vector generation unit 671 recognizes a macro block mode of the target block based on the encoding information of the target block, and generates for this macro block mode the predicted motion vector of the target block according to a vector prediction standard recognized based on the predictor flag from the disparity information use prediction standard and the MVC standard.

Figure 33:
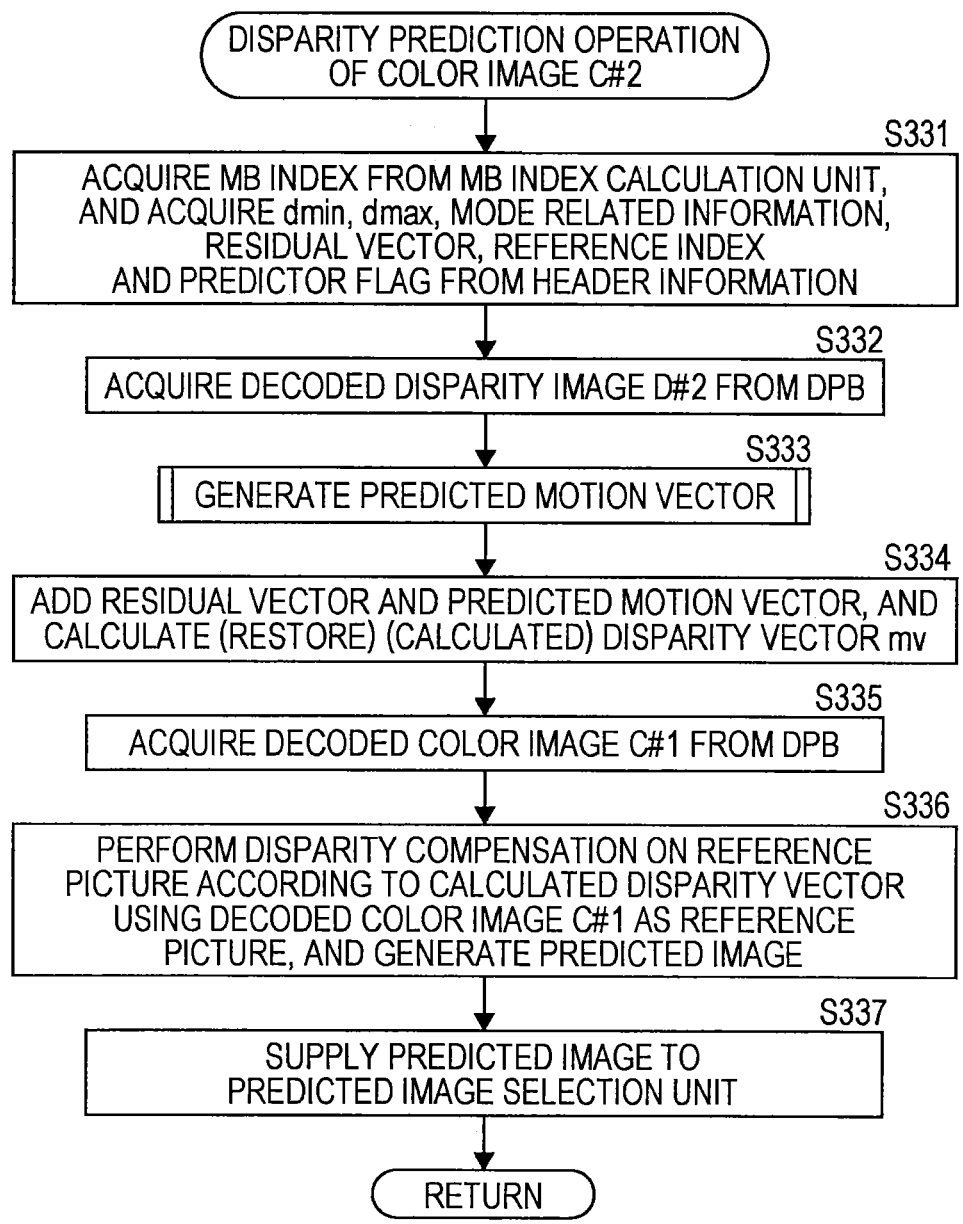
FIG. 33 is a flowchart for explaining the disparity prediction operation.

FIG. 33 is a flowchart for explaining a disparity prediction operation performed by the disparity prediction unit 462 in FIG. 32 in step S120 in FIG. 23.

In step S331, the disparity prediction unit 462 acquires an MB index of a (next) target block from the MB index calculation unit 461, and supplies the MB index to the predicted motion vector generation unit 671.

Further, the disparity prediction unit 462 acquires the disparity related information (FIG. 4) such as the maximum value dmax and the minimum value dmin of the image capturing disparity vector d (the viewpoint #2 image capturing disparity vector d2) included in the header information from the variable length decoding unit 442, and supplies the disparity related information to the predicted motion vector generation unit 671.

Furthermore, the disparity prediction unit 462 acquires encoding information (the mode related information, the residual vector and the prediction reference index) of the (next) target block included in the header information from the variable length decoding unit 442 and the predictor flag and supplies the encoding information and the predictor flag to the predicted motion vector generation unit 671 and the disparity compensation unit 472, and the operation moves from step S331 to step S332.

In step S332, the disparity prediction unit 462 acquires the decoded disparity image D#2 picture (a picture at the same time as the target picture) from the DPB 331 and supplies the picture to the predicted motion vector generation unit 671, and the operation moves to step S333.

In step S333, the predicted motion vector generation unit 671 recognizes a (next) target block in the target picture based on the MB index from the MB index calculation unit 461. Further, the predicted motion vector generation unit 671 performs the predicted motion vector generation operation of generating the predicted motion vector of the target block according to the disparity information prediction standard or the MVC standard using the information supplied in steps S331 and S332 where necessary based on the predictor flag.

Furthermore, the predicted motion vector generation unit 671 supplies the predicted motion vector of the target block obtained by the predicted motion vector generation operation to the disparity compensation unit 472, and the operation moves from step S333 to step S334.

Subsequently, the same operations as those in steps S134 to S137 in FIG. 24 are performed in steps S334 to S337.

Figure 34:
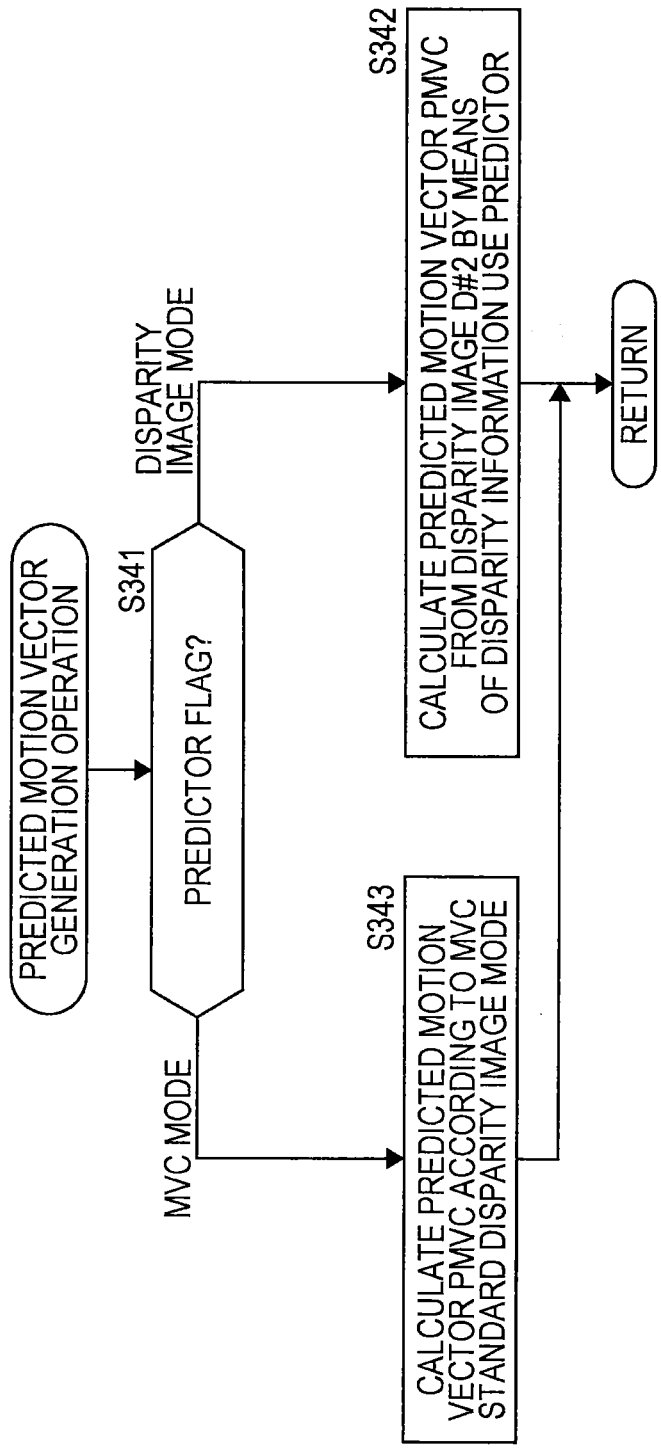
FIG. 34 is a flowchart for explaining the predicted motion vector generation operation.

FIG. 34 is a flowchart for explaining a predicted motion vector generation operation performed by a predicted motion vector generation unit 671 in FIG. 32 in step S333 in FIG. 33.

In step S341, the predicted motion vector generation unit 671 determines to which one of the values "disparity image mode" and "MVC mode" the predictor flag is set.

When it is determined in step S341 that the predictor flag is set to the value "disparity image mode", the operation moves to step S342, the predicted motion vector generation unit 671 generates the predicted motion vector PMVD of the disparity information use prediction standard (disparity information use predictor) as the predicted motion vector of the target block from the decoded disparity image D#2, and the operation returns.

Further, when it is determined in step S341 that the predictor flag is set to the value "MVC mode", the operation moves to step S343, the predicted motion vector generation unit 671 generates the predicted motion vector PMVC according to the MVC standard as the predicted motion vector of the target block as described with reference to FIG. 10 using the encoding information of the target block, encoding information of the surrounding color blocks and the calculated disparity vector where necessary, and the operation returns.

As described above, the predicted motion vector generation unit 671 in FIG. 32 can recognize whether the predicted motion vector of the target block is the predicted motion vector PMVD according to the disparity information use prediction standard or the predicted motion vector PMVC according to the MVC standard, based on the predictor flag, and provides a reduced operation load compared to the predicted motion vector generation unit 471 in FIG. 22.

In addition, although the encoder 12 selects the minimum cost predicted motion vector which is a predicted motion vector of a smaller encoding cost of the predicted motion vector according to the disparity information use prediction standard and the predicted motion vector according to the MVC standard as the predicted motion vector of the target block, and transmits the predictor flag which represents this minimum cost predicted motion vector to the decoder 312, the encoder 12 can additionally select the vector of the minimum encoding cost among the predicted motion vector according to the disparity information use prediction standard and one or more other vectors as the predicted motion vector of the target block.

That is, the encoder 12 can select the vector of the minimum encoding cost among the four vectors of the predicted motion vector according to the disparity information use prediction standard and the surrounding color blocks CA, CB and CC (FIG. 3) (FIG. 26) as the predicted motion vector of the target block.

In this case, the predictor flag is a flag which represents which one of the four vectors of the predicted motion vector according to the disparity information use prediction standard and the surrounding color blocks CA, CB and CC the predicted motion vector of the target block is.

Figure 37:
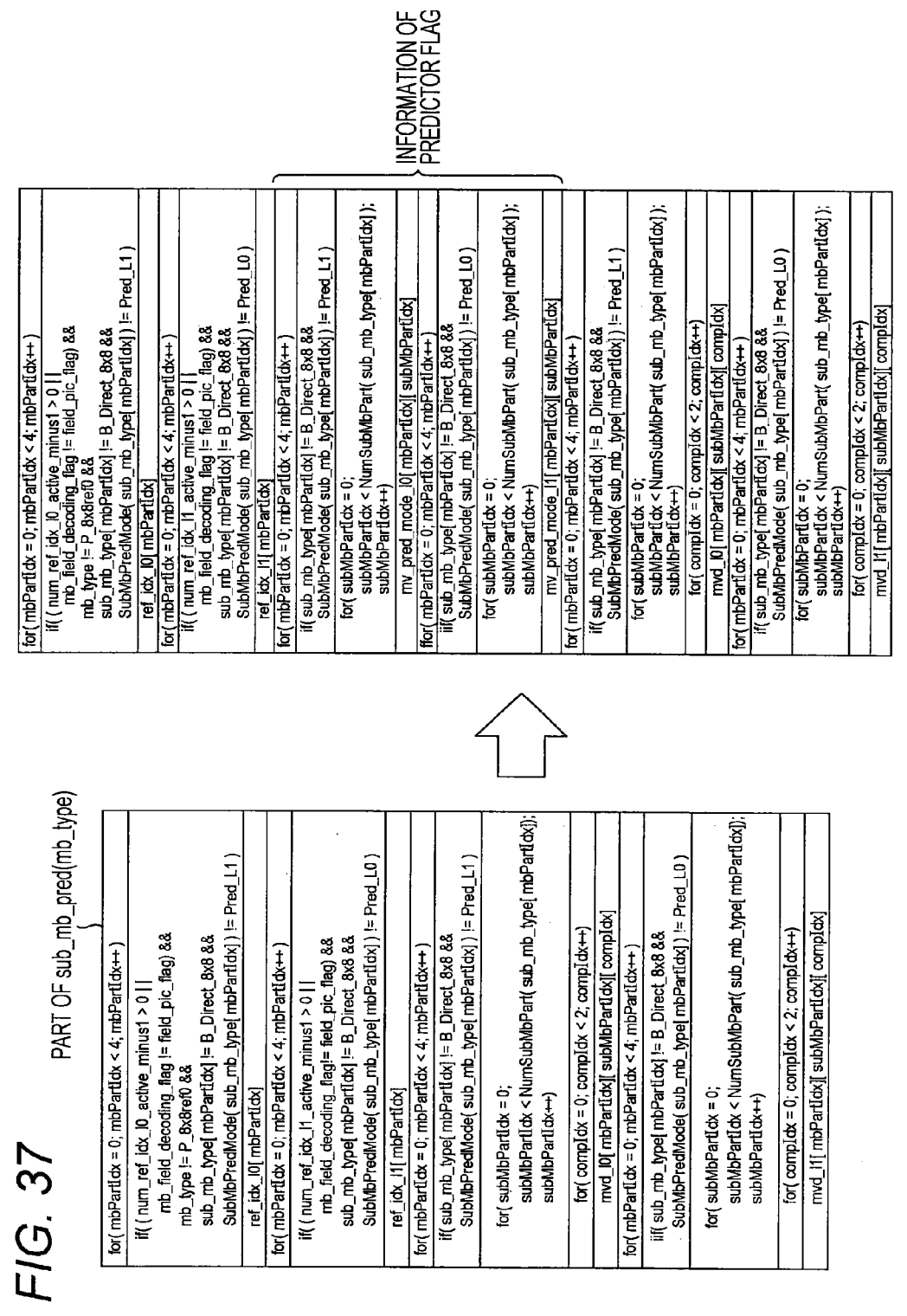

FIGS. 35 to 37 are views illustrating examples of predictor flags included in header information.

As described with reference to FIG. 27, the mode selection unit 545 includes a predictor flag in header information, and supplies the predictor flag to the variable length encoding unit 216.

The variable length encoding unit 216 includes the header information in a header of encoded data.

FIGS. 35 to 37 illustrate a predictor flag included in this header when encoded data is encoded data according to the MVC (AVC) standard.

Meanwhile, the predictor flag can set a macro block as a minimum unit.

Further, the predictor flag can set as a minimum unit partitions of a macro block type (also referred to as the 8×8 or more type below) of dividing a target block into a size equal to or more than partitions of 8×8 pixels, that is, a macro block type (the 8×8 type) of dividing the target block into partitions of 8×8 pixels, a macro block type (the 16×8 type) of dividing the target block into partitions of 16×8 pixels and the macro block type (the 8×16 type) of dividing the target block into partitions of 8×16 pixels.

Furthermore, the predictor flag can set as a minimum unit of a partition (sub partition) of a macro block type (also referred to as a less than 8×8 type below) of dividing the target block into partitions having a size smaller than partitions of 8×8 pixels, that is, sub partitions of 8×4 pixels, 4×8 pixels or 4×4 pixels.

FIG. 35 is a view illustrating predictor flags set in minimum units of macro blocks.

That is, FIG. 35 illustrates a syntax of mb_pred (mb_type) according to the MVC standard.

When the predictor flag sets a macro block as a minimum unit, the predictor flag is included in mb_pred (mb_type).

In FIG. 35, mv_pred_mode_l0 and mv_pred_mode_l1 indicate predictor flags.

Further, in FIG. 35, mv_predmode_l0 is a predictor flag used when L0 prediction is performed, and mv_pred_mode_l1 is a predictor flag used when L1 prediction is performed.

FIG. 36 is a view illustrating predictor flags which set partitions of an 8×8 or more type as a minimum unit.

That is, FIG. 36 illustrates a syntax of part of mb_pred (mb_type) according to the MVC standard.

When the predictor flag sets partitions of the 8×8 or more type as a minimum unit, the predictor flag is included in mb_pred (mb_type).

In FIG. 36, mv_predmode_l0 [mbPartIdx] and mv_pred_mode_l1 [mbPartIdx] indicate predictor flags.

Further, in FIG. 36, mv_pred_mode_l0 [mbPartIdx] is a predictor flag used when L0 prediction is performed, and mv_pred_mode_l1 [mbPartIdx] is a predictor flag used when L1 prediction is performed.

In addition, arguments mbPartIdx of the predictor flags mv_pred_mode_l0 [mbPartIdx] and mv_predmode_l1 [mbPartIdx] are indices for distinguishing each partition of the 8×8 or more type.

FIG. 37 is a view illustrating predictor flags set in minimum units of partitions of the less than 8×8 type.

That is, FIG. 37 illustrates a syntax of part of sub_mb_pred (mb_type) according to the MVC standard.

When the predictor flag sets partitions of the less than 8×8 or less type as a minimum unit, the predictor flag is included in mb_pred (mb_type) and sub_mb_pred (mb_type).

When the predictor flag sets partitions of the less than 8×8 or less type as a minimum unit, the predictor flag included in mb_pred (mb_type) is as illustrated in FIG. 36, and FIG. 37 illustrates the predictor flag included in sub_mb_pred (mb_type).

In FIG. 37, mv_pred_mode_l0[mbPartIdx][subMbPartIdx] and mv_pred_mode_l1[mbPartIdx][subMbPartIdx] indicate predictor flags.

Further, in FIG. 37, mv_pred_mode_l0[mbPartIdx][subMbPartIdx] is a predictor flag used when L0 prediction is performed, and mv_pred_mode_l1[mbPartIdx][subMbPartIdx] is a predictor flag used when L1 prediction is performed.

In addition, arguments subMbPartIdx of the predictor flags mv_pred_mode_l0[mbPartIdx][subMbPartIdx] and mv_pred_mode_l1[mbPartIdx][subMbPartIdx] are indices for distinguishing each partition of the less than 8×8 type.

Meanwhile, when a predictor flag sets a macro block as a minimum unit, it is possible to minimize an increase in the data amount (the data amount of an overhead) of a header of encoded data.

Meanwhile, when the predictor flag sets partitions (sub partitions) of the less than 8×8 type as minimum units, it is possible to control a predicted motion vector per partition of a small size and, consequently, improve prediction precision.

Further, when a predictor flag sets partitions of the 8×8 or more type as minimum units, it is possible to achieve intermediate prediction precision between when a macro block is set as a minimum unit and partitions of the less than 8×8 type are set as minimum units while suppressing an increase in the data amount of a header of encoded data.

[Method of Estimating Prediction Precision Based on Variation of Disparity Vector]

Figure 38:
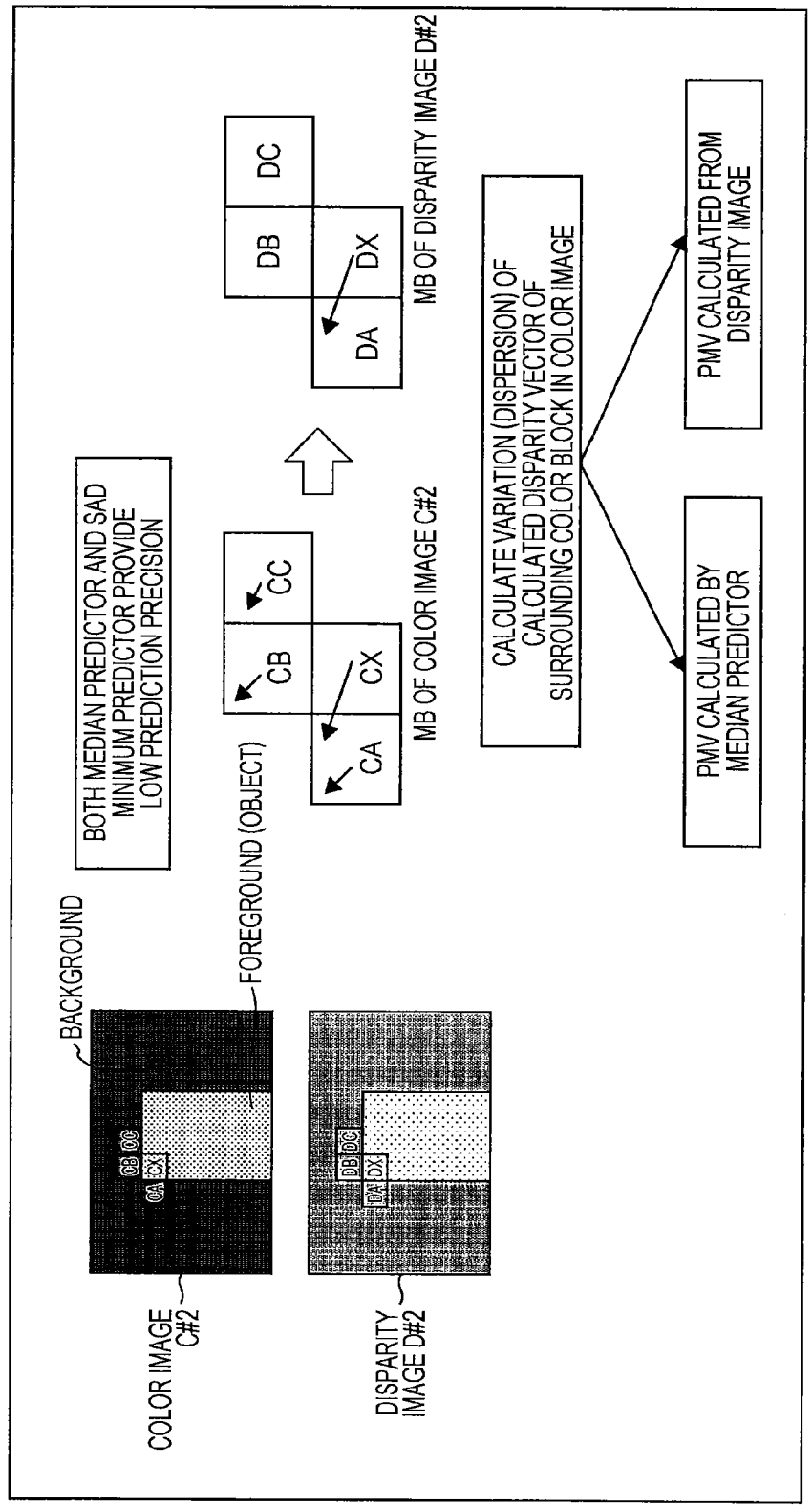
FIG. 38 is a view for explaining a method of estimating prediction precision according to the disparity information use prediction standard and the MVC standard based on a variation of a disparity vector.

FIG. 38 is a view for explaining a method of estimating prediction precision according to a disparity information use prediction standard and the MVC standard (median prediction standard) based on variation of a disparity vector.

Meanwhile, while, in FIG. 3, prediction precision according to the disparity information use prediction standard and the median prediction standard (MVC standard) is estimated based on disparity SADs between the surrounding disparity blocks DA to DC of the disparity (information) image D#2 and the same position block DX, and a predicted motion vector is generated according to a vector prediction standard which is estimated to provide better prediction precision among the disparity information use prediction standard and the median prediction standard, prediction precision according to the disparity information use prediction standard and the median prediction standard can be estimated based on the variation of the calculated disparity vector of surrounding color blocks in a surrounding of the target block.

Similar to FIGS. 2A and 3, in FIG. 38, a background and a rectangular foreground which is an object existing in front of this background are shown in the color image C#2, and the color image C#2 target block CX is the upper left block of the rectangular foreground.

Hence, the surrounding color block CA neighboring on the left of the target block CX, the surrounding color block CB neighboring on the upper side and the surrounding color block CC neighboring on the diagonal upper right side are all background blocks.

As described above, when the target block CX is the foreground block and the surrounding color blocks CA to CC are background blocks, even the median prediction standard (median predictor) or the SAD minimum prediction standard (SAD minimum predictor) provides poor prediction precision of the predicted motion vector as described with reference to FIG. 2A.

Hence, the present technique calculates, for example, a dispersion (or a standard dispersion) as the variation of the calculated disparity vectors of the encoded (decoded) surrounding color blocks CA to CC in the surrounding of the target block.

Further, according to the present technique, a predicted motion vector which is estimated to be precisely predicted among a predicted motion vector generated according to the disparity information use prediction standard (disparity information use predictor) based on the dispersions which are variations of the calculated disparity vectors of the surrounding color blocks CA to CC, and a predicted motion vector generated according to another vector prediction standard such as the median prediction standard (median predictor) is generated as a predicted motion vector used for the operation of the target block CX.

That is, according to the present technique, the dispersions (also referred to as "surrounding vector dispersions" below) which are variations of the calculated disparity vectors of the surrounding color blocks CA to CC are calculated, and whether or not the dispersions are a predetermined threshold or more is determined.

Further, when the surrounding vector dispersions are not a predetermined threshold or more, that is, there is not a significant difference between the calculated disparity vectors of the surrounding color blocks CA to CC, it is estimated that there is no problem in prediction precision of the predicted motion vector generated according to the median prediction standard, and the predicted motion vector of the target block CX is generated according to the median prediction standard (MVC standard).

Meanwhile, when the surrounding vector dispersions are a predetermined threshold or more, that is, variations of the calculated dispersion vectors of the surrounding color blocks CA to CC are significant, the predicted motion vector generated according to the disparity information use prediction standard is estimated to be more precisely predicted than the predicted motion vector generated according to the median prediction standard, and the predicted motion vector of the target block CX is generated according to the disparity information use prediction standard.

Figure 39:
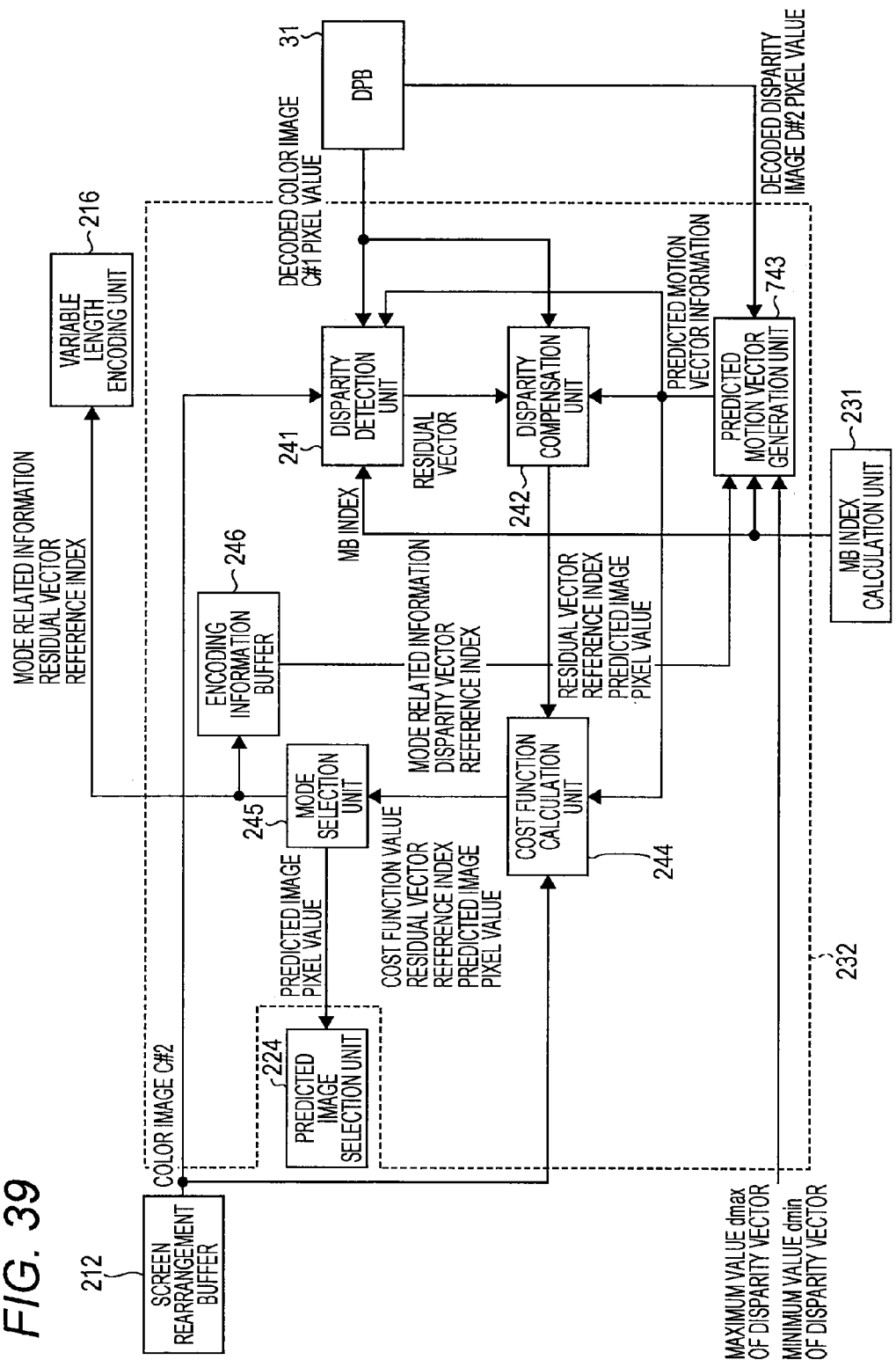
FIG. 39 is a block diagram illustrating an example structure of the disparity prediction unit 232.

FIG. 39 is a block diagram illustrating an example structure of the disparity prediction unit 232 in FIG. 12 when prediction precision is estimated based on an encoding cost.

In addition, in FIG. 39, components corresponding to the components in FIG. 13 will be assigned the same reference numerals, and will not be described below.

FIG. 39 is common to FIG. 13 in that the disparity prediction unit 232 includes the disparity detection unit 241, the disparity compensation unit 242, the cost function calculation unit 244, the mode selection unit 245 and the encoding information buffer 246.

Meanwhile, FIG. 39 differs from FIG. 13 in that the disparity prediction unit 232 has a predicted motion vector generation unit 743 instead of the predicted motion vector generation unit 243.

The predicted motion vector generation unit 743 receives a supply of the decoded disparity image D#2 picture stored in the DPB 31, and receives a supply of the MB index from the MB index calculation unit 231.

Further, the predicted motion vector generation unit 743 receives a supply of the disparity related information (FIG. 4) such as the maximum value dmax and the minimum value dmin of the image capturing disparity vector d (the viewpoint #2 image capturing disparity vector d2).

Furthermore, the predicted motion vector generation unit 743 receives a supply of encoding information of encoded surrounding color blocks (for example, the surrounding color blocks CA to CC in FIG. 38) in a surrounding of the target block in the color image C#2, from the encoding information buffer 246.

Meanwhile, the encoding information of a surrounding color block includes mode related information, a calculated disparity vector and a reference index (a prediction reference index) obtained when the surrounding color block is encoded as a target block as described with reference to FIG. 13.

The predicted motion vector generation unit 743 recognizes a target block in the target picture from the screen rearrangement buffer 212 based on the MB index from the MB index calculation unit 231.

Further, the predicted motion vector generation unit 743 generates as a predicted motion vector used for an operation of the target block a predicted motion vector which is estimated to be more precisely predicted among a predicted motion vector generated according to the disparity information use prediction standard and a predicted motion vector generated according to the MVC standard, based on encoding information of the surrounding color blocks (for example, the surrounding color blocks CA to CC in FIG. 38) in the surrounding block of the target block in encoding information from the encoding information buffer 246.

The predicted motion vector generation unit 743 generates a predicted motion vector for each macro block type (FIG. 9), and supplies the predicted motion vector as predicted motion vector information to the disparity detection unit 241, the disparity compensation unit 242 and the cost function calculation unit 244.

Figure 40:
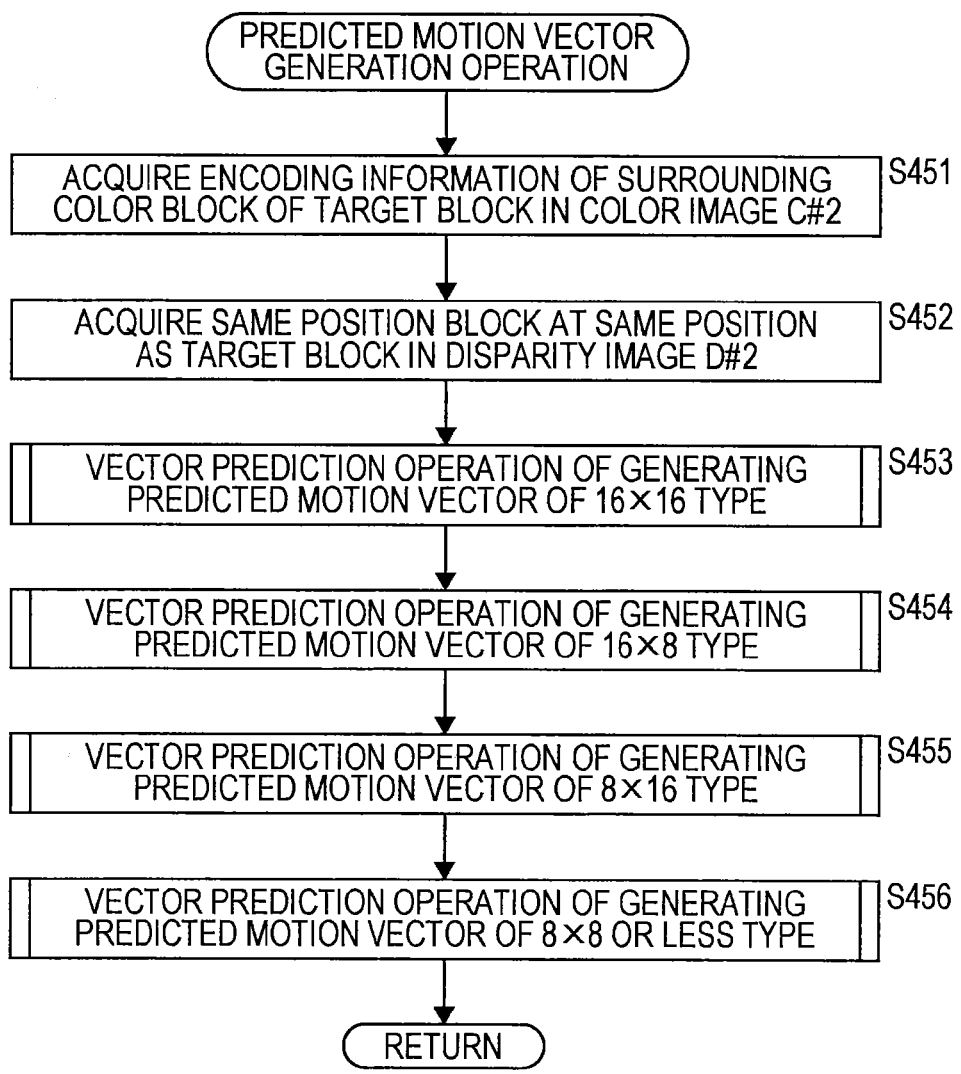
FIG. 40 is a flowchart for explaining a predicted motion vector generation operation.

FIG. 40 is a flowchart for explaining a predicted motion vector generation operation performed by the predicted motion vector generation unit 743 in FIG. 39 in step S43 in FIG. 15.

In step S451, the predicted motion vector generation unit 743 acquires encoding information of encoded surrounding color blocks in a surrounding of the target block in the color image C#2, that is, for example, the three surrounding color blocks CA to CC in FIG. 38 (FIG. 3), from the encoding information buffer 246, and the operation moves to step S452.

In step S452, the predicted motion vector generation unit 743 acquires a block (same position block) at the same position as that of the target block from the decoded disparity image D#2 picture (the picture at the same time as the target picture) from the DPB 31, and the operation moves to step S453.

Hereinafter, in steps S453 to S456, each macro block type is subjected to a vector prediction operation of generating a predicted motion vector of the target block using the information acquired in steps S451 and S452 where necessary, and the operation returns.

That is, in step S453, the predicted motion vector generation unit 743 performs the vector prediction operation on the 6×16 type, and the operation moves to step S454.

In step S454, the predicted motion vector generation unit 743 performs the vector prediction operation on the 16×8 type, and the operation moves to step S455.

In step S455, the predicted motion vector generation unit 743 performs the vector prediction operation on the 8×16 type, and the operation moves to step S456.

In step S456, the predicted motion vector generation unit 743 performs the vector prediction operation on the 8×8 or less type, and the operation returns.

Figure 41:
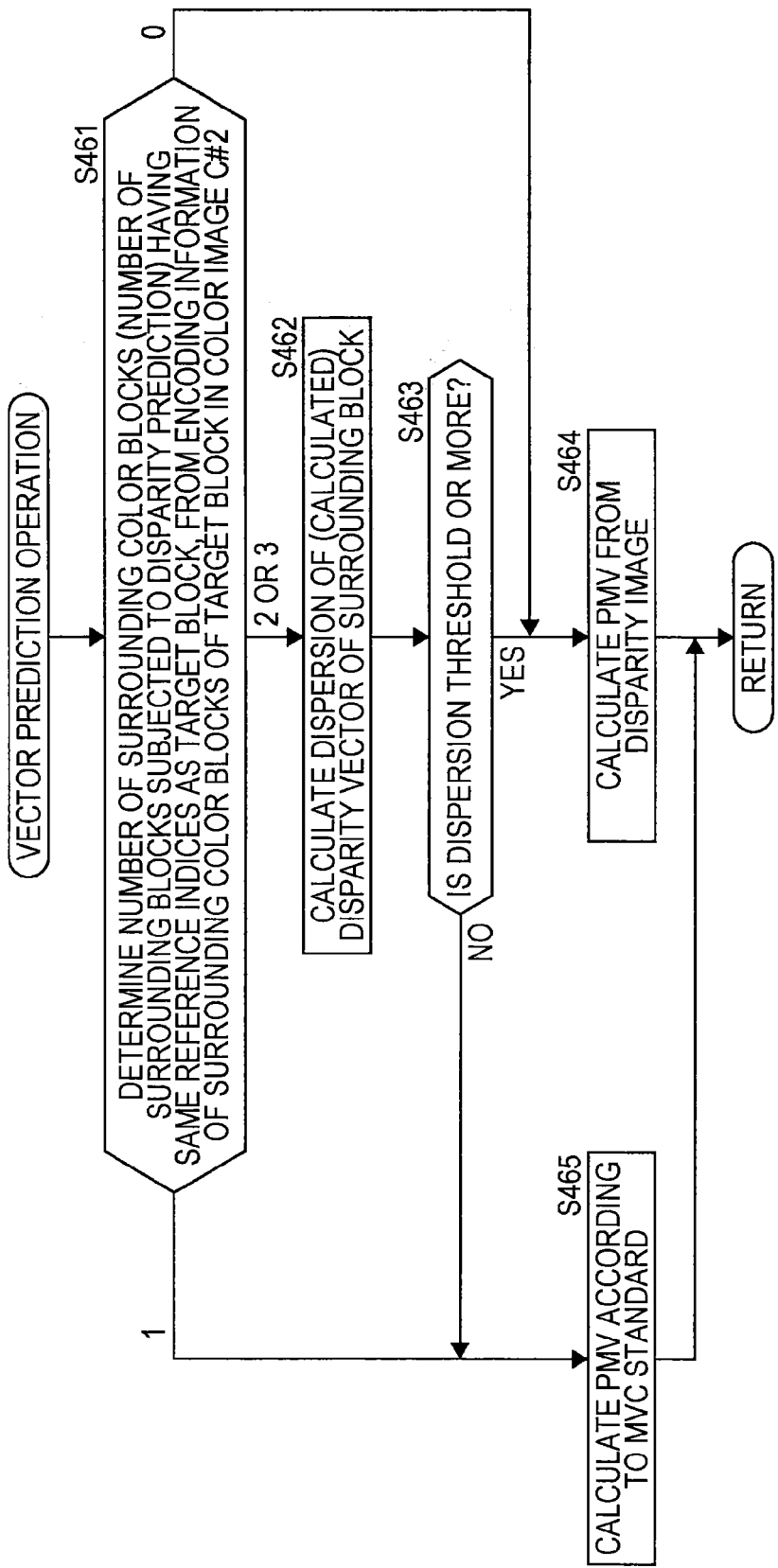
FIG. 41 is a flowchart for explaining a vector prediction operation.

FIG. 41 is a flowchart for explaining a vector prediction operation performed on each macro block type by the predicted motion vector generation unit 743 (FIG. 39) in FIG. 39 in steps S453 to S456 in FIG. 40.

In step S461, the predicted motion vector generation unit 743 determines the number of reference index matching blocks which have reference indices which match the target block among surrounding color blocks (for example, the three surrounding color blocks CA to CC in FIG. 38) in the surrounding of the target block of the color image C#2 based on encoding information.

When it is determined in step S461 that the number of reference index matching blocks is zero, the operation moves to step S464, the predicted motion vector generation unit 743 generates a predicted motion vector of a target block from the decoded disparity image D#2 according to the disparity information use prediction standard similar to the predicted motion vector generation unit 243 in FIG. 13 and the operation returns.

Further, when it is determined in step S461 that the number of reference index matching blocks is one, the operation moves to step S465, the predicted motion vector generation unit 743 generates a predicted motion vector of a target block according to the MVC standard, and the operation returns.

Meanwhile, when it is determined in step S461 that the number of reference index matching blocks is two or more (two or three), the operation moves to step S462, the predicted motion vector generation unit 743 calculates dispersions of surrounding vectors which are dispersions as variations of calculated disparity vectors of two or more reference index matching blocks among surrounding color blocks (for example, the three surrounding color blocks CA to CC in FIG. 38) in the surrounding of the target block, and the operation moves to step S463.

In step S463, the predicted motion vector generation unit 743 determines whether or not the surrounding vector dispersions are a predetermined threshold or more.

When it is determined in step S463 that the surrounding vector dispersions are a predetermined threshold or more, there is no correlation between the disparities of the target block and the surrounding color blocks and it is estimated that prediction precision of the predicted motion vector according to the MVC standard is poor, and then the operation moves to step S464, the predicted motion vector generation unit 743 generates a predicted motion vector of the target block from the decoded disparity image D#2 according to the disparity information use prediction standard, and the operation returns.

Further, when it is determined in step S463 that the surrounding vector dispersions are not a predetermined threshold or more, prediction precision of the predicted motion vector according to the MVC standard is estimated to be good, and then the operation moves to step S465, the predicted motion vector generation unit 743 generates a predicted motion vector of the target block according to the MVC standard, and the operation returns.

Figure 42:
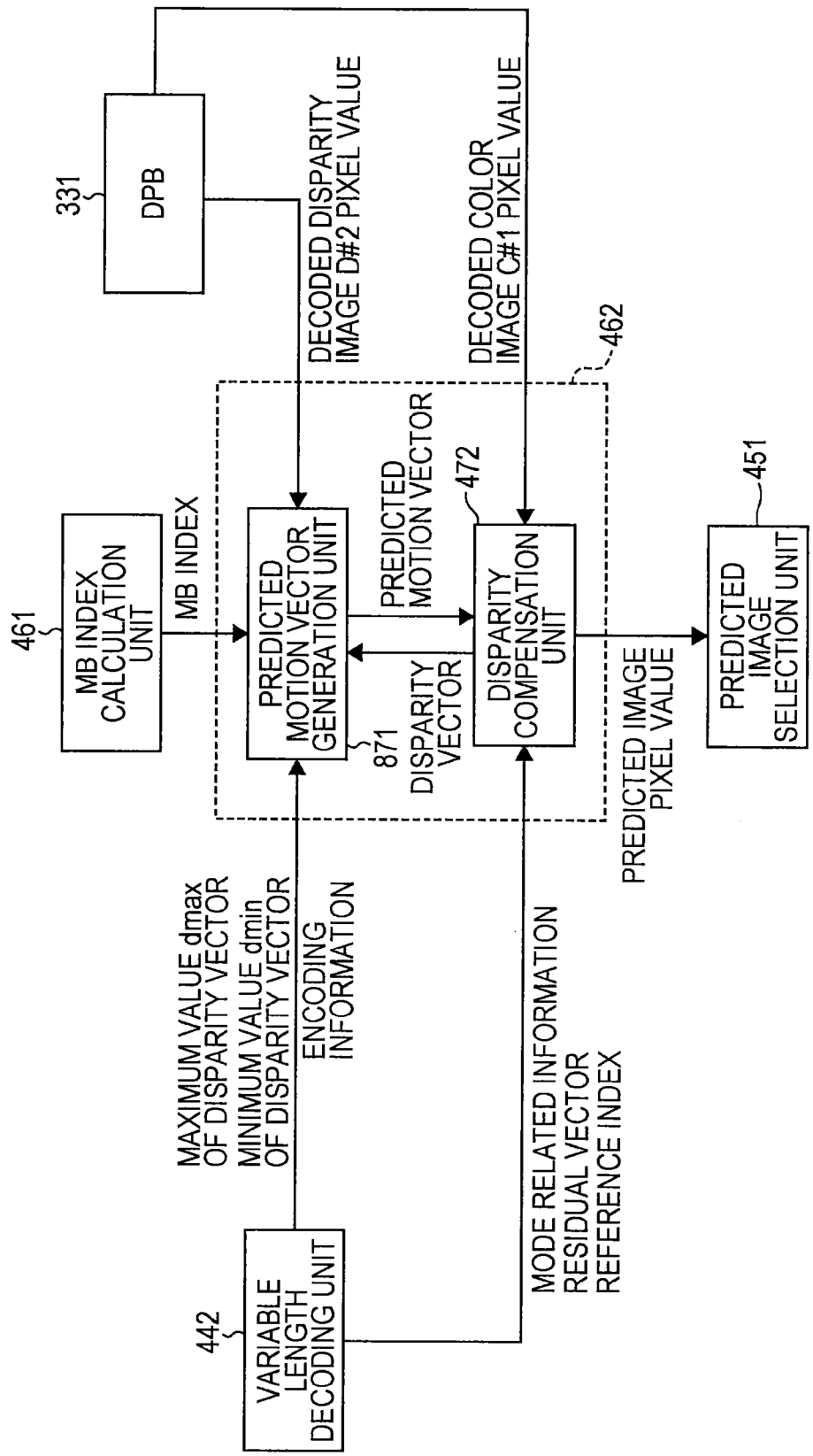
FIG. 42 is a block diagram illustrating an example structure of the disparity prediction unit 462.

FIG. 42 is a block diagram illustrating an example structure of the disparity prediction unit 462 in FIG. 21 when the disparity prediction unit 232 in FIG. 12 is configured as illustrated in FIG. 39.

In addition, components corresponding to the components in FIG. 22 will be assigned the same reference numerals, and will not be adequately described below.

FIG. 42 is common to FIG. 22 in that the disparity prediction unit 462 includes the disparity compensation unit 472.

However, FIG. 42 differs from FIG. 22 in that the disparity prediction unit 462 includes the predicted motion vector generation unit 871 instead of the predicted motion vector generation unit 471.

The predicted motion vector generation unit 871 receives a supply of the decoded disparity image D#2 picture stored in the DPB 331, and receives a supply of the MB index from the MB index calculation unit 461.

Further, the predicted motion vector generation unit 871 receives a supply of the disparity related information (FIG. 4) such as the maximum value dmax and the minimum value dmin of the image capturing disparity vector d (the viewpoint #2 image capturing disparity vector d2) included in the header information from the variable length decoding unit 442.

Furthermore, the predicted motion vector generation unit 871 receives a supply of encoding information of decoded surrounding color blocks (for example, the surrounding color blocks CA to CC in FIG. 38) in a surrounding of the target block in the color image C#2 included in the header information from the variable length decoding unit 442, and encoding information of the target block.

Meanwhile, similar to FIG. 22, the encoding information of the surrounding color block included in the header information from the variable length decoding unit 442 includes mode related information (macro block type) of this surrounding color block and the reference index (prediction reference index), and the encoding information of the target block included in the header information from the variable length decoding unit 442 includes mode related information (macro block type) of this target block, a residual vector and the reference index (prediction reference index).

Further, the predicted motion vector generation unit 871 receives a supply of the calculated disparity vector of the decoded surrounding color block from the disparity compensation unit 472.

The predicted motion vector generation unit 871 recognizes a target block in the target picture based on the MB index from the MB index calculation unit 461.

Further, the predicted motion vector generation unit 871 generates the predicted motion vector of the target block using the decoded disparity image D#2 picture stored in the DPB 331, the disparity related information, the encoding information and the calculated disparity vector of the surrounding color block from the disparity compensation unit 472 where necessary similar to the predicted motion vector generation unit 743 in FIG. 39, and supplies the predicted motion vector to the disparity compensation unit 472.

That is, the predicted motion vector generation unit 871 recognizes the macro block mode of the target block based on the encoding information of the target block, and generates for this macro block mode as the predicted motion vector of the target block a predicted motion vector which is estimated to be precisely predicted among a predicted motion vector generated according to the disparity information use prediction standard and a predicted motion vector generated according to the MVC standard.

Figure 43:
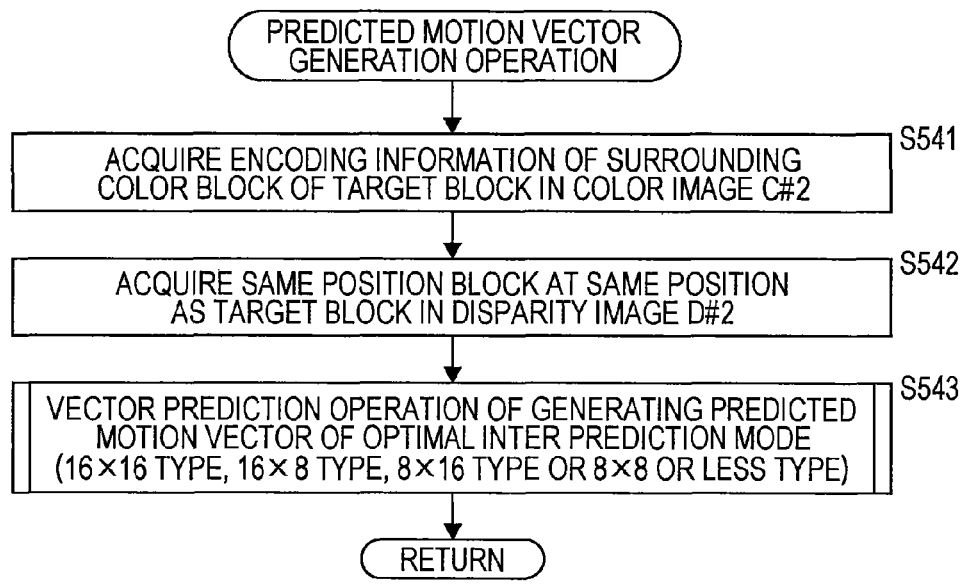
FIG. 43 is a flowchart for explaining a predicted motion vector generation operation.

FIG. 43 is a flowchart for explaining a predicted motion vector generation operation performed by the predicted motion vector generation unit 871 in FIG. 42 in step S133 in FIG. 24.

In step S541, the predicted motion vector generation unit 871 acquires encoding information of the encoded color image C#2 surrounding color blocks (for example, the three surrounding blocks CA to CC in FIG. 38) from the header information from the variable length decoding unit 442, and the operation moves to step S542.

In step S542, the predicted motion vector generation unit 871 acquires a block (same position block) at the same position as that of the target block from the decoded disparity image D#2 picture (the picture at the same time as the target picture) from the DPB 331, and the operation moves to step S543.

In step S543, the predicted motion vector generation unit 871 generates a predicted motion vector of the target block for a macro block mode which is an optimal inter prediction mode indicated by mode related information included in the encoding information of the target block by performing the same vector prediction operation as described with reference to FIG. 41 using, for example, the information acquired in steps S541 and S542 where necessary.

Further, the predicted motion vector generation unit 871 supplies the predicted motion vector of the target block to the disparity compensation unit 472, and the operation returns.

As described above, when a predicted motion vector which is estimated to be precisely predicted among the predicted motion vector according to the disparity information use prediction standard and the predicted motion vector according to the MVC standard is generated as the predicted motion vector used for the operation of the target block based on surrounding vector dispersions which are variations of the calculated disparity vectors of surrounding color blocks in a surrounding of the target block in the color image C#2, the surrounding vector dispersions enable a less calculation amount than the disparity SAD, so that it is possible to more easily obtain a predicted motion vector which is precisely predicted than when a predicted motion vector is obtained based on the disparity SAD described with reference to FIG. 3.

In addition, although the MVC standard (median prediction standard) has been adopted above as a vector prediction standard other than the disparity information use prediction standard, for example, the SAD minimum prediction standard described with reference to FIGS. 1 and 2 can be additionally adopted as the vector prediction standard other than the disparity information use prediction standard.

[Description of Computer to which Present Technique is Applied]

Next, the above described series of operations can be performed by hardware, and can also be performed by software. Where a series of operations is performed with software, a program that forms the software is installed into a general-purpose computer or the like.

Figure 45:
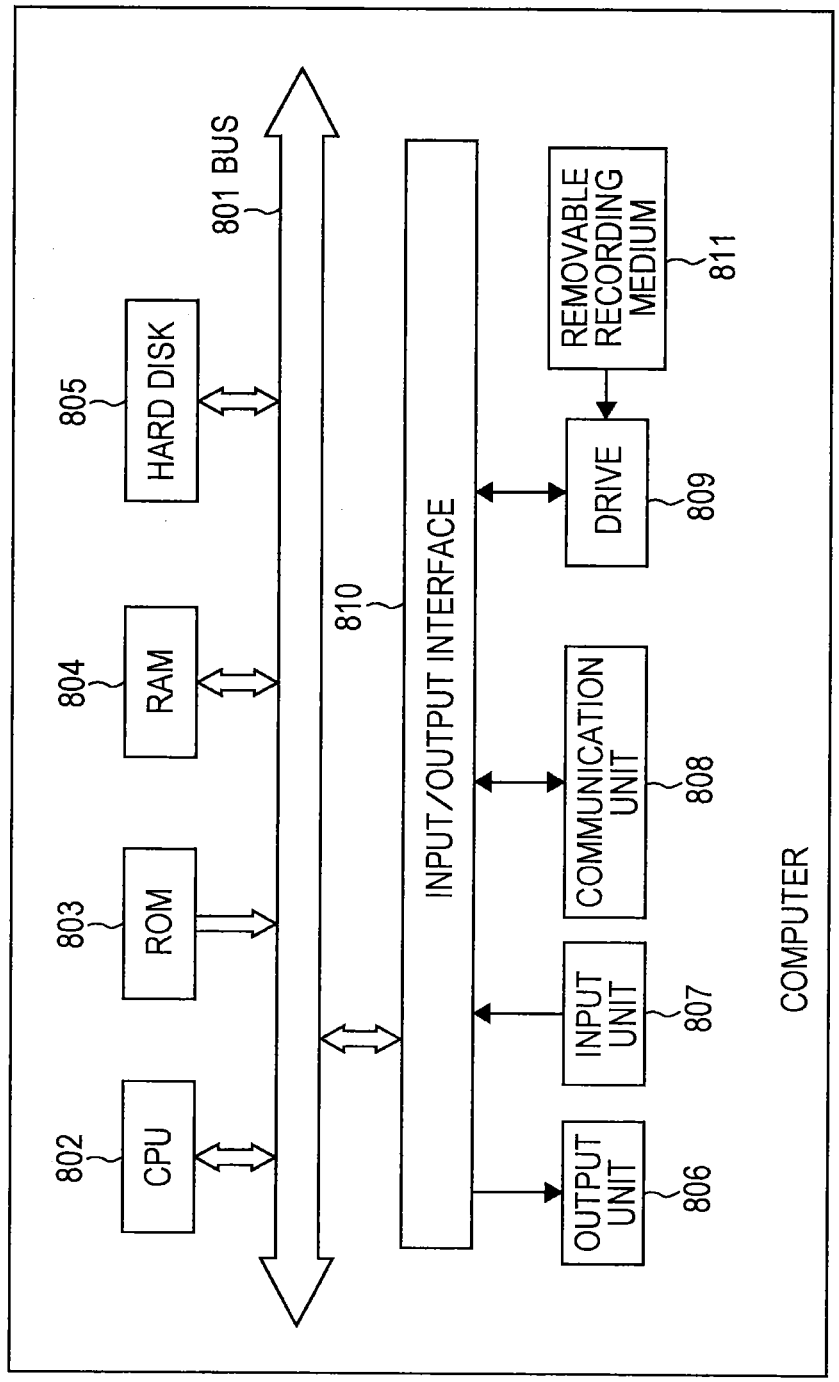
FIG. 45 is a block diagram illustrating an example structure of an embodiment of a computer to which the present technique is applied.

In view of this, FIG. 45 illustrates an example structure of an embodiment of a computer into which the program for performing the above described series of operations is installed.

The program can be recorded beforehand in a hard disk 805 or a ROM 803 provided as a recording medium in the computer.

Alternatively, the program can be stored (recorded) in a removable medium 811. Such a removable medium 811 can be provided as so-called packaged software. Here, the removable medium 811 may be a flexible disk, a CD-ROM (Compact Disc Read Only Memory), a MO (Magneto Optical) disk, a DVD (Digital Versatile Disc), a magnetic disk, or a semiconductor memory, for example.

In addition, the program can be installed into the computer from the above described removable medium 811, but can also be downloaded into the computer via a communication network or a broadcasting network and be installed into the built-in hard disk 805. That is, the program can be wirelessly transferred from a download site, for example, to the computer via an artificial satellite for digital satellite broadcasting, or can be transferred by cable to the computer via a network such as a LAN (Local Area Network) or the Internet.

The computer includes a built-in CPU (Central Processing Unit) 802, and an input/output interface 810 is connected to the CPU 802 via a bus 801.

When an instruction is inputted by a user operating an input unit 807 or the like via the input/output interface 810, the CPU 802 executes the program stored in the ROM (Read Only Memory) 803 accordingly. Alternatively, the CPU 802 loads the program stored in the hard disk 805 into a RAM (Random Access Memory) 804, and executes the program.

By doing so, the CPU 802 performs the operations according to the above described flowcharts, or performs the operations with the structures illustrated in the above described block diagrams. Where necessary, the CPU 802 outputs the operation results from an output unit 806 or transmit the operation results from a communication unit 808, via the input/output interface 810, for example, and further stores the operation results into the hard disk 805.

The input unit 807 is formed with a keyboard, a mouse, a microphone, and the like. The output unit 806 is formed with a LCD (Liquid Crystal Display), a speaker, and the like.

In this specification, the operations performed by the computer in accordance with the program are not necessarily performed in chronological order compliant with the sequences shown in the flowcharts. That is, the operations to be performed by the computer in accordance with the program include operations to be performed in parallel or independently of one another (such as parallel operations or object-based operations).

The program may be executed by one computer (processor), or may be executed in a distributive manner by more than one computer. Further, the program may be transferred to a remote computer, and be executed therein.

It should be noted that the embodiment of the present technique is not limited to the above described embodiment, and various modifications may be made to them without departing from the scope of the present technique.

That is, the present technique is not limited to encoding and decoding using MVC. That is, the present technique is applicable when a plurality of viewpoint images is encoded and decoded using predicted motion vectors.

[Example Structure of Television Apparatus]

Figure 46:
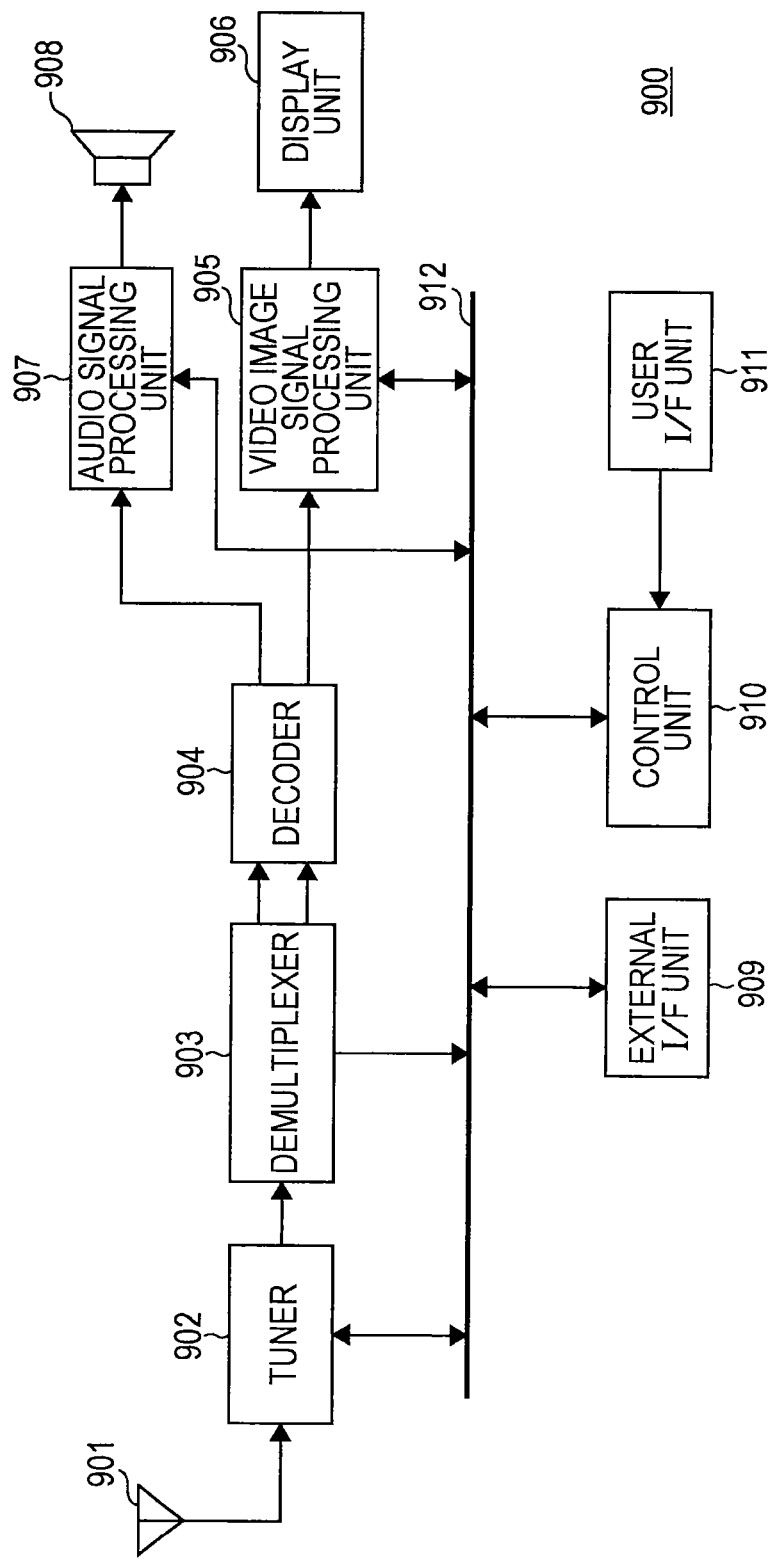
FIG. 46 is a diagram illustrating a schematic example structure of a television device to which the present technique is applied.

FIG. 46 illustrates a schematic structure of a television device to which the present technique is applied. The television device 900 includes an antenna 901, a tuner 902, a demultiplexer 903, a decoder 904, a video signal processing unit 905, a display unit 906, an audio signal processing unit 907, a speaker 908, and an external interface unit 909. Further, the television device 900 further includes a control unit 910, a user interface unit 911, and the like.

The tuner 902 selects a desired channel from broadcast wave signals received at the antenna 901, and performs demodulation. The resulting encoded bit stream is outputted to the demultiplexer 903.

The demultiplexer 903 extracts the video and audio packets of the show to be viewed from the encoded bit stream, and outputs the data of the extracted packets to the decoder 904. Further, the demultiplexer 903 also supplies a packet of data such as EPG (Electronic Program Guide) to the control unit 910. Where scrambling is performed, the demultiplexer or the like cancels the scrambling.

The decoder 904 performs a packet decoding operation, and outputs the video data generated through the decoding operation to the video signal processing unit 905, and the audio data to the audio signal processing unit 907.

The video signal processing unit 905 subjects the video data to a noise removal and video processing or the like in accordance with user settings. The video signal processing unit 905 generates video data of the show to be displayed on the display unit 906, or generates image data or the like through an operation based on an application supplied via a network. Further, the video signal processing unit 905 also generates video data for displaying a menu screen or the like for item selection, and superimposes the video data on the video data of the show. Based on the video data generated in this manner, the video signal processing unit 905 generates a drive signal to drive the display unit 906.

Based on the drive signal from the video signal processing unit 905, the display unit 906 drives a display device (a liquid crystal display element, for example) to display the video of the show.

The audio signal processing unit 907 subjects the audio data to predetermined processing such as a noise removal, and performs a D/A conversion operation and an amplification operation on the processed audio data. The resulting audio data is supplied as an audio output to the speaker 908.

The external interface unit 909 is an interface for a connection with an external device or a network, and transmits and receives data such as video data and audio data.

The user interface unit 911 is connected to the control unit 910. The user interface unit 911 is formed with operation switches, a remote control signal reception unit, and the like, and supplies an operating signal according to a user operation to the control unit 910.

The control unit 910 is formed with a CPU (Central Processing Unit), a memory, and the like. The memory stores the program to be executed by the CPU, various kinds of data necessary for the CPU to perform operations, the EPG data, data obtained via a network, and the like. The program stored in the memory is read and executed by the CPU at a predetermined time such as the time of activation of the television device 900. The CPU executes the program to control the respective components so that the television device 900 operates in accordance with a user operation.

In addition, in the television device 900, a bus 912 is provided for connecting the tuner 902, the demultiplexer 903, the video signal processing unit 905, the audio signal processing unit 907, the external interface unit 909, and the like, to the control unit 910.

In the television device having such a structure, the function of an image processing device (an image processing method) of the present invention is provided in the decoder 904. Consequently, it is possible to calculate a vector which is precisely predicted as a predicted motion vector of a disparity vector.

[Example Structure of Portable Telephone Device]

Figure 47:
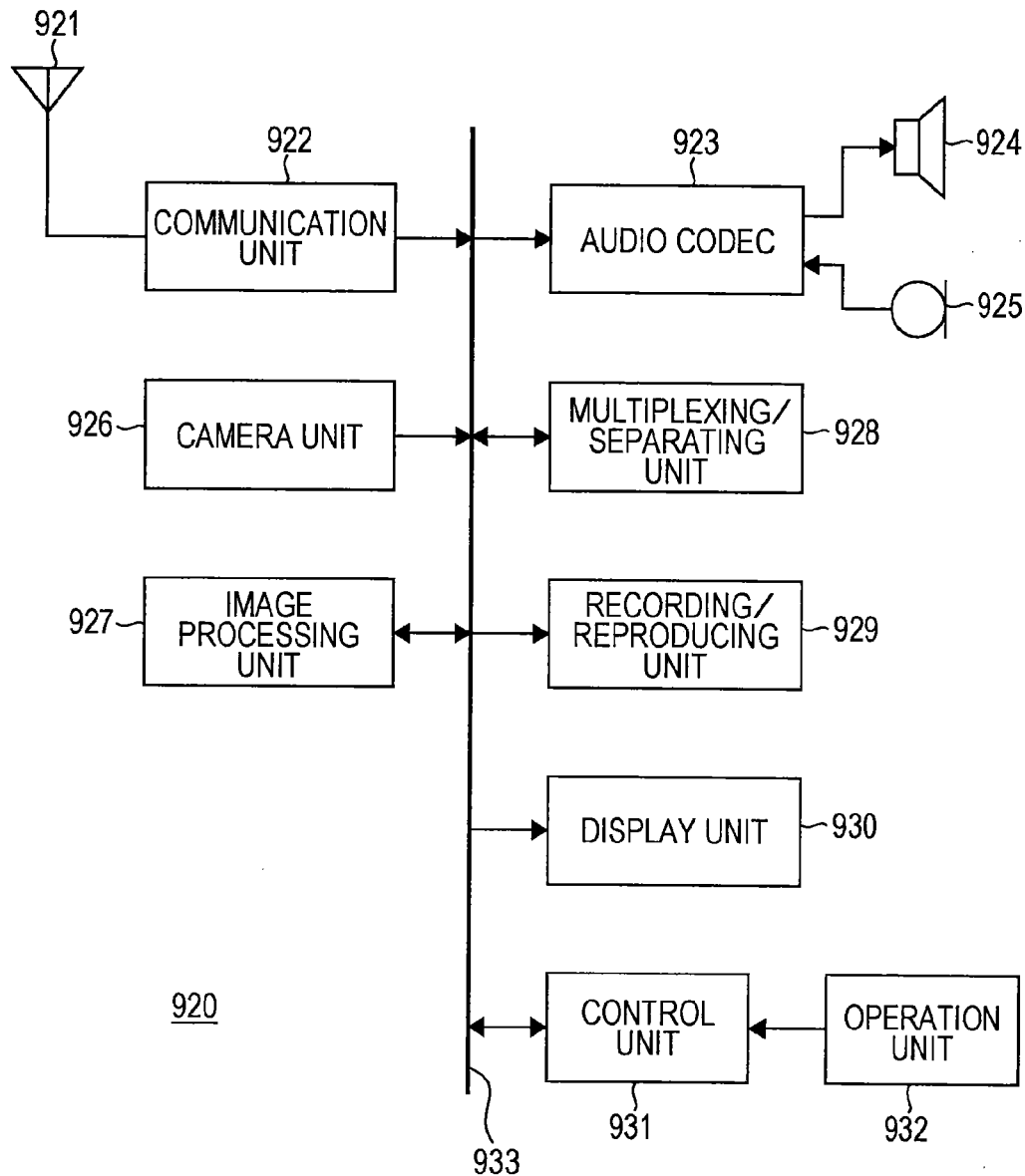
FIG. 47 is a diagram illustrating a schematic example structure of a portable telephone device to which the present technique is applied.

FIG. 47 illustrates a schematic structure of a portable telephone device to which the present technique is applied. The portable telephone device 920 includes a communication unit 922, an audio codec 923, a camera unit 926, an image processing unit 927, a multiplexing/separating unit 928, a recording/reproducing unit 929, a display unit 930, and a control unit 931. Those components are connected to one another via a bus 933.

Also, an antenna 921 is connected to the communication unit 922, and a speaker 924 and a microphone 925 are connected to the audio codec 923. Further, an operation unit 932 is connected to the control unit 931.

The portable telephone device 920 performs various kinds of operations such as transmission and reception of audio signals, transmission and reception of electronic mail and image data, image capturing, and data recording, in various kinds of modes such as an audio communication mode and a data communication mode.

In the audio communication mode, an audio signal generated at the microphone 925 is converted into audio data, and the data is compressed at the audio codec 923. The compressed data is supplied to the communication unit 922. The communication unit 922 performs a modulation operation, a frequency conversion operation, and the like on the audio data, to generate a transmission signal. Further, the communication unit 922 also supplies the transmission signal to the antenna 921, and the transmission signal is transmitted to a base station (not shown). Furthermore, the communication unit 922 also amplifies a signal received at the antenna 921, and performs a frequency conversion operation, a demodulation operation, and the like. The resulting audio data is supplied to the audio codec 923. The audio codec 923 decompresses audio data, and converts the audio data into an analog audio signal to be outputted to the speaker 924.

When mail transmission is performed in the data communication mode, the control unit 931 receives text data which is inputted by operating the operation unit 932, and the inputted text is displayed on the display unit 930. Further, in accordance with a user instruction or the like through the operation unit 932, the control unit 931 generates and supplies mail data to the communication unit 922. The communication unit 922 performs a modulation operation, a frequency conversion operation, and the like on the mail data, and transmits the resulting transmission signal from the antenna 921. Further, the communication unit 922 also amplifies a signal received at the antenna 921, and performs a frequency conversion operation, a demodulation operation, and the like, to restore the mail data. This mail data is supplied to the display unit 930, and the content of the mail is displayed.

In addition, the portable telephone device 920 can cause the recording/reproducing unit 929 to store received mail data into a storage medium. The storage medium is a rewritable storage medium. For example, the storage medium may be a semiconductor memory such as a RAM or an internal flash memory, a hard disk, or a removable medium such as a magnetic disk, a magnetooptical disk, an optical disk, a USB memory, or a memory card.

When image data is transmitted in the data communication mode, image data generated at the camera unit 926 is supplied to the image processing unit 927. The image processing unit 927 performs an encoding operation on the image data, to generate encoded data.

The multiplexing/separating unit 928 multiplexes the encoded data generated at the image processing unit 927 and the audio data supplied from the audio codec 923 by a predetermined technique, and supplies the multiplexed data to the communication unit 922. The communication unit 922 performs a modulation operation, a frequency conversion operation, and the like on the multiplexed data, and transmits the resulting transmission signal from the antenna 921. Further, the communication unit 922 also amplifies a signal received at the antenna 921, and performs a frequency conversion operation, a demodulation operation, and the like, to restore the multiplexed data. This multiplexed data is supplied to the multiplexing/separating unit 928. The multiplexing/separating unit 928 divides the multiplexed data, and supplies the encoded data to the image processing unit 927, and the audio data to the audio codec 923. The image processing unit 927 performs a decoding operation on the encoded data, to generate image data. This image data is supplied to the display unit 930, to display the received images. The audio codec 923 converts the audio data into an analog audio signal and outputs the analog audio signal to the speaker 924, and the received sound is outputted.

In the portable telephone device having the above structure, the image processing unit 927 has the functions of an image processing device (an image processing method) of the present invention. Consequently, it is possible to calculate a vector which is precisely predicted as a predicted motion vector of a disparity vector.

[Example Structure of Recording/Reproducing Device]

Figure 48:
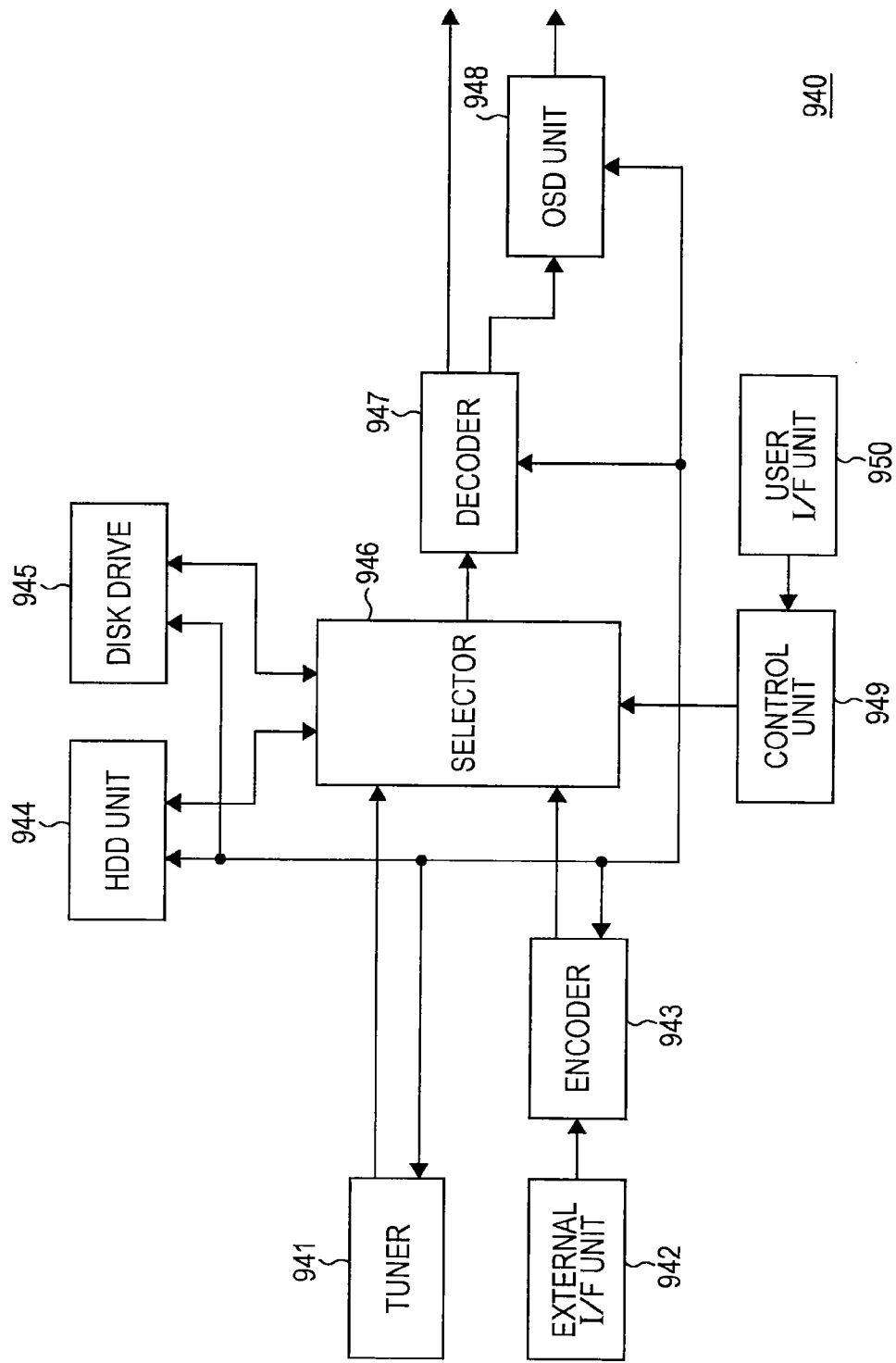
FIG. 48 is a diagram illustrating a schematic example structure of a recording/reproducing device to which the present technique is applied.

FIG. 48 illustrates a schematic structure of a recording/reproducing device to which the present technique is applied. The recording/reproducing device 940 records the audio data and video data of a received broadcast show on a recording medium, for example, and provides the recorded data to a user at the time according to an instruction from the user. Further, the recording/reproducing device 940 can also acquire audio data and video data from another device, for example, and record the data on a recording medium. Furthermore, the recording/reproducing device 940 decodes and outputs audio data and video data recorded on a recording medium, so that a monitor device or the like can display images and outputs sound.

The recording/reproducing device 940 includes a tuner 941, an external interface unit 942, an encoder 943, a HDD (Hard Disk Drive) unit 944, a disk drive 945, a selector 946, a decoder 947, an OSD (On-Screen. Display) unit 948, a control unit 949, and a user interface unit 950.

The tuner 941 selects a desired channel from broadcast signals received at an antenna (not shown). The tuner 941 demodulates the received signal of the desired channel, and outputs the resulting encoded bit stream to the selector 946.

The external interface unit 942 is formed with at least one of an IEEE1394 interface, a network interface unit, a USB interface, a flash memory interface, and the like. The external interface unit 942 is an interface for a connection with an external device, a network, a memory card, or the like, and receives data such as video data and audio data to be recorded and the like.

The encoder 943 performs predetermined encoding on video data and audio data which are supplied from the external interface unit 942 and are not encoded, and outputs an encoded bit stream to the selector 946.

The HDD unit 944 records content data such as videos and sound, various kinds of programs, and other data on an internal hard disk, and reads the data from the hard disk at the time of reproduction or the like.

The disk drive 945 performs signal recording and reproduction on a mounted optical disk. The optical disk may be a DVD disk (such as a DVD-Video, a DVD-RAM, a DVD-R, a DVD-RW, a DVD+R, or a DVD+RW) or a Blu-ray disc, for example.

The selector 946 selects an encoded bit stream from the tuner 941 or the encoder 943 at the time of video and audio recording, and supplies the encoded bit stream to either the HDD unit 944 or the disk drive 945. Further, the selector 946 also supplies an encoded bit stream outputted from the HDD unit 944 or the disk drive 945 to the decoder 947 at the time of video and audio reproduction.

The decoder 947 performs a decoding operation on an encoded bit stream. The decoder 947 supplies the video data generated by performing the decoding operation to the OSD unit 948. Further, the decoder 947 also outputs the audio data generated by performing the decoding operation.

The OSD unit 948 also generates video data for displaying a menu screen or the like for item selection, and superimposes the video data on video data outputted from the decoder 947.

The user interface unit 950 is connected to the control unit 949. The user interface unit 950 is formed with operation switches, a remote control signal reception unit, and the like, and supplies an operating signal according to a user operation to the control unit 949.

The control unit 949 is formed with a CPU, a memory, and the like. The memory stores the program to be executed by the CPU, and various kinds of data necessary for the CPU to perform operations. The program stored in the memory is read and executed by the CPU at a predetermined time such as the time of activation of the recording/reproducing device 940. The CPU executes the program to control the respective components so that the recording/reproducing device 940 operates in accordance with a user operation.

In the recording/reproducing device having such a structure, the function of an image processing device (an image processing method) of the present invention is provided in the decoder 947. Consequently, it is possible to calculate a vector which is precisely predicted as a predicted motion vector of a disparity vector.

[Example Structure of Imaging Device]

Figure 49:
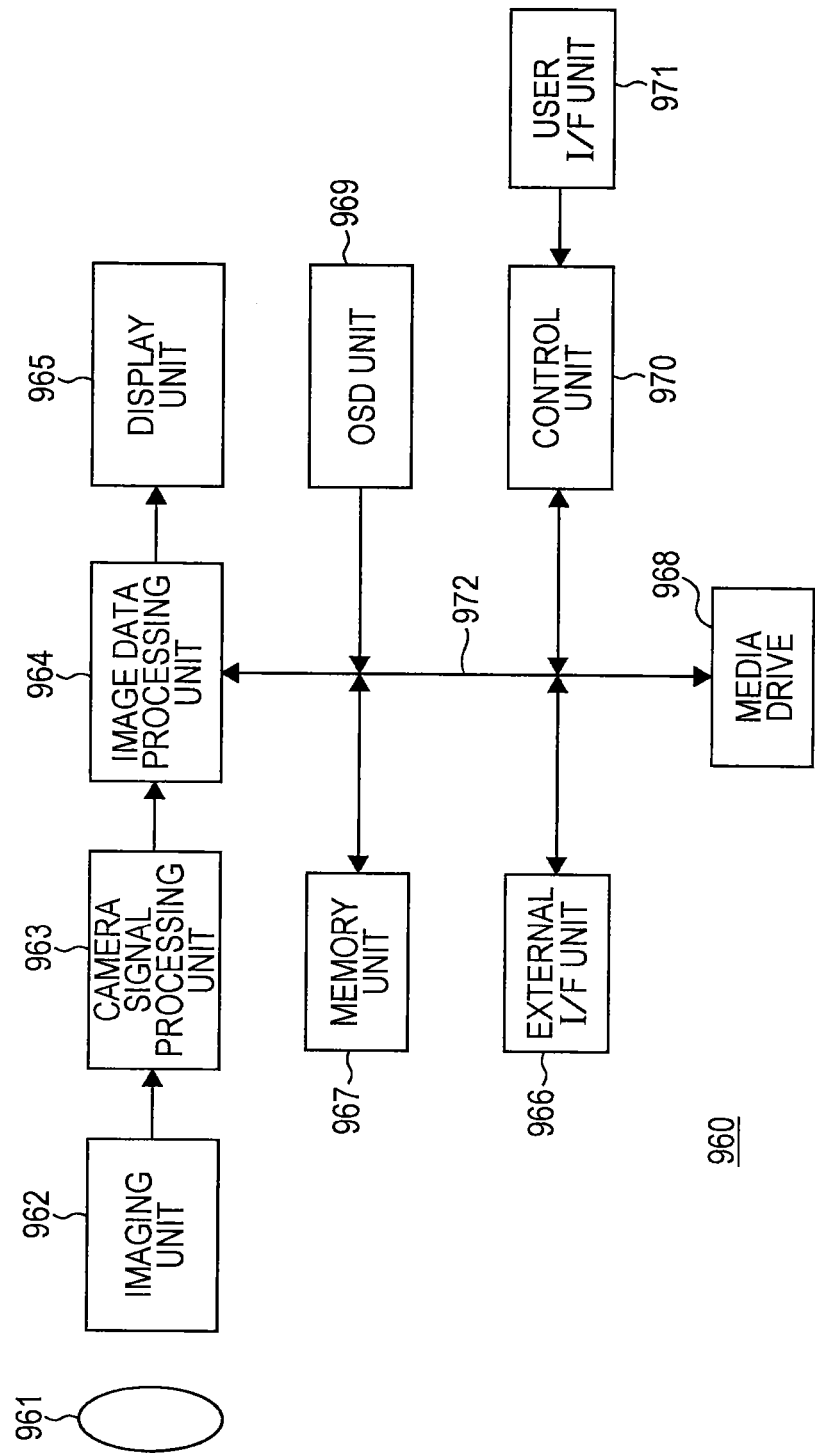
FIG. 49 is a diagram illustrating a schematic example structure of an imaging device to which the present technique is applied.

FIG. 49 illustrates a schematic structure of an imaging device to which the present technique is applied. An imaging device 960 captures an image of an object, and causes a display unit to display the image of the object or records the image as image data on a recording medium.

The imaging device 960 includes an optical block 961, an imaging unit 962, a camera signal processing unit 963, an image data processing unit 964, a display unit 965, an external interface unit 966, a memory unit 967, a media drive 968, an OSD unit 969, and a control unit 970. Further, a user interface unit 971 is connected to the control unit 970. Furthermore, the image data processing unit 964, the external interface unit 966, the memory unit 967, the media drive 968, the OSD unit 969, the control unit 970, and the like are connected via a bus 972.

The optical block 961 is formed with a focus lens, a diaphragm, and the like. The optical block 961 forms an optical image of a subject on the imaging surface of the imaging unit 962. Formed with a CCD or a CMOS image sensor, the imaging unit 962 generates an electrical signal in accordance with the optical image through a photoelectric conversion, and supplies the electrical signal to the camera signal processing unit 963.

The camera signal processing unit 963 performs various kinds of camera signal processing such as a knee correction, a gamma correction, and a color correction on the electrical signal supplied from the imaging unit 962. The camera signal processing unit 963 supplies the image data subjected to the camera signal processing to the image data processing unit 964.

The image data processing unit 964 performs an encoding operation on the image data supplied from the camera signal processing unit 963. The image data processing unit 964 supplies the encoded data generated by performing the encoding operation, to the external interface unit 966 and the media drive 968. Further, the image data processing unit 964 also performs a decoding operation on the encoded data supplied from the external interface unit 966 and the media drive 968. The image data processing unit 964 supplies the image data generated by performing the decoding operation to the display unit 965. Further, the image data processing unit 964 also performs an operation to supply the image data supplied from the camera signal processing unit 963 to the display unit 965, or superimposes display data acquired from the OSD unit 969 on the image data and supplies the image data to the display unit 965.

The OSD unit 969 generates display data of a menu screen and icons formed with symbols, characters, or figures, and outputs the data to the image data processing unit 964.

The external interface unit 966 is formed with a USB input/output terminal and the like, for example, and is connected to a printer when image printing is performed. Further, a drive is also connected to the external interface unit 966 where necessary, and a removable medium such as a magnetic disk or an optical disk is mounted on the drive as appropriate. A computer program read from such a removable disk is installed where necessary. Furthermore, the external interface unit 966 includes a network interface connected to a predetermined network such as a LAN or the internet. The control unit 970 reads encoded data from the memory unit 967 in accordance with an instruction from the user interface unit 971, for example, and can supply the encoded data from the external interface unit 966 to another device connected thereto via a network. Further, the control unit 970 can also obtain, via the external interface unit 966, encoded data or image data supplied from another device via a network, and supply the encoded data or image data to the image data processing unit 964.

A recording medium to be driven by the media drive 968 may be a readable/rewritable removable medium such as a magnetic disk, a magnetooptical disk, an optical disk, or a semiconductor memory. Further, the recording medium may be any type of removable medium, and may be a tape device, a disk, or a memory card. The recording medium may of course be a non-contact IC card or the like.

Alternatively, the media drive 968 and a recording medium may be integrated, and may be formed with an immobile storage medium such as an internal hard disk drive or a SSD (Solid State Drive).

The control unit 970 is formed with a CPU, a memory, and the like. The memory stores the program to be executed by the CPU, various kinds of data necessary for the CPU to perform operations, and the like. The program stored in the memory is read and executed by the CPU at a predetermined time such as the time of activation of the imaging device 960. The CPU executes the program to control the respective components so that the imaging device 960 operates in accordance with a user operation.

In the imaging device having the above structure, the image data processing unit 964 has the functions of an image processing device (an image processing method) of the present invention. Consequently, it is possible to calculate a vector which is precisely predicted as a predicted motion vector of a disparity vector.

REFERENCE SIGNS LIST

11, 12, 21, 22 Encoder, 31 DPB, 32 Multiplexing unit, 41, 42 Camera, 43 Multi-view image information generation unit, 111 A/D converter, 112 Screen rearrangement buffer, 113 Arithmetic operation unit, 114 Orthogonal transform unit, 115 Quantization unit, 116 Variable length encoding unit, 117 Accumulation buffer, 118 Inverse quantization unit, 119 Inverse orthogonal transform unit, 120 Arithmetic operation unit, 121 Deblocking filter, 122 Intra screen prediction unit, 123 Inter prediction unit, 124 Predicted image selection unit, 211 A/D converter, 212 Screen rearrangement buffer, 213 Arithmetic operation unit, 214 Orthogonal transform unit, 215 Quantization unit, 216 Variable length encoding unit, 217 Accumulation buffer, 218 Inverse quantization unit, 219 Inverse orthogonal transform unit, 220 Arithmetic operation unit, 221 Deblocking filter, 222 Intra screen prediction unit, 224 Predicted image selection unit, 231 MB index calculation unit, 232 Disparity prediction unit, 241 Disparity detection unit, 242 Disparity compensation unit, 243 Predicted motion vector generation unit, 244 Cost function calculation unit, 245 Mode selection unit, 246 Encoding information buffer, 301 Separating unit, 311, 312, 321, 322 Decoder, 331 DPB, 341 Accumulation buffer, 342 Variable length decoding unit, 343 Inverse quantization unit, 344 Inverse orthogonal transform unit, 345 Arithmetic operation unit, 346 Deblocking filter, 347 Screen rearrangement buffer, 348 D/A converter, 349 Intra screen prediction unit, 350 Inter prediction unit, 351 Predicted image selection unit, 441 Accumulation buffer, 442 Variable length decoding unit, 443 Inverse quantization unit, 444 Inverse orthogonal transform unit, 445 Arithmetic operation unit, 446 Deblocking filter, 447 Screen rearrangement buffer, 448 D/A converter, 449 Intra screen prediction unit, 451 Predicted image selection unit, 461 MB index calculation unit, 462 Disparity prediction unit, 471 Predicted motion vector generation unit, 472 Disparity compensation unit, 541 Disparity detection unit, 542 Disparity compensation unit, 543 Predicted motion vector generation unit, 544 Cost function calculation unit, 545 Mode selection unit, 546 Encoding information buffer, 671, 743, 871 Predicted motion vector generation unit, 801 Bus, 802 CPU, 803 ROM, 804 RAM, 805 Hard disk, 806 Output unit, 807 Input unit, 808 Communication unit, 809 Drive, 810 Input/output interface, 811 Removable recording medium

The invention claimed is:

1. An image processing device comprising:
predicted motion vector generation circuitry configured to generate a first predicted motion vector for a target block of a color image of a second viewpoint with respect to a color image of a first viewpoint different from the second viewpoint according to a depth information prediction standard, wherein
the predicted motion vector generation circuitry is configured to calculate a disparity vector of the target block from a depth image of the second viewpoint and adopt the disparity vector as the first predicted motion vector for the target block,
the disparity vector represents a disparity of the target block of the color image of the second viewpoint with respect to the color image of the first viewpoint, and
the depth image of the second viewpoint comprises depth information related to a disparity of each pixel of the color image of the second viewpoint as a pixel value;
the predicted motion vector generation circuitry configured to generate a second predicted motion vector for the target block of the color image of the second viewpoint with respect to the color image of the first viewpoint according to a median prediction standard, wherein
the predicted motion vector generation circuitry is configured to calculate a median of disparity vectors of surrounding color blocks adjacent to the target block and adopt the median as the second predicted motion vector for the target block; and
the predicted motion vector generation circuitry configured to select a final prediction motion vector for the target block of the color image of the second viewpoint with respect to the color image of the first viewpoint among the first predicted motion vector and the second predicted motion vector, based on a number of surrounding depth blocks in the depth image of the second viewpoint, a number of reference index matching blocks, and a variation of the disparity vectors of the surrounding color blocks adjacent to the target block of the color image of the second viewpoint.

2. The image processing device according to claim 1, wherein the predicted motion vector generation circuitry is further configured to:
calculate SAD (Sum of Absolute Difference) values represented by differences between a same position block which is a block at a same position as the target block in the depth image of the second viewpoint and each of the surrounding depth blocks in a surrounding of the same position block,
count a number of surrounding depth blocks having a corresponding SAD value equal to or more than a first predetermined threshold,
select the final prediction motion vector for the target block of the color image of the second viewpoint among the first predicted motion vector and the second predicted motion vector, based on the number of the surrounding depth blocks, wherein
the predicted motion vector generation circuitry is configured to adopt the first predicted motion vector as the final prediction motion vector when the number of the surrounding depth blocks is two or more and the predicted motion vector generation circuitry is configured to adopt the second predicted motion vector as the final prediction motion vector when the number of the surrounding depth blocks is not two or more.

3. The image processing device according to claim 2, wherein the predicted motion vector generation circuitry is further configured to:
acquire encoding information of encoded surrounding color blocks in a surrounding of the target block of the color image of the second viewpoint;
calculate a difference between the surrounding depth block at a same position as a reference index matching block and the same position block in the depth image of the second viewpoint, wherein
the reference index matching block is a block among the surrounding color blocks of the target block,
the reference index matching block comprises a reference index, and
the reference index represents a reference picture used to generate a predicted image for the color image of the second viewpoint;
count a number of the reference index matching block which matches with the target block among the surrounding color blocks of the target block in the color image of the second viewpoint; and
select the final prediction motion vector for the target block of the color image of the second viewpoint among the first predicted motion vector and the second predicted motion vector based on the number of the reference index matching blocks, wherein
the predicted motion vector generation circuitry is configured to adopt the first predicted motion vector as the final prediction motion vector when the number of the reference index matching blocks is zero, or when the number of the reference index matching blocks is one or more and the number of the reference index matching blocks is bigger than the number of surrounding depth blocks having a corresponding SAD value more than the first predetermined threshold, and
otherwise the predicted motion vector generation circuitry is configured to adopt the second predicted motion vector as the final prediction motion vector.

4. The image processing device according to claim 1, wherein
the predicted motion vector generation circuitry is further configured to calculate a variation of a disparity vector of a reference index matching block, wherein
the reference index matching block is a block among the surrounding color blocks of the target block,
the reference index matching block comprises a reference index,
the reference index represents a reference picture used to generate a predicted image for the color image of the second viewpoint, and
the reference index matching block matches with the target block among the surrounding color blocks of the target block in the color image of the second view;
the predicted motion vector generation circuitry is further configured to determine whether the variation exceeds a second predetermined threshold; and
the predicted motion vector generation circuitry is further configured to select the final prediction motion vector for the target block of the color image of the second viewpoint among the first predicted motion vector and the second predicted motion vector based on the variation of the disparity vector of the reference index matching block, wherein the predicted motion vector generation circuitry is configured to adopt the first predicted motion vector as the final prediction motion vector when the variation exceeds the second predetermined threshold, and
otherwise the predicted motion vector generation circuitry is configured to adopt either the first predicted motion vector or the second predicted motion vector as the final prediction motion vector.

5. The image processing device according to claim 1, further comprising:
cost calculation circuitry configured to calculate an encoding cost required to encode the target block, per block type which represents a pattern of dividing the target block into a partition for detecting the disparity vector; and
selection circuitry configured to select a block type which encodes the target block based on the encoding cost, wherein the predicted motion vector generation circuitry is configured to generate a predicted motion vector for each block type according to the depth information prediction standard.

6. The image processing device according to claim 1, wherein
the predicted motion vector generation circuitry is configured to:
generate the first predicted motion vector generated according to the depth information prediction standard and the second predicted motion vector generated according to the median prediction standard,
calculate encoding costs required to encode the target block when the first predicted motion vector is adopted as the final predicted motion vector and when the second predicted motion vector is adopted as the final predicted motion vector, and
selects the final prediction motion vector for the target block among the first predicted motion vector and the second predicted motion vector based on the encoding costs; and
the image processing device further comprises a processing circuit configured to output a flag which indicates one of the first predicted motion vector and the second predicted motion vector as the final prediction motion vector for the target block.

7. The image processing device according to claim 1, wherein the predicted motion vector generation circuitry is further configured to:
acquire a flag, the flag indicating that one of the first predicted motion vector generated according to the depth information prediction standard and the second predicted motion vector generated according to the median prediction standard is selected as the final prediction motion vector for the target block, and
generate the first predicted motion vector or the second predicted motion vector based on the flag.

8. The image processing device according to claim 1, wherein the predicted motion vector generation circuitry is further configured to generate as the first predicted motion vector according to the depth information prediction standard an average value of a vector, the average value representing a disparity calculated from the depth information which is a pixel value of a same position block which is a block at a same position as the target block in the depth image of the second viewpoint.

9. An image processing method, comprising:
generating, by predicted motion vector generation circuitry, a first predicted motion vector for a target block of a color image of a second viewpoint with respect to a color image of a first viewpoint different from the second viewpoint according to a depth information prediction standard, wherein
    generating the first predicted motion vector includes calculating a disparity vector of the target block from a depth image of the second viewpoint and adopting the disparity vector as the first predicted motion vector for the target block,
    the disparity vector represents a disparity of the target block of the color image of the second viewpoint with respect to the color image of the first viewpoint, and
    the depth image of the second viewpoint comprises depth information related to a disparity of each pixel of the color image of the second viewpoint as a pixel value;
generating, by the predicted motion vector generation circuitry, a second predicted motion vector for the target block of the color image of the second viewpoint with respect to the color image of the first viewpoint according a median prediction standard, wherein
    generating the second predicted motion vector includes calculating a median of disparity vectors of surrounding color blocks adjacent to the target block and adopting the median as the second predicted motion vector for the target block; and
selecting, by the predicted motion vector generation circuitry, a final prediction motion vector for the target block of the color image of the second viewpoint with respect to the color image of the first viewpoint among the first predicted motion vector and the second predicted motion vector, based on a number of surrounding depth blocks in the depth image of the second viewpoint, a number of reference index matching blocks, and a variation of the disparity vectors of surrounding color blocks adjacent to the target block of the color image of the second viewpoint.

10. A non-transitory computer readable medium storing computer executable instructions that, when executed by an image processing device including circuitry, cause the circuitry to:

generate a first predicted motion vector for a target block of a color image of a second viewpoint with respect to a color image of a first viewpoint different from the second viewpoint according to a depth information prediction standard, wherein
    generating the first predicted motion vector includes calculating a disparity vector of the target block from a depth image of the second viewpoint and adopting the disparity vector as the first predicted motion vector for the target block,
    the disparity vector represents a disparity of the target block of the color image of the second viewpoint with respect to the color image of the first viewpoint, and
    the depth image of the second viewpoint comprises depth information related to a disparity of each pixel of the color image of the second viewpoint as a pixel value;
generate a second predicted motion vector for the target block of the color image of the second viewpoint with respect to the color image of the first viewpoint according to a median prediction standard, wherein
    generating the second predicted motion vector includes calculating a median of disparity vectors of surrounding color blocks adjacent to the target block and adopting the median as the second predicted motion vector for the target block; and
select a final prediction motion vector for the target block of the color image of the second viewpoint with respect to the color image of the first viewpoint among the first predicted motion vector and the second predicted motion vector, based on a number of surrounding depth blocks in the depth image of the second viewpoint, a number of reference index matching blocks, and a variation of the disparity vectors of surrounding color blocks adjacent to the target block of the color image of the second viewpoint.

* * * * *